US009796591B2

(12) United States Patent
Noyes

(10) Patent No.: US 9,796,591 B2
(45) Date of Patent: *Oct. 24, 2017

(54) METHODS FOR REDUCING CARBON OXIDES WITH NON FERROUS CATALYSTS AND FORMING SOLID CARBON PRODUCTS

(71) Applicant: Seerstone LLC, Provo, UT (US)

(72) Inventor: Dallas B. Noyes, Provo, UT (US)

(73) Assignee: Seerstone LLC, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/388,915

(22) PCT Filed: Mar. 15, 2013

(86) PCT No.: PCT/US2013/000072
§ 371 (c)(1),
(2) Date: Sep. 29, 2014

(87) PCT Pub. No.: WO2013/158156
PCT Pub. Date: Oct. 24, 2013

(65) Prior Publication Data
US 2015/0086468 A1 Mar. 26, 2015

Related U.S. Application Data

(60) Provisional application No. 61/624,702, filed on Apr. 16, 2012.

(51) Int. Cl.
| | | |
|---|---|---|
| *C01B 31/02* | (2006.01) | |
| *B01J 37/16* | (2006.01) | |
| *B01J 23/755* | (2006.01) | |
| *C01B 31/04* | (2006.01) | |
| *B01J 37/18* | (2006.01) | |
| *B01J 23/28* | (2006.01) | |
| *B01J 23/30* | (2006.01) | |
| *B01J 23/75* | (2006.01) | |
| *B01J 23/882* | (2006.01) | |
| *B01J 23/883* | (2006.01) | |
| *B01J 23/888* | (2006.01) | |
| *B01J 35/00* | (2006.01) | |
| *B01J 35/02* | (2006.01) | |
| *B82Y 30/00* | (2011.01) | |
| *B82Y 40/00* | (2011.01) | |
| *B01J 35/06* | (2006.01) | |
| *B01J 35/08* | (2006.01) | |
| *C01B 31/06* | (2006.01) | |

(52) U.S. Cl.
CPC ............. *C01B 31/02* (2013.01); *B01J 23/28* (2013.01); *B01J 23/30* (2013.01); *B01J 23/75* (2013.01); *B01J 23/755* (2013.01); *B01J 23/882* (2013.01); *B01J 23/883* (2013.01); *B01J 23/888* (2013.01); *B01J 23/8885* (2013.01); *B01J 35/002* (2013.01); *B01J 35/02* (2013.01); *B01J 35/023* (2013.01); *B01J 35/026* (2013.01); *B01J 35/06* (2013.01); *B01J 35/08* (2013.01); *B01J 37/16* (2013.01); *B01J 37/18* (2013.01); *B82Y 30/00* (2013.01); *B82Y 40/00* (2013.01); *C01B 31/0206* (2013.01); *C01B 31/0213* (2013.01); *C01B 31/0233* (2013.01); *C01B 31/04* (2013.01); *C01B 31/0438* (2013.01); *C01B 31/06* (2013.01); *C01B 2202/06* (2013.01); *Y10T 428/24917* (2015.01); *Y10T 428/2958* (2015.01); *Y10T 428/2982* (2015.01); *Y10T 428/31678* (2015.04)

(58) Field of Classification Search
CPC .................................................. C01B 31/02
See application file for complete search history.

(56) References Cited

U.S. PATENT DOCUMENTS

| | | | |
|---|---|---|---|
| 1,478,730 A | 12/1923 | Brownlee | |
| 1,735,925 A | 11/1929 | Jaeger | |
| 1,746,464 A | 2/1930 | Fischer et al. | |
| 1,964,744 A | 7/1934 | Odell | |

(Continued)

FOREIGN PATENT DOCUMENTS

| | | |
|---|---|---|
| EP | 0945402 A1 | 9/1999 |
| EP | 2186931 A1 | 5/2010 |

(Continued)

OTHER PUBLICATIONS

PCT International Search Report and Written Opinion, PCT/US2013/000072, dated Jul. 12, 2013.
International Preliminary Report on Patentability, for International Application No. PCT/US2013/000072, dated Oct. 21, 2014, 10 pages.
Abatzoglou, Nicolas et al., "The use of catalytic reforming reactions for C02 sequestration as carbon nanotubes," Proceedings of the 2006 IASME/WSEAS International Conference on Energy & Environmental Systems, Chalkida, Greece, May 8-10, 2006 (pp. 21-26) (available at: http://www.wseas.us/e-library/conferences/2006evia/papers/516-19 3.pdf).
Abatzoglou, Nicolas et al., "Green Diesel from Fischer-Tropsch Synthesis: Challenges and Hurdles," Proc. of the 3rd IASME/WSEAS Int. Conf. on Energy, Environment, Ecosystems and Sustainable Development, Agios Nikolaos, Greece, Jul. 24-26, 2007, pp. 223-232.

(Continued)

*Primary Examiner* — Stuart Hendrickson
(74) *Attorney, Agent, or Firm* — TraskBritt, P.C.

(57) ABSTRACT

A method of reducing a gaseous carbon oxide includes reacting a carbon oxide with a gaseous reducing agent in the presence of a non-ferrous catalyst. The reaction proceeds under conditions adapted to produce solid carbon of various allotropes and morphologies, the selective formation of which can be controlled by means of controlling reaction gas composition and reaction conditions including temperature and pressure. A method for utilizing a non-ferrous catalyst in a reactor includes placing the catalyst in a suitable reactor and flowing reaction gases comprising a carbon oxide with at least one gaseous reducing agent through the reactor where, in the presence of the catalyst, at least a portion of the carbon in the carbon oxide is converted to solid carbon and a tail gas mixture containing water vapor.

19 Claims, 74 Drawing Sheets

(56) References Cited

U.S. PATENT DOCUMENTS

| | | |
|---|---|---|
| 2,404,869 A | 7/1946 | Sorrentino |
| 2,429,980 A | 11/1947 | Allinson |
| 2,440,424 A | 4/1948 | Wiegand et al. |
| 2,745,973 A | 5/1956 | Rappaport |
| 2,796,331 A | 6/1957 | Kauffman et al. |
| 2,800,616 A | 7/1957 | Becker |
| 2,811,653 A | 10/1957 | Moore |
| 2,819,414 A | 1/1958 | Sherwood et al. |
| 2,837,666 A | 6/1958 | Linder |
| 2,976,433 A | 3/1961 | Rappaport et al. |
| 3,094,634 A | 6/1963 | Rappaport |
| 3,249,830 A | 5/1966 | Adany |
| 3,378,345 A | 4/1968 | Bourdeau et al. |
| 3,634,999 A | 1/1972 | Howard et al. |
| 3,714,474 A | 1/1973 | Hoff |
| 3,846,478 A | 11/1974 | Cummins |
| 3,905,748 A | 9/1975 | Cairo et al. |
| 4,024,420 A | 5/1977 | Anthony et al. |
| 4,126,000 A | 11/1978 | Funk |
| 4,197,281 A | 4/1980 | Muenger |
| 4,200,554 A | 4/1980 | Lauder |
| 4,602,477 A | 7/1986 | Lucadamo et al. |
| 4,628,143 A | 12/1986 | Brotz |
| 4,663,230 A | 5/1987 | Tennent |
| 4,710,483 A | 12/1987 | Burk et al. |
| 4,725,346 A | 2/1988 | Joshi |
| 4,727,207 A | 2/1988 | Paparizos et al. |
| 4,746,458 A | 5/1988 | Brotz |
| 4,855,091 A | 8/1989 | Geus et al. |
| 4,900,368 A | 2/1990 | Brotz |
| 5,008,579 A | 4/1991 | Conley et al. |
| 5,021,139 A | 6/1991 | Hartig et al. |
| 5,082,505 A | 1/1992 | Cota et al. |
| 5,122,332 A | 6/1992 | Russell |
| 5,133,190 A | 7/1992 | Abdelmalek |
| 5,149,584 A | 9/1992 | Baker et al. |
| 5,187,030 A | 2/1993 | Firmin et al. |
| 5,260,621 A | 11/1993 | Little et al. |
| 5,396,141 A | 3/1995 | Jantz |
| 5,413,866 A | 5/1995 | Baker et al. |
| 5,456,897 A | 10/1995 | Moy et al. |
| 5,526,374 A | 6/1996 | Uebber |
| 5,531,424 A | 7/1996 | Whipp |
| 5,569,635 A | 10/1996 | Moy et al. |
| 5,572,544 A | 11/1996 | Mathur et al. |
| 5,578,543 A | 11/1996 | Tennent et al. |
| 5,589,152 A | 12/1996 | Tennent et al. |
| 5,624,542 A | 4/1997 | Shen et al. |
| 5,641,466 A | 6/1997 | Ebbesen et al. |
| 5,648,056 A | 7/1997 | Tanaka |
| 5,650,370 A | 7/1997 | Tennent et al. |
| 5,691,054 A | 11/1997 | Tennent et al. |
| 5,707,916 A | 1/1998 | Snyder et al. |
| 5,726,116 A | 3/1998 | Moy et al. |
| 5,747,161 A | 5/1998 | Iijima |
| 5,780,101 A | 7/1998 | Nolan et al. |
| 5,859,484 A | 1/1999 | Mannik et al. |
| 5,877,110 A | 3/1999 | Snyder et al. |
| 5,910,238 A | 6/1999 | Cable et al. |
| 5,965,267 A | 10/1999 | Nolan et al. |
| 5,997,832 A | 12/1999 | Lieber et al. |
| 6,099,965 A | 8/2000 | Tennent et al. |
| 6,159,892 A | 12/2000 | Moy et al. |
| 6,183,714 B1 | 2/2001 | Smalley et al. |
| 6,203,814 B1 | 3/2001 | Fisher et al. |
| 6,221,330 B1 | 4/2001 | Moy et al. |
| 6,232,706 B1 | 5/2001 | Dai et al. |
| 6,239,057 B1 | 5/2001 | Ichikawa et al. |
| 6,261,532 B1 | 7/2001 | Ono |
| 6,262,129 B1 | 7/2001 | Murray et al. |
| 6,294,144 B1 | 9/2001 | Moy et al. |
| 6,333,016 B1 | 12/2001 | Resasco et al. |
| 6,346,189 B1 | 2/2002 | Dai et al. |
| 6,361,861 B2 | 3/2002 | Gao |
| 6,375,917 B1 | 4/2002 | Mandeville et al. |
| 6,413,487 B1 | 7/2002 | Resasco et al. |
| 6,423,288 B2 | 7/2002 | Mandeville et al. |
| 6,426,442 B1 | 7/2002 | Ichikawa et al. |
| 6,465,813 B2 | 10/2002 | Ihm |
| 6,518,218 B1 | 2/2003 | Sun et al. |
| 6,596,101 B2 | 7/2003 | Weihs et al. |
| 6,645,455 B2 | 11/2003 | Margrave et al. |
| 6,683,783 B1 | 1/2004 | Smalley et al. |
| 6,686,311 B2 | 2/2004 | Sun et al. |
| 6,692,717 B1 | 2/2004 | Smalley et al. |
| 6,713,519 B2 | 3/2004 | Wang et al. |
| 6,749,827 B2 | 6/2004 | Smalley et al. |
| 6,761,870 B1 | 7/2004 | Smalley et al. |
| 6,790,425 B1 | 9/2004 | Smalley et al. |
| 6,800,369 B2 | 10/2004 | Gimzewski et al. |
| 6,827,918 B2 | 12/2004 | Margrave et al. |
| 6,827,919 B1 | 12/2004 | Moy et al. |
| 6,835,330 B2 | 12/2004 | Nishino et al. |
| 6,835,366 B1 | 12/2004 | Margrave et al. |
| 6,841,139 B2 | 1/2005 | Margrave et al. |
| 6,843,843 B2 | 1/2005 | Takahashi et al. |
| 6,855,301 B1 | 2/2005 | Rich et al. |
| 6,855,593 B2 | 2/2005 | Andoh |
| 6,875,412 B2 | 4/2005 | Margrave et al. |
| 6,890,986 B2 | 5/2005 | Pruett |
| 6,899,945 B2 | 5/2005 | Smalley et al. |
| 6,905,544 B2 | 6/2005 | Setoguchi et al. |
| 6,913,740 B2 | 7/2005 | Polverejan et al. |
| 6,913,789 B2 | 7/2005 | Smalley et al. |
| 6,916,434 B2 | 7/2005 | Nishino et al. |
| 6,919,064 B2 | 7/2005 | Resasco et al. |
| 6,936,233 B2 | 8/2005 | Smalley et al. |
| 6,949,237 B2 | 9/2005 | Smalley et al. |
| 6,955,800 B2 | 10/2005 | Resasco et al. |
| 6,960,389 B2 | 11/2005 | Tennent et al. |
| 6,962,685 B2 | 11/2005 | Sun |
| 6,979,709 B2 | 12/2005 | Smalley et al. |
| 6,986,876 B2 | 1/2006 | Smalley et al. |
| 6,998,358 B2 | 2/2006 | French et al. |
| 7,011,771 B2 | 3/2006 | Gao et al. |
| 7,041,620 B2 | 5/2006 | Smalley et al. |
| 7,045,108 B2 | 5/2006 | Jiang et al. |
| 7,048,999 B2 | 5/2006 | Smalley et al. |
| 7,052,668 B2 | 5/2006 | Smalley et al. |
| 7,067,098 B2 | 6/2006 | Colbert et al. |
| 7,071,406 B2 | 7/2006 | Smalley et al. |
| 7,074,379 B2 | 7/2006 | Moy et al. |
| 7,094,385 B2 | 8/2006 | Beguin et al. |
| 7,094,386 B2 | 8/2006 | Resasco et al. |
| 7,094,679 B1 | 8/2006 | Li et al. |
| 7,097,820 B2 | 8/2006 | Colbert et al. |
| 7,105,596 B2 | 9/2006 | Smalley et al. |
| 7,125,534 B1 | 10/2006 | Smalley et al. |
| 7,132,062 B1 | 11/2006 | Howard |
| 7,135,159 B2 | 11/2006 | Shaffer et al. |
| 7,135,160 B2 | 11/2006 | Yang et al. |
| 7,150,864 B1 | 12/2006 | Smalley et al. |
| 7,157,068 B2 | 1/2007 | Li et al. |
| 7,160,532 B2 | 1/2007 | Liu et al. |
| 7,169,329 B2 | 1/2007 | Wong et al. |
| 7,201,887 B2 | 4/2007 | Smalley et al. |
| 7,204,970 B2 | 4/2007 | Smalley et al. |
| 7,205,069 B2 | 4/2007 | Smalley et al. |
| 7,212,147 B2 | 5/2007 | Messano |
| 7,214,360 B2 | 5/2007 | Chen et al. |
| 7,250,148 B2 | 7/2007 | Yang et al. |
| 7,270,795 B2 | 9/2007 | Kawakami et al. |
| 7,291,318 B2 | 11/2007 | Sakurabayashi et al. |
| 7,338,648 B2 | 3/2008 | Harutyunyan et al. |
| 7,365,289 B2 | 4/2008 | Wilkes et al. |
| 7,374,793 B2 | 5/2008 | Furukawa et al. |
| 7,390,477 B2 | 6/2008 | Smalley et al. |
| 7,396,798 B2 | 7/2008 | Ma et al. |
| 7,408,186 B2 | 8/2008 | Merkulov et al. |
| 7,410,628 B2 | 8/2008 | Bening et al. |
| 7,413,723 B2 | 8/2008 | Niu et al. |
| 7,452,828 B2 | 11/2008 | Hirakata et al. |
| 7,459,137 B2 | 12/2008 | Tour et al. |
| 7,459,138 B2 | 12/2008 | Resasco et al. |

(56) References Cited

U.S. PATENT DOCUMENTS

| | | | |
|---|---|---|---|
| 7,473,873 B2 | 1/2009 | Biris et al. |
| 7,510,695 B2 | 3/2009 | Smalley et al. |
| 7,527,780 B2 | 5/2009 | Margrave et al. |
| 7,563,427 B2 | 7/2009 | Wei et al. |
| 7,563,428 B2 | 7/2009 | Resasco et al. |
| 7,569,203 B2 | 8/2009 | Fridman et al. |
| 7,572,426 B2 | 8/2009 | Strano et al. |
| 7,585,483 B2 | 9/2009 | Edwin et al. |
| 7,601,322 B2 | 10/2009 | Huang |
| 7,611,579 B2 | 11/2009 | Lashmore et al. |
| 7,615,204 B2 | 11/2009 | Ajayan et al. |
| 7,618,599 B2 | 11/2009 | Kim et al. |
| 7,622,059 B2 | 11/2009 | Bordere et al. |
| 7,632,569 B2 | 12/2009 | Smalley et al. |
| 7,645,933 B2 | 1/2010 | Narkis et al. |
| 7,655,302 B2 | 2/2010 | Smalley et al. |
| 7,670,510 B2 | 3/2010 | Wong et al. |
| 7,700,065 B2 | 4/2010 | Fujioka et al. |
| 7,704,481 B2 | 4/2010 | Higashi et al. |
| 7,718,283 B2 | 5/2010 | Raffaelle et al. |
| 7,719,265 B2 | 5/2010 | Harutyunyan et al. |
| 7,731,930 B2 | 6/2010 | Taki et al. |
| 7,736,741 B2 | 6/2010 | Maruyama et al. |
| 7,740,825 B2 | 6/2010 | Tohji et al. |
| 7,749,477 B2 | 7/2010 | Jiang et al. |
| 7,754,182 B2 | 7/2010 | Jiang et al. |
| 7,772,447 B2 | 8/2010 | Iaccino et al. |
| 7,780,939 B2 | 8/2010 | Margrave et al. |
| 7,785,558 B2 | 8/2010 | Hikata |
| 7,790,228 B2 | 9/2010 | Suekane et al. |
| 7,794,690 B2 | 9/2010 | Abatzoglou et al. |
| 7,794,797 B2 | 9/2010 | Vasenkov |
| 7,799,246 B2 | 9/2010 | Bordere et al. |
| 7,811,542 B1 | 10/2010 | McElrath et al. |
| 7,824,648 B2 | 11/2010 | Jiang et al. |
| 7,837,968 B2 | 11/2010 | Chang et al. |
| 7,838,843 B2 | 11/2010 | Kawakami et al. |
| 7,842,271 B2 | 11/2010 | Petrik |
| 7,854,945 B2 | 12/2010 | Fischer et al. |
| 7,854,991 B2 | 12/2010 | Hata et al. |
| 7,858,648 B2 | 12/2010 | Bianco et al. |
| 7,871,591 B2 | 1/2011 | Harutyunyan et al. |
| 7,883,995 B2 | 2/2011 | Mitchell et al. |
| 7,887,774 B2 | 2/2011 | Strano et al. |
| 7,888,543 B2 | 2/2011 | Iaccino et al. |
| 7,897,209 B2 | 3/2011 | Shibuya et al. |
| 7,901,654 B2 | 3/2011 | Harutyunyan |
| 7,906,095 B2 | 3/2011 | Kawabata |
| 7,919,065 B2 | 4/2011 | Pedersen et al. |
| 7,923,403 B2 | 4/2011 | Ma et al. |
| 7,923,615 B2 | 4/2011 | Silvy et al. |
| 7,932,419 B2 | 4/2011 | Liu et al. |
| 7,947,245 B2 | 5/2011 | Tada et al. |
| 7,951,351 B2 | 5/2011 | Ma et al. |
| 7,964,174 B2 | 6/2011 | Dubin et al. |
| 7,981,396 B2 | 7/2011 | Harutyunyan |
| 7,988,861 B2 | 8/2011 | Pham-Huu et al. |
| 7,993,594 B2 | 8/2011 | Wei et al. |
| 8,012,447 B2 | 9/2011 | Harutyunyan et al. |
| 8,017,282 B2 | 9/2011 | Choi et al. |
| 8,017,892 B2 | 9/2011 | Biris et al. |
| 8,038,908 B2 | 10/2011 | Hirai et al. |
| 8,114,518 B2 | 2/2012 | Hata et al. |
| 8,128,867 B2 * | 3/2012 | Iwasaki | C22C 1/051 419/15 |
| 8,138,384 B2 | 3/2012 | Iaccino et al. |
| 8,173,096 B2 | 5/2012 | Chang et al. |
| 8,178,049 B2 | 5/2012 | Shiraki et al. |
| 8,226,902 B2 | 7/2012 | Jang et al. |
| 8,314,044 B2 | 11/2012 | Jangbarwala |
| 8,679,444 B2 * | 3/2014 | Noyes | B82Y 30/00 423/445 R |
| 2001/0009119 A1 | 7/2001 | Murray et al. |
| 2002/0009637 A1 | 1/2002 | Murakami et al. |
| 2002/0054849 A1 | 5/2002 | Baker et al. |
| 2002/0102193 A1 | 8/2002 | Smalley et al. |
| 2002/0102196 A1 | 8/2002 | Smalley et al. |
| 2002/0127169 A1 | 9/2002 | Smalley et al. |
| 2002/0127170 A1 | 9/2002 | Hong et al. |
| 2002/0172767 A1 | 11/2002 | Grigorian et al. |
| 2003/0059364 A1 | 3/2003 | Prilutskiy |
| 2003/0147802 A1 | 8/2003 | Smalley et al. |
| 2004/0053440 A1 | 3/2004 | Lai et al. |
| 2004/0070009 A1 | 4/2004 | Resasco et al. |
| 2004/0105807 A1 | 6/2004 | Fan et al. |
| 2004/0111968 A1 | 6/2004 | Day et al. |
| 2004/0151654 A1 | 8/2004 | Wei et al. |
| 2004/0194705 A1 | 10/2004 | Dai et al. |
| 2004/0197260 A1 | 10/2004 | Resasco et al. |
| 2004/0202603 A1 | 10/2004 | Fischer et al. |
| 2004/0234445 A1 | 11/2004 | Serp et al. |
| 2004/0247503 A1 | 12/2004 | Hyeon |
| 2004/0265212 A1 | 12/2004 | Varadan et al. |
| 2005/0002850 A1 | 1/2005 | Niu et al. |
| 2005/0002851 A1 | 1/2005 | McElrath et al. |
| 2005/0025695 A1 | 2/2005 | Pradhan |
| 2005/0042162 A1 | 2/2005 | Resasco et al. |
| 2005/0046322 A1 | 3/2005 | Kim et al. |
| 2005/0074392 A1 | 4/2005 | Yang et al. |
| 2005/0079118 A1 | 4/2005 | Maruyama et al. |
| 2005/0100499 A1 | 5/2005 | Oya et al. |
| 2005/0170089 A1 * | 8/2005 | Lashmore | B82Y 10/00 427/248.1 |
| 2005/0176990 A1 | 8/2005 | Coleman et al. |
| 2005/0220695 A1 | 10/2005 | Abatzoglou et al. |
| 2005/0244325 A1 | 11/2005 | Nam et al. |
| 2005/0276743 A1 | 12/2005 | Lacombe et al. |
| 2006/0013757 A1 | 1/2006 | Edwin et al. |
| 2006/0032330 A1 | 2/2006 | Sato |
| 2006/0045837 A1 | 3/2006 | Nishimura |
| 2006/0078489 A1 | 4/2006 | Harutyunyan et al. |
| 2006/0104884 A1 | 5/2006 | Shaffer et al. |
| 2006/0104886 A1 | 5/2006 | Wilson |
| 2006/0104887 A1 | 5/2006 | Fujioka et al. |
| 2006/0133990 A1 | 6/2006 | Hyeon et al. |
| 2006/0141346 A1 | 6/2006 | Gordon et al. |
| 2006/0165988 A1 | 7/2006 | Chiang et al. |
| 2006/0191835 A1 | 8/2006 | Petrik et al. |
| 2006/0199770 A1 | 9/2006 | Bianco et al. |
| 2006/0204426 A1 | 9/2006 | Akins et al. |
| 2006/0225534 A1 | 10/2006 | Swihart et al. |
| 2006/0239890 A1 | 10/2006 | Chang et al. |
| 2006/0239891 A1 | 10/2006 | Niu et al. |
| 2006/0245996 A1 | 11/2006 | Xie et al. |
| 2006/0275956 A1 | 12/2006 | Konesky |
| 2007/0003470 A1 | 1/2007 | Smalley et al. |
| 2007/0020168 A1 | 1/2007 | Asmussen et al. |
| 2007/0031320 A1 | 2/2007 | Jiang et al. |
| 2007/0080605 A1 | 4/2007 | Chandrashekhar et al. |
| 2007/0116631 A1 | 5/2007 | Li et al. |
| 2007/0148962 A1 | 6/2007 | Kauppinen et al. |
| 2007/0149392 A1 | 6/2007 | Ku et al. |
| 2007/0183959 A1 | 8/2007 | Charlier et al. |
| 2007/0189953 A1 | 8/2007 | Bai et al. |
| 2007/0207318 A1 | 9/2007 | Jin et al. |
| 2007/0209093 A1 | 9/2007 | Tohji et al. |
| 2007/0253886 A1 | 11/2007 | Abatzoglou et al. |
| 2007/0264187 A1 | 11/2007 | Harutyunyan et al. |
| 2007/0280876 A1 | 12/2007 | Tour et al. |
| 2007/0281087 A1 | 12/2007 | Harutyunyan et al. |
| 2008/0003170 A1 | 1/2008 | Buchholz et al. |
| 2008/0003182 A1 | 1/2008 | Wilson et al. |
| 2008/0008760 A1 | 1/2008 | Bianco et al. |
| 2008/0014654 A1 | 1/2008 | Weisman et al. |
| 2008/0095695 A1 | 4/2008 | Shanov et al. |
| 2008/0118426 A1 | 5/2008 | Li et al. |
| 2008/0160312 A1 | 7/2008 | Furukawa et al. |
| 2008/0169061 A1 | 7/2008 | Tour et al. |
| 2008/0175785 A1 | 7/2008 | Mitra et al. |
| 2008/0176069 A1 | 7/2008 | Ma et al. |
| 2008/0182155 A1 | 7/2008 | Choi et al. |
| 2008/0193367 A1 | 8/2008 | Kalck et al. |
| 2008/0217588 A1 | 9/2008 | Arnold et al. |
| 2008/0226538 A1 | 9/2008 | Rumpf et al. |

(56) References Cited

U.S. PATENT DOCUMENTS

| | | |
|---|---|---|
| 2008/0233402 A1 | 9/2008 | Carlson et al. |
| 2008/0260618 A1 | 10/2008 | Kawabata |
| 2008/0274277 A1 | 11/2008 | Rashidi et al. |
| 2008/0279753 A1 | 11/2008 | Harutyunyan |
| 2008/0280136 A1 | 11/2008 | Zachariah et al. |
| 2008/0296537 A1 | 12/2008 | Gordon et al. |
| 2008/0299029 A1 | 12/2008 | Grosboll et al. |
| 2008/0305028 A1 | 12/2008 | McKeigue et al. |
| 2008/0305029 A1 | 12/2008 | McKeigue et al. |
| 2008/0305030 A1 | 12/2008 | McKeigue et al. |
| 2008/0318357 A1 | 12/2008 | Raffaelle et al. |
| 2009/0001326 A1 | 1/2009 | Sato et al. |
| 2009/0004075 A1 | 1/2009 | Chung et al. |
| 2009/0011128 A1 | 1/2009 | Oshima et al. |
| 2009/0035569 A1 | 2/2009 | Gonzalez Moral et al. |
| 2009/0053115 A1 | 2/2009 | Jacques et al. |
| 2009/0056802 A1 | 3/2009 | Rabani |
| 2009/0074634 A1 | 3/2009 | Tada et al. |
| 2009/0081454 A1 | 3/2009 | Axmann et al. |
| 2009/0087371 A1 | 4/2009 | Jang et al. |
| 2009/0087622 A1 | 4/2009 | Busnaina et al. |
| 2009/0124705 A1 | 5/2009 | Meyer et al. |
| 2009/0134363 A1 | 5/2009 | Bordere et al. |
| 2009/0136413 A1 | 5/2009 | Li et al. |
| 2009/0140215 A1 | 6/2009 | Buchholz et al. |
| 2009/0186223 A1 | 7/2009 | Saito et al. |
| 2009/0191352 A1 | 7/2009 | DuFaux et al. |
| 2009/0203519 A1 | 8/2009 | Abatzoglou et al. |
| 2009/0208388 A1 | 8/2009 | McKeigue et al. |
| 2009/0208708 A1 | 8/2009 | Wei et al. |
| 2009/0220392 A1 | 9/2009 | McKeigue et al. |
| 2009/0226704 A1 | 9/2009 | Kauppinen et al. |
| 2009/0257945 A1 | 10/2009 | Biris et al. |
| 2009/0286084 A1 | 11/2009 | Tennent et al. |
| 2009/0286675 A1 | 11/2009 | Wei et al. |
| 2009/0294753 A1 | 12/2009 | Hauge et al. |
| 2009/0297846 A1 | 12/2009 | Hata et al. |
| 2009/0297847 A1 | 12/2009 | Kim et al. |
| 2009/0301349 A1 | 12/2009 | Afzali-Ardakani et al. |
| 2010/0004468 A1 | 1/2010 | Wong et al. |
| 2010/0009204 A1 | 1/2010 | Noguchi et al. |
| 2010/0028735 A1 | 2/2010 | Basset et al. |
| 2010/0034725 A1 | 2/2010 | Harutyunyan |
| 2010/0062229 A1 | 3/2010 | Hata et al. |
| 2010/0065776 A1 | 3/2010 | Han et al. |
| 2010/0074811 A1 | 3/2010 | McKeigue et al. |
| 2010/0081568 A1 | 4/2010 | Bedworth |
| 2010/0104808 A1 | 4/2010 | Fan et al. |
| 2010/0129654 A1 | 5/2010 | Jiang et al. |
| 2010/0132259 A1 | 6/2010 | Haque |
| 2010/0132883 A1 | 6/2010 | Burke et al. |
| 2010/0150810 A1 | 6/2010 | Yoshida et al. |
| 2010/0158788 A1 | 6/2010 | Kim et al. |
| 2010/0159222 A1 | 6/2010 | Hata et al. |
| 2010/0160155 A1 | 6/2010 | Liang |
| 2010/0167053 A1 | 7/2010 | Sung et al. |
| 2010/0173037 A1 | 7/2010 | Jiang et al. |
| 2010/0173153 A1 | 7/2010 | Hata et al. |
| 2010/0196249 A1 | 8/2010 | Hata et al. |
| 2010/0196600 A1 | 8/2010 | Shibuya et al. |
| 2010/0209696 A1 | 8/2010 | Seals et al. |
| 2010/0213419 A1 | 8/2010 | Jiang et al. |
| 2010/0221173 A1 | 9/2010 | Tennent et al. |
| 2010/0222432 A1 | 9/2010 | Hua |
| 2010/0226848 A1 | 9/2010 | Nakayama et al. |
| 2010/0230642 A1 | 9/2010 | Kim et al. |
| 2010/0239489 A1 | 9/2010 | Harutyunyan et al. |
| 2010/0254860 A1 | 10/2010 | Shiraki et al. |
| 2010/0254886 A1 | 10/2010 | McElrath et al. |
| 2010/0260927 A1 | 10/2010 | Gordon et al. |
| 2010/0278717 A1 | 11/2010 | Suzuki et al. |
| 2010/0298125 A1 | 11/2010 | Kim et al. |
| 2010/0301278 A1 | 12/2010 | Hirai et al. |
| 2010/0303675 A1 | 12/2010 | Suekane et al. |
| 2010/0316556 A1 | 12/2010 | Wei et al. |
| 2010/0316562 A1 | 12/2010 | Carruthers et al. |
| 2010/0317790 A1 | 12/2010 | Jang et al. |
| 2010/0320437 A1 | 12/2010 | Gordon et al. |
| 2011/0008617 A1 | 1/2011 | Hata et al. |
| 2011/0014368 A1 | 1/2011 | Vasenkov |
| 2011/0020211 A1 | 1/2011 | Jayatissa |
| 2011/0024697 A1 | 2/2011 | Biris et al. |
| 2011/0027162 A1 | 2/2011 | Steiner, III et al. |
| 2011/0027163 A1 | 2/2011 | Shinohara et al. |
| 2011/0033367 A1 | 2/2011 | Riehl et al. |
| 2011/0039124 A1 | 2/2011 | Ikeuchi et al. |
| 2011/0053020 A1 | 3/2011 | Norton et al. |
| 2011/0053050 A1 | 3/2011 | Lim et al. |
| 2011/0060087 A1 | 3/2011 | Noguchi et al. |
| 2011/0085961 A1 | 4/2011 | Noda et al. |
| 2011/0110842 A1 | 5/2011 | Haddon |
| 2011/0117365 A1 | 5/2011 | Hata et al. |
| 2011/0120138 A1 | 5/2011 | Gaiffi et al. |
| 2011/0150746 A1 | 6/2011 | Khodadadi et al. |
| 2011/0155964 A1 | 6/2011 | Arnold et al. |
| 2011/0158892 A1 | 6/2011 | Yamaki |
| 2011/0171109 A1 | 7/2011 | Petrik |
| 2011/0174145 A1 | 7/2011 | Ogrin et al. |
| 2011/0206469 A1 | 8/2011 | Furuyama et al. |
| 2011/0298071 A9 | 12/2011 | Spencer et al. |
| 2012/0034150 A1 | 2/2012 | Noyes |
| 2012/0083408 A1 | 4/2012 | Sato et al. |
| 2012/0107610 A1 | 5/2012 | Moravsky et al. |
| 2012/0137664 A1 | 6/2012 | Shawabkeh et al. |
| 2012/0148476 A1 | 6/2012 | Hata et al. |
| 2013/0154438 A1 | 6/2013 | Tan Xing Haw |
| 2014/0021827 A1 | 1/2014 | Noyes |
| 2014/0141248 A1 | 5/2014 | Noyes |
| 2014/0348739 A1 | 11/2014 | Denton et al. |
| 2015/0059527 A1 | 3/2015 | Noyes |
| 2015/0059571 A1 | 3/2015 | Denton et al. |
| 2015/0064092 A1 | 3/2015 | Noyes |
| 2015/0064096 A1 | 3/2015 | Noyes |
| 2015/0064097 A1 | 3/2015 | Noyes |
| 2015/0071846 A1 | 3/2015 | Noyes |
| 2015/0071848 A1 | 3/2015 | Denton et al. |
| 2015/0078982 A1 | 3/2015 | Noyes |

FOREIGN PATENT DOCUMENTS

| | | |
|---|---|---|
| EP | 2404869 A1 | 1/2012 |
| JP | 61239019 A | 10/1986 |
| JP | 10037024 A | 2/1998 |
| JP | 11322315 A | 11/1999 |
| JP | 11335106 A | 12/1999 |
| JP | 2000264601 A | 9/2000 |
| JP | 2001087627 A | 4/2001 |
| JP | 2001137691 A | 5/2001 |
| JP | 2001187334 A | 7/2001 |
| JP | 2001288625 A | 10/2001 |
| JP | 2002146634 A | 5/2002 |
| JP | 2002201013 A | 7/2002 |
| JP | 2002211909 A | 7/2002 |
| JP | 2002526361 A | 8/2002 |
| JP | 2002531625 A | 9/2002 |
| JP | 339339 B2 | 10/2002 |
| JP | 3339339 B2 | 10/2002 |
| JP | 2004019018 A | 1/2004 |
| JP | 2004517789 A | 6/2004 |
| JP | 2004360099 A | 12/2004 |
| JP | 2005075725 A | 3/2005 |
| JP | 2005081519 A | 3/2005 |
| JP | 2005162567 A | 6/2005 |
| JP | 2005532976 A | 11/2005 |
| JP | 2006027949 A | 2/2006 |
| JP | 2006152490 A | 6/2006 |
| JP | 2007180546 A | 7/2007 |
| JP | 2007191840 A | 8/2007 |
| JP | 4565384 B2 | 10/2010 |
| JP | 2012524015 A | 10/2012 |
| KR | 1020050072056 A | 7/2005 |
| WO | 0230816 A1 | 4/2002 |
| WO | 03018474 A1 | 3/2003 |
| WO | 2004096704 A3 | 11/2005 |

(56) References Cited

FOREIGN PATENT DOCUMENTS

| WO | 2005103348 A1 | 11/2005 |
|---|---|---|
| WO | 2006003482 A3 | 8/2006 |
| WO | 2007086909 A3 | 11/2007 |
| WO | 2007139097 A1 | 12/2007 |
| WO | 2007126412 A3 | 6/2008 |
| WO | 2009011984 A1 | 1/2009 |
| WO | 2006130150 A3 | 4/2009 |
| WO | 2009122139 A1 | 10/2009 |
| WO | 2009145959 A1 | 12/2009 |
| WO | 2010047439 A1 | 4/2010 |
| WO | 2010087903 A1 | 8/2010 |
| WO | 2010092787 A1 | 8/2010 |
| WO | 2010120581 A1 | 10/2010 |
| WO | 2010146169 A1 | 12/2010 |
| WO | 2011009071 A1 | 1/2011 |
| WO | 2011020568 A1 | 2/2011 |
| WO | 2011029144 A1 | 3/2011 |
| WO | 2010146169 A3 | 4/2011 |
| WO | 2010124258 A3 | 5/2011 |
| WO | 2011053192 A2 | 5/2011 |
| WO | 2013090274 | 6/2013 |
| WO | 2013158155 | 10/2013 |
| WO | 2013158155 A1 | 10/2013 |
| WO | 2013158156 | 10/2013 |
| WO | 2013158156 A1 | 10/2013 |
| WO | 2013158157 A1 | 10/2013 |
| WO | 2013158158 A1 | 10/2013 |
| WO | 2013158159 A1 | 10/2013 |
| WO | 2013158160 A1 | 10/2013 |
| WO | 2013158161 A1 | 10/2013 |
| WO | 2013158438 | 10/2013 |
| WO | 2013158439 | 10/2013 |
| WO | 2013158441 | 10/2013 |
| WO | 2013162650 A1 | 10/2013 |
| WO | 2014011206 | 1/2014 |
| WO | 2014011206 A1 | 1/2014 |
| WO | 2014011631 | 1/2014 |
| WO | 2014011631 A1 | 1/2014 |
| WO | 2014085378 A1 | 6/2014 |

OTHER PUBLICATIONS

Baker, B. A. and G. D. Smith "Metal Dusting in a Laboratory Environment—Alloying Addition Effects," Special Metals Corporation, undated.
Baker, B. A. and G. D. Smith, "Alloy Solutions to Metal Dusting Problems in the PetroChemical Industry," Special Metals Corporation, undated.
Bogue, Robert, Powering Tomorrow's Sensor: A Review of Technologies—Part 1, Sensor Review, 2010, pp. 182-186, vol. 30, No. 3.
Cha, S. I., et al., "Mechanical and electrical properties of cross•linked carbon nanotubes," Carbon 46 (2008) 482-488, Elsevier, Ltd.
Cheng, H.M. et al., "Large-scale and low-cost synthesis of single-walled carbon nanotubes by the catalytic pyrolysis of hydrocarbons," Applied Physics Letters 72:3282-3284, Jun. 22, 1998 (available at: http://carbon.imr.ac.cn/file/journai/1998/98_APL_72_3282-ChengH M.pdf).
Chun, Changmin, and Ramanarayanan, Trikur A., "Metal Dusting Corrosion of Metals and Alloys," 2007.
Chung, U.C., and W.S. Chung, "Mechanism on Growth of Carbon Nanotubes Using CO-H2 Gas Mixture," Materials Science Forum vols. 475-479 (2005) pp. 3551-3554.
Dai, et al., "Single-wall nanotubes produced by metal-catalyzed disproportionation of carbon monoxide," Chemical Physics Letters 260 (1996) 471-475, Elsevier.
Dresselhaus et al., Carbon Nanotubes Synthesis, Structure, Properties, and Applications. 2001, pp. 1-9, Springer.
Garmirian, James Edwin, "Carbon Deposition in a Bosch Process Using a Cobalt and Nickel Catalyst," PhD Dissertation, Massachusetts Institute of Technology, Mar. 1980, pp. 14-185.

Grobert, Nicole, "Carbon nanotubes—becoming clean," Materials Today, vol. 10, No. 1-2, Jan.-Feb. 2007, Elsevier, pp. 28-35.
Hata, Kenji, "From Highly Efficient Impurity-Free CNT Synthesis to DWNT forests, CNTsolids and Super-Capacitors," unknown date, unknown publisher, Research Center for Advanced Carbon Materials, National Institute of Advanced Industrial Science and Technology (AIST), Tsukuba, 305-8565, Japan.
Hiraoka, Tatsuki, et al., "Synthesis of Single- and Double-Walled Carbon Nanotube Forests on Conducting Metal Foils," 9 J. Am. Chem. Soc. 2006, 128, 13338-13339.
Holmes, et al.; A Carbon Dioxide Reduction Unit Using Bosch Reaction and Expendable Catalyst Cartridges; NASA; 1970; available at https://archive.org/details/nasa_techdoc_19710002858.
Huang, Z.P., et al., "Growth of highly oriented carbon nanotubes by plasma-enhanced hot filament chemical vapor deposition," Applied Physics Letters 73:3845-3847, Dec. 28, 1998.
"Inconel® alloy 693—Excellent Resistance to Metal Dusting and High Temperature Corrosion" Special Metals Product Sheet, 2005.
Kavetsky et al., Chapter 2, Radioactive Materials, Ionizing Radiation Sources, and Radioluminescent Light Sources for Nuclear Batteries, Polymers, Phosphors, and Voltaics for Radioisotope Microbatteries, Edited by Bower et al., 2002, pp. 39-59, CRC Press.
Krestinin, A. V., et al. "Kinetics of Growth of Carbon Fibers on an Iron Catalyst in Methane Pyrolysis: A Measurement Procedure with the Use of an Optical Microscope," Kinetics and Catalysis, 2008, vol. 49, No. 1, pp. 68-78.
Lal, Archit, "Effect of Gas Composition and Carbon Activity on the Growth of Carbon Nanotubes," Masters Thesis, University of Florida, 2003.
Manasse et al., Schottky Barrier Betavoltaic Battery, IEEE Transactions on Nuclear Science, vol. NS-23, No. 1, Feb. 1976, pp. 860-870.
Manning, Michael Patrick, "An Investigation of the Bosch Process," PhD Dissertation, Massachusetts Institute of Technology, Jan. 1976.
Unknown author, "Metal Dusting," unknown publisher, undated.
Unknown author, "Metal Dusting of reducing gas furnace HK40 tube," unknown publisher, undated.
Muller-Lorenz and Grabke, Coking by metal dusting of steels, 1999, Materials and Corrosion 50, 614-621 (1999).
Nasibulin, Albert G., et al., "An essential role of C02 and H20 during single-walled CNT synthesis from carbon monoxide," Chemical Physics Letters 417 (2005) 179-184.
Nasibulin, Albert G., et al., "Correlation between catalyst particle and single-walled carbon nanotube diameters," Carbon 43 (2005) 2251-2257.
Noordin, Mohamad and Kong Yong Liew, "Synthesis of Alumina Nanofibers and Composites," in Nanofibers, pp. 405-418 (Ashok Kumar, ed., 2010) ISBN 978-953-7619-86-2 (available at http://www.intechopen.com/books/nanofibers/synthesis-of-alumina•nanofibers-and-composites).
Pender, Mark J., et al., "Molecular and polymeric precursors to boron carbide nanofibers, nanocylinders, and nanoporous ceramics," Pure Appl. Chem., vol. 75, No. 9, pp. 1287-1294, 2003.
Ruckenstein, E. and H.Y. Wang, "Carbon Deposition and Catalytic Deactivation during C02 Reforming of CH4 over Co/?-Al203 Catalysts," Journal of Catalysis, vol. 205, Issue 2, Jan. 25, 2002, pp. 289-293.
Sacco, Albert Jr., "An Investigation of the Reactions of Carbon Dioxide, Carbon Monoxide, Methane, Hydrogen, and Water over Iron, Iron Carbides, and Iron Oxides," PhD Dissertation, Massachusetts Institute of Technology, Jul. 1977, pp. 2, 15-234.
SAE 820875 Utilization of Ruthenium and Ruthenium-Iron Alloys as Bosch Process Catalysts. Jul. 19-21, 1982.
SAE 911451 Optimization of Bosch Reaction, Jul. 15-18, 1991.
Singh, Jasprit, Semiconductor Devices, An Introduction, 1994, pp. 86-93, 253-269.
Singh, Jasprit, Semiconductor Devices, Basic Principles, Chapter 6, Semiconductor Junctions with Metals and Insulators, 2001, pp. 224-244, Wiley.

(56) References Cited

OTHER PUBLICATIONS

Skulason, Egill, Metallic and Semiconducting Properties of Carbon Nanotubes, Modern Physics, Nov. 2005, slide presentation, 21 slides, available at https://notendur.hi.is/egillsk/stuff/annad/Egiii.Slides2.pdf, last visited Apr. 28, 2014.

Songsasen, Apisit and Paranchai Pairgreethaves, "Preparation of Carbon Nanotubes by Nickel Catalyzed Decomposition of Liquefied Petroleum Gas (LPG)," Kasetsart J. (Nat. Sci.) 35 : 354-359 (2001) (available at: http://kasetsartjournal.ku.ac.th/kuj_files/2008/A0804251023348734.pdf).

Szakalos, P., "Mechanisms and driving forces of metal dusting," Materials and Corrosion, 2003, 54, No. 10, pp. 752-762.

Tsai, Heng-Yi, et al., "A feasibility study of preparing carbon nanotubes by using a metal dusting process," Diamond & Related Materials 18 (2009) 324-327, Elsevier.

Tse, Anthony N., Si—Au Schottky Barrier Nuclear Battery, A Thesis submitted to the Faculty in partial fulfillment of the requirement for the degree of Doctor of Engineering, Thayer School of Engineering, Dartmouth College, Hanover, New Hampshire, Nov. 1972, pp. 31-57.

Wilson, Richard B., "Fundamental Investigation of the Bosch Reaction," PhD Dissertation, Massachusetts Institute of Technology, Jul. 1977, pp. 12,23, 37, 43, 44, 62, 70, 80, 83-88, 98.

Wei, et al. "The mass production of carbon nanotubes using a nano-agglomerate fluidized bed reactor: A multiscale space-time analysis," Powder Technology 183 (2008) 10-20, Elsevier.

XP-002719593 Thomson abstract.

Zeng, Z., and Natesan, K., Relationship between the Growth of Carbon Nanofilaments and Metal Dusting Corrosion, 2005, Chem. Mater. 2005, 17, 3794-3801.

European Search Report for copending EP application 13777753.8 dated Nov. 20, 2015.

Wiegand et al., Fabrication of High Strength Metal-Carbon Nanotube Composites, U.S. Army Research and Development, Picatinny, New Jersey, and New Jersey Institute of Technology, Newark, New Jersey, report date Dec. 2008, 6 pages.

Japanese Patent Application Kokai Publication No. (JP-A) 2005-060137 (unexamined, published Japanese patent application.

Japanese Patent Application Kohyo Publication No. (JP-A) 2005-537201 (unexamined Japanese national phase publication corresponding to a non-Japanese international publication).

Japanese Patent Application Kokai Publication No. (JP-A) 2006-027948 (unexamined, published Japanese patent application.

Japanese Patent Application Kohyo Publication No. (JP-A) 2006-511437 (unexamined Japanese national phase publication corresponding to a non-Japanese international publication).

Japanese Patent Application Kokai Publication No. (JP-A) 2007-222803 (unexamined, published Japanese patent application.

Japanese Patent ApplicationKohyo Publication No. (JP-A) 2010-511580 (unexamined Japanese national phase publication corresponding to a non-Japanese international publication).

Japanese Patent Application Kohyo Publication No. (JP-A) 2010-528974 (unexamined Japanese national phase publication corresponding to a non-Japanese international publication).

Japanese Patent Application Kokai Publication No. (JP-A) H11-335106 (unexamined, published Japanese patent application).

Notice of Rejection received from the Japanese Patent Office, Mar. 2, 2017, Application No. JP2015-506974.

Japanese Patent Application Kokai Publication No. (JP-A) S54-150388 (unexamined, published Japanese patent application).

* cited by examiner

METHODS FOR REDUCING CARBON OXIDES WITH NON FERROUS CATALYSTS AND FORMING SOLID CARBON PRODUCTS

PRIORITY CLAIM

This application claims the benefit of the filing date of U.S. Provisional Patent Application Ser. No. 61/624,702, filed Apr. 16, 2012, for "Methods and Structures for Producing Solid Carbon Utilizing Non-Ferrous Catalysts," the disclosure of which is hereby incorporated herein in its entirety by this reference.

TECHNICAL FIELD

Embodiments of the disclosure relate to the large-scale catalytic conversion of a carbon-containing feedstock into solid carbon, and, more specifically, to methods of converting mixtures of carbon monoxide, carbon dioxide, or any combination thereof to create carbon nanotube structures.

BACKGROUND

U.S. Patent Publication No. 2012/0034150 A1, published Feb. 9, 2012, the disclosure of which is hereby incorporated herein in its entirety by this reference, discloses background information hereto.

Additional information is disclosed in the following documents, the disclosure of each of which is hereby incorporated herein in its entirety by this reference:

1. International Patent Publication WO 2013/158159 A1, published Oct. 24, 2013, for "Methods and Systems for Thermal Energy Recovery from Production of Solid Carbon Materials by Reducing Carbon Oxides;"
2. International Patent Publication WO 2013/158160 A1, published Oct. 24, 2013, for "Methods for Producing Solid Carbon by Reducing Carbon Dioxide;"
3. International Patent Publication WO 2013/158157 A1, published Oct. 24, 2013, for "Methods and Reactors for Producing Solid Carbon Nanotubes, Solid Carbon Clusters, and Forests;"
4. International Patent Publication WO 2013/158158 A1, published Oct. 24, 2013, for "Methods for Treating an Offgas Containing Carbon Oxides;"
5. International Patent Publication WO 2013/158155 A1, published Oct. 24, 2013, for "Methods for Using Metal Catalysts in Carbon Oxide Catalytic Converters;"
6. International Patent Publication WO 2013/158161 A1, published Oct. 24, 2013, for "Methods and Systems for Capturing and Sequestering Carbon and for Reducing the Mass of Carbon Oxides in a Waste Gas Stream;"
7. International Patent Publication WO 2014/011206 A1, published Jan. 16, 2014, for "Methods and Systems for Forming Ammonia and Solid Carbon Products;" and
8. International Patent Publication WO 2013/162650 A1, published Oct. 31, 2013, for "Carbon Nanotubes Having a Bimodal Size Distribution."

Solid carbon has numerous commercial applications. These applications include longstanding uses such as uses of carbon black and carbon fibers as a filler material in tires, inks, etc., many uses for various forms of graphite (e.g., pyrolytic graphite in heat shields) and innovative and emerging applications for buckminsterfullerene and carbon nanotubes. Conventional methods for the manufacture of various forms of solid carbon typically involve the pyrolysis of hydrocarbons in the presence of a suitable catalyst. Hydrocarbons are typically used as the carbon source due to historically abundant availability and relatively low cost. The use of carbon oxides as the carbon-source in the production of solid carbon has largely been unexploited.

Carbon oxides, particularly carbon dioxide, are abundant gases that may be extracted from point-source emissions such as the exhaust gases of hydrocarbon combustion or from some process offgases. Carbon dioxide may also be extracted from the air. Because point-source emissions have much higher concentrations of carbon dioxide than does air, they are often economical sources from which to harvest carbon dioxide. However, the immediate availability of air may provide cost offsets by eliminating transportation costs through local manufacturing of solid carbon products from carbon dioxide in air.

Carbon dioxide is increasingly available and inexpensive as a byproduct of power generation and chemical processes in which an object may be to reduce or eliminate the emission of carbon dioxide into the atmosphere by capture and subsequent sequestration of the carbon dioxide (e.g., by injection into a geological formation). For example, the capture and sequestration of carbon dioxide is the basis for some "green" coal-fired power stations. In current practice, capture and sequestration of the carbon dioxide entails significant cost.

There is a spectrum of reactions involving carbon, oxygen, and hydrogen wherein various equilibria have been identified. Hydrocarbon pyrolysis involves equilibria between hydrogen and carbon that favors solid carbon production, typically with little or no oxygen present. The Boudouard reaction, also called the "carbon monoxide disproportionation reaction," is the range of equilibria between carbon and oxygen that favors solid carbon production, typically with little or no hydrogen present. The Bosch reaction is within a region of equilibria where all of carbon, oxygen, and hydrogen are present under reaction conditions that also favor solid carbon production.

The relationship between the hydrocarbon pyrolysis, Boudouard, and Bosch reactions may be understood in terms of a C—H—O equilibrium diagram, as shown in FIG. 1. The C—H—O equilibrium diagram of FIG. 1 shows various known routes to solid carbon, including carbon nanotubes ("CNTs"). The hydrocarbon pyrolysis reactions occur on the equilibrium line that connects H and C and in the region near the left edge of the triangle to the upper left of the dashed lines. Two dashed lines are shown because the transition between the pyrolysis zone and the Bosch reaction zone may change with reactor temperature. The Boudouard, or carbon monoxide disproportionation reactions, occur near the equilibrium line that connects O and C (i.e., the right edge of the triangle). The equilibrium lines for various temperatures that traverse the diagram show the approximate regions in which solid carbon will form. For each temperature, solid carbon may form in the regions above the associated equilibrium line, but will not generally form in the regions below the equilibrium line. The Boudouard reaction zone appears at the right side of the triangle. In this zone, the Boudouard reaction is thermodynamically preferred over the Bosch reaction. In the region between the pyrolysis zone and the Boudouard reaction zone and above a particular reaction temperature curve, the Bosch reaction is thermodynamically preferred over the Boudouard reaction.

CNTs are valuable because of their unique material properties, including strength, current-carrying capacity, and thermal and electrical conductivity. Current bulk use of CNTs includes use as an additive to resins in the manufacture of composites. Research and development on the applications of CNTs is very active with a wide variety of applications in use or under consideration. One obstacle to widespread use of CNTs has been the cost of manufacture.

U.S. Pat. No. 7,794,690 (Abatzoglou, et al.) teaches a dry reforming process for sequestration of carbon from an organic material. Abatzoglou discloses a process utilizing a 2D carbon sequestration catalyst with, optionally, a 3D dry reforming catalyst. For example, Abatzoglou discloses a two-stage process for dry reformation of an organic material (e.g., methane, ethanol) and $CO_2$ over a 3D catalyst to form syngas, in a first stage, followed by carbon sequestration of syngas over a 2D carbon steel catalyst to form CNTs and carbon nanofilaments. The 2D catalyst may be an active metal (e.g., Ni, Rh, Ru, Cu—Ni, Sn—Ni) on a nonporous metallic or ceramic support, or an iron-based catalyst (e.g., steel), on a monolith support. The 3D catalyst may be of similar composition, or may be a composite catalyst (e.g., $Ni/ZrO_2$—$Al_2O_3$) over a similar support. Abatzoglou teaches preactivation of a 2D catalyst by passing an inert gas stream over a surface of the catalyst at a temperature beyond its eutectic point, to transform the iron into its alpha phase. Abatzoglou teaches minimizing water in the two-stage process or introducing water in low concentrations (0 to 10 wt %) in a reactant gas mixture during the dry reformation first stage.

DISCLOSURE

This disclosure relates generally to catalytic conversion processes for reducing carbon oxides to a valuable solid carbon product, and, in particular, to the use of carbon oxides (e.g., carbon monoxide (CO) and/or carbon dioxide ($CO_2$)) as the primary carbon source for the production of solid carbon products (e.g., buckminsterfullerenes) utilizing a reducing agent (e.g., hydrogen or a hydrocarbon) in the presence of a non-ferrous catalyst. The methods may be used to manufacture solid carbon products in various morphologies and to catalytically convert carbon oxides into solid carbon and water. One of the morphologies that may be formed is single-wall carbon nanotubes.

In some embodiments, a method of reducing a gaseous carbon oxide to a lower oxidation state includes reacting a carbon oxide with a gaseous reducing agent in the presence of a non-ferrous metal catalyst in a non-oxidized state. The catalyst has a surface comprised of grains of a predetermined mean grain size. The reaction proceeds under predetermined conditions of temperature and pressure adapted to produce a solid carbon product.

In certain embodiments hereof, the partial pressure of water in the reaction is regulated by various means, including recycling and condensation of water, to influence, for example, the structure or other aspects of the composition of carbon products produced. The partial pressure of water appears to assist in obtaining certain desirable carbon allotropes.

In certain embodiments, a broad range of inexpensive and readily-available catalysts, including steel-based catalysts, are described, without the need for activation of the catalyst before it is used in a reaction. Iron alloys, including steel, may contain various allotropes of iron, including alpha-iron (austenite), gamma iron, and delta-iron. In some embodiments, reactions disclosed herein advantageously utilize an iron-based catalyst, wherein the iron is not in an alpha phase. In certain embodiments, a stainless steel containing iron primarily in the austenitic phase is used as a catalyst.

Catalysts, including an iron-based catalyst (e.g., steel, steel wool), may be used without a need for an additional solid support. In certain embodiments, reactions disclosed herein proceed without the need for a ceramic or metallic support for the catalyst. Omitting a solid support may simplify the setup of the reactor and reduce costs.

In other embodiments, a structure adapted to facilitate the reaction of a carbon oxide with a reducing agent includes a non-ferrous Bosch-type catalyst in a non-oxidized state configured to promote the reduction of the carbon oxide to a lower oxidation state. The non-ferrous Bosch-type catalyst includes a surface having a plurality of particles of catalyst material. The particles have a preselected mean grain size.

In certain embodiments, a method for utilizing a non-ferrous metallic compound in a reactor to reduce a gaseous carbon oxide includes purging gases in the reactor containing the non-ferrous metallic compound with a gaseous reducing agent and maintaining a predetermined reactor temperature sufficient to reduce oxides present in the metallic non-ferrous compound. A reaction gas mixture comprising the gaseous carbon oxide is introduced into the reactor to form a reaction gas composition at a reaction gas pressure. The reaction gas composition and reaction gas pressure are maintained in the reactor to reduce the gaseous carbon oxide.

Some methods of forming a solid carbon product include reacting a gaseous carbon oxide with a gaseous reducing agent in the presence of a catalyst comprising at least one of nickel, chromium, molybdenum, tungsten, cobalt, and alloys and mixtures thereof. The catalyst has a predetermined grain size selected to control the size and morphology of the solid carbon product.

BRIEF DESCRIPTION OF THE DRAWINGS

Features and advantages of the disclosure will be apparent from reference to the following detailed description taken in conjunction with the accompanying drawings, in which.

MODE(S) FOR CARRYING OUT THE INVENTION

The disclosure includes methods for reducing a carbon oxide to a lower oxidation state. The methods may be used to manufacture solid carbon products in various morphologies, and to convert carbon oxides into solid carbon and water. Solid carbon products may include graphite (e.g., pyrolytic graphite), graphene, carbon black, fibrous carbon, buckminsterfullerenes, single-wall CNTs, or multi-wall CNTs. The type, purity, and homogeneity of solid carbon products may be controlled by the reaction conditions (time, temperature, pressure, partial pressure of reactants, and/or catalyst properties).

Figure 1:
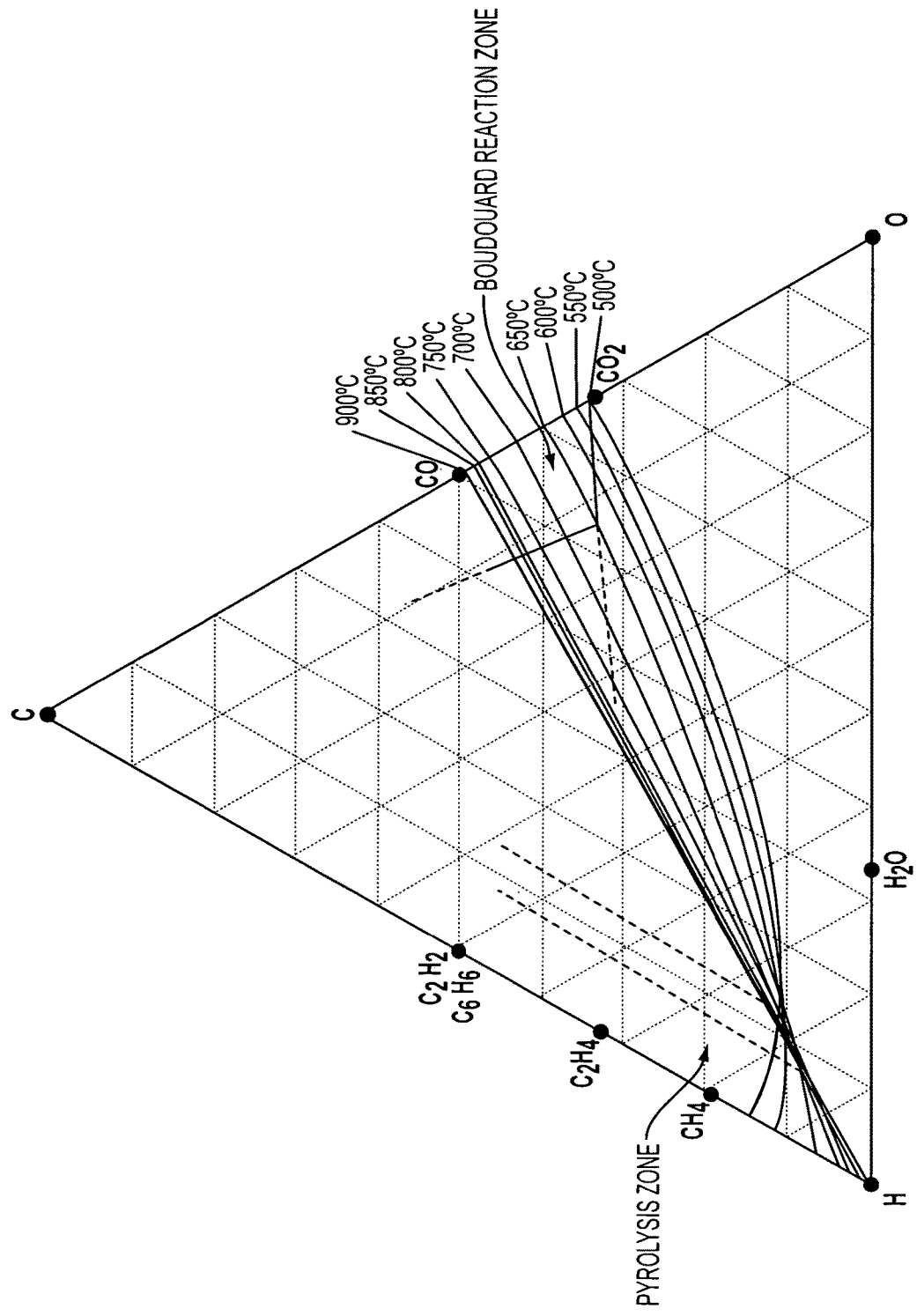
FIG. 1 depicts a C—H—O equilibrium diagram.

The methods, based generally on the Bosch reaction, include reactions in the interior region of the phase diagram shown in FIG. 1 (i.e., the region between the Boudouard reaction zone and the pyrolysis zone), where equilibrium may be established between solid carbon, compounds of carbon, hydrogen and oxygen. The central region of FIG. 1 has several points that are favorable for the formation of CNTs and other forms of solid carbon. The type of solid carbon produced can be selectively controlled through selection and processing of catalysts, reaction gases, and reaction conditions. Thus, the methods described herein provide new routes to the production of valuable solid carbon products such as CNTs.

The methods use two abundant feedstocks: a carbon oxide (e.g., carbon dioxide, carbon monoxide, or a mixture thereof) and a reducing agent. The reducing agent may be a hydrocarbon gas (e.g., natural gas, methane, etc.), hydrogen gas ($H_2$), another reducing gas, or a mixture thereof. A hydrocarbon gas may also be a source of additional carbon. Synthesis gas, referred to herein and in the art as "syngas," includes primarily carbon monoxide and hydrogen, and syngas has both the carbon oxide and the reducing gas in a mixture. Syngas may be used as all or a portion of the reaction gas mixture.

The reduction processes described herein generally result in the formation of at least one solid carbon product and water. The water may subsequently be condensed. Latent heat of the water may be extracted for heating purposes or as part of a low-pressure power extraction cycle. The water may be a useful co-product used for another process.

The methods disclosed herein use carbon oxides (e.g., carbon dioxide) as an economically valuable feedstock. In many industrial processes, carbon dioxide is an undesirable waste product, and may have disposal costs (e.g., for sequestration). Use of carbon dioxide as an input for solid carbon production may reduce or eliminate disposal costs, and may simultaneously convert carbon oxides to a salable product. Thus, methods disclosed herein may be incorporated with fossil fuel combustion processes. This combination may be beneficial because the formation of solid carbon products by such processes may be more economical than conventional separation and sequestration methods.

Carbon dioxide is present in many natural gas deposits at various concentrations, such as at concentrations of up to 5% by volume, up to 20% by volume, up to 60% by volume, or even higher. Other compounds, such as $H_2S$, $SO_2$, and other sulfur compounds are often present in natural gas. Removal of sulfur-containing compounds is often done at a well site to form "sweet gas" (i.e., gas with little or no sulfur content). Removal of carbon dioxide before the natural gas is delivered to a consumer may be effectively accomplished via the techniques disclosed herein.

Solid carbon products such as buckminsterfullerene and carbon nanotubes may be formed by the catalytic conversion of carbon oxides to solid carbon and water. Carbon oxides may be derived from various sources, such as the atmosphere, combustion gases, process offgases, well gas, and other natural and industrial sources of carbon oxides. The carbon oxides may be separated from these sources and concentrated as needed, such as by amine absorption and regeneration.

The methods herein generally apply the Bosch reactions, such as the Bosch reaction of carbon dioxide with hydrogen to form solid carbon from carbon dioxide:

$$CO_2 + 2H_2 \leftrightarrow C_{(s)} + 2H_2O \qquad \text{(Equation 1)}.$$

The type and quality of solid carbon produced may vary based on the type of catalysts, gas mixtures, and process variables (e.g., temperature, pressure, concentration of reactants and retention times). Solid carbon may be produced in many different morphologies through the carbon oxide reduction process disclosed herein. Some of the solid carbon morphologies that may be produced include graphite (e.g., pyrolytic graphite), graphene, carbon black, fibrous carbon, buckminsterfullerene, single-wall CNTs, multi-wall CNTs, platelets, or nanodiamond. The reactions occur in the interior region of the triangular equilibrium diagram shown in FIG. 1.

The Bosch reactions use hydrogen or another reducing agent to reduce carbon oxides to solid carbon and water. The reactions may proceed in the presence of a non-ferrous catalyst at temperatures in excess of approximately 650° C., such as in excess of about 680° C. When the solid carbon is in the form of CNTs, Equation 1 is exothermic (heat producing) and releases approximately 24.9 kcal/mol at 650° C. (i.e., ΔH=−24.9 kcal/mol). Equation 1 is reversible, and solid carbon may be oxidized by water to form carbon dioxide. Although reaction temperatures above about 650° C. may be used to produce solid carbon nanotubes, if the temperature is too high, the rate of the reverse reaction of Equation 1 increases, and the net rate of reaction of carbon dioxide is lower. The equilibrium of Equation 1 generally shifts to the left as temperature increases.

The Bosch reactions are believed to be two-step reactions. In the first step of Equation 1, carbon dioxide reacts with hydrogen to create carbon monoxide and water:

$$CO_2 + H_2 \leftrightarrow CO + H_2O \qquad \text{(Equation 2)}.$$

Equation 2 is slightly endothermic at 650° C., requiring a heat input of about 8.47 kcal/mol (i.e., ΔH=+8.47 kcal/mol). In the second step of the reaction shown in Equation 1, carbon monoxide reacts with hydrogen to form solid carbon and water:

$$CO + H_2 \leftrightarrow C_{(s)} + H_2O \quad \text{(Equation 3)}.$$

Equation 3 may occur with stoichiometric amounts of reactants, or with excess $CO_2$ or $H_2$. Equation 3 is exothermic at 650° C., releasing 33.4 kcal/mol ($1.16 \times 10^4$ joules/gram of $C_{(s)}$) when CNTs are formed (i.e., ΔH=−33.4 kcal/mol). Values of ΔH for Equation 3 may be calculated for other carbon products by the difference between the ΔH value for Equation 1 for that particular carbon product and the ΔH value for Equation 2.

The Bosch reactions may be used to efficiently produce solid carbon products of various morphologies on an industrial scale, using carbon oxides as the primary carbon source. The Bosch reactions may proceed at temperatures from about 450° C. to over 2,000° C. The reaction rates typically increase in the presence of a catalyst.

A reducing gas mixture of one or more of the commonly available hydrocarbon gases such as lower hydrocarbon alkanes (e.g., methane, ethane, propane, butane, pentane, and hexane), including those found in natural gas, may be economical in some applications. In one embodiment, the reducing gas comprises methane and releases heat in an exothermic reaction in the presence of a non-ferrous catalyst and under reaction conditions optimized for the particular desired type of solid carbon:

$$CH_4 + CO_2 \leftrightarrow 2C_{(s)} + 2H_2O \quad \text{(Equation 4)}.$$

Equation 4 is believed to be a two-step reaction, including the following steps:

$$CH_4 + CO_2 \leftrightarrow 2CO + 2H_2 \quad \text{(Equation 5); and}$$

$$CO + H_2 \leftrightarrow C_{(s)} + H_2O \quad \text{(Equation 6)}.$$

In the presence of limited oxygen, hydrocarbons may react to form carbon monoxide, carbon dioxide, and water, as well as small hydrocarbons and hydrogen. Higher concentrations of oxygen may limit the amount of solid carbon formed. Therefore, it may be desirable to restrict the amount of oxygen present in reaction systems to optimize the production of solid carbon. Additionally, the presence of oxygen may poison catalysts, thereby reducing the reaction rates. Thus, the presence of oxygen may reduce the overall production of solid carbon products.

Carbon oxides used in the formation of solid carbon products may be the product of combustion of hydrocarbons, or may be from some other source. Carbon oxides may be injected with a reducing agent into a preheated reaction zone at a desired reaction temperature.

The reactions typically occur in the presence of a catalyst, which may be predominately composed of a non-ferrous metal. The catalyst composition, method of formation, catalyst grain size, and catalyst grain boundary conditions may influence the type, purity, and homogeneity of the solid carbon product. The reaction conditions, including the temperature and pressure of the reactor and the residence time of the reaction gases may be controlled to obtain solid carbon products having desired characteristics. The reactor feed gas mixture and reaction product are typically passed through the reactor and a condenser. The condenser may remove excess water and control the partial pressure of the water vapor in the reaction gas mixture.

The reaction kinetics favorable to the formation of the desired species of solid carbon may be established through the use of suitable catalysts. In certain embodiments, a carbon oxide is reduced in a reactor or catalytic converter containing a non-ferrous catalyst. As used herein, the term "non-ferrous catalyst" means and includes a catalyst including elements other than iron. Thus, a non-ferrous catalyst includes catalyst materials in which iron is present in combination with other elements or in which iron is not present. Typical catalysts include metals selected from groups 2 through 15 of the periodic table, such as from groups 5 through 10 (e.g., nickel, molybdenum, chromium, cobalt, tungsten, manganese, ruthenium, platinum, iridium, etc.), actinides, lanthanides, alloys thereof, and combinations thereof. Note that the periodic table may have various group numbering systems. As used herein, group 2 is the group including Be, group 3 is the group including Sc, group 4 is the group including Ti, group 5 is the group including V, group 6 is the group including Cr, group 7 is the group including Mn; group 8 is the group including Fe, group 9 is the group including Co, group 10 is the group including Ni, group 11 is the group including Cu, group 12 is the group including Zn, group 13 is the group including B, group 14 is the group including C, and group 15 is the group including N. For example, non-ferrous catalysts include nickel, cobalt, chromium, molybdenum, tungsten, and alloys thereof. Minor amounts of iron may be present in some alloys.

The non-ferrous catalyst may have a grain size proportional to the diameter of a desired carbon product. Non-ferrous catalysts may be in the form of nanoparticles or in the form of domains or grains and grain boundaries within a solid material. Non-ferrous catalysts may be selected to have a grain size related to a characteristic dimension of a desired diameter of the solid carbon product (e.g., a CNT diameter). In some embodiments, catalyst powder may be formed in or near the reaction zone by injecting a solution as an aerosol (i.e., a distribution of particles), such that upon evaporation of a carrier solvent, a selected particle size distribution results. Alternatively, powdered catalyst may be entrained in a carrier gas and delivered to the reactor. Entrainment may require the catalyst particles to be in relatively fine particles to effectively be transported by a carrier gas. By selecting the catalyst and the reaction conditions, the process may be tuned to produce selected morphologies of solid carbon product.

In the presence of a non-ferrous catalyst, reduction of carbon oxides typically proceeds to completion in under five seconds, and the reaction time can be as short as a few tenths of a second under the right process conditions and non-ferrous catalyst. Generally, shortening the reaction time or increasing the flow rate of the reactants through the reactor has the effect of decreasing the diameter of CNTs formed.

Non-ferrous catalysts may be provided on catalyst supports. A catalyst support can be any metal oxide or other material that can withstand the reaction conditions. For example, a support material may be selected to withstand elevated reaction temperatures in a reactor configured CNT synthesis. In some embodiments, catalyst support materials include $Al_2O_3$, $SiO_2$, MgO, $ZrO_2$, molecular sieve zeolites, and other oxidic supports. To control the properties of the solid carbon products formed on such catalysts, the metal loading on the catalyst support may be controlled, such as by leaving a portion of the surface of the support free of catalyst material. In some embodiments, catalyst materials may be provided without catalyst supports; thereby simplifying the preparation and reducing the cost of producing the solid carbon products.

For example, catalyst materials may be formed from catalyst precursors. Catalyst precursors may be mixed and dissolved in water or another solvent to make a solution of the catalyst precursors. The resulting solution may be dried to form the catalyst. In some embodiments, the solution may be sprayed to form an aerosol in a heated chamber, such as by atomization in a flow of gas, direct spraying of the solution through a nozzle, electrostatic spraying, dispersing the solution from the surface of a rotating fixture, and combinations thereof. In some embodiments, catalyst precursors may be combusted or otherwise decomposed by disposing a solution of catalyst precursor on a heated surface, allowing the solvent to evaporate, then allowing the catalyst precursor to combust. Other methods include creating the catalyst by a vacuum-deposition process at high vacuum (e.g., $10^{-6}$ to $10^{-8}$ Torr) and high temperatures (e.g., 900° C. to 1300° C.). Catalysts may be supplied as metal nanoparticles supported on solid supports via secondary dispersion and extraction. The catalyst may be mobilized, as in a fluidized bed, or may be stationary in the reactor as the carbon-containing gases flow through the reactor and react with the catalyst.

The catalyst particles may be nucleating sites from which CNTs grow. The catalyst particles may be domains or grains in a piece of metal material or discrete nanoparticles of catalytic metal deposited on an inert substrate (e.g., a quartz disk). The size of CNTs may be proportional to the size of the nucleating site. The ratio between a catalyst particle size and the diameter of a CNT formed thereon may be from about 1.2 to about 1.6. One possible theoretical basis for the correlation of particle size and CNT diameter is disclosed in Nasibulin et al., *Correlation Between Catalyst Particle and Single-walled Carbon Nanotube Diameters*, 43 CARBON 2251-57 (2005), though Naisbulin's estimate of 1.6 is higher than was typically experimentally observed in the experiments described herein.

Nucleation of a catalyst may be promoted by the use of light photons (e.g., pulsed laser light, X-ray radiation, ultraviolet, near and far infrared, etc.) such as by passing electromagnetic pulses through the catalyst or through catalyst precursors. This use of laser light may enhance the size uniformity of the resulting catalyst nanoparticles.

During reduction of carbon oxides to form CNTs, such as in the reactions shown in Equations 1 through 6, above, each CNT formed may raise a particle of catalyst material from a surface of bulk catalyst material. Without being bound by any particular theory, it appears that the catalyst surface is slowly consumed by the formation of CNTs due to embedding a particle of the catalyst material into growth tips of the CNTs. The material on which a CNT grows may not be considered a catalyst in the classical sense, but is nonetheless referred to herein and in the art as a "catalyst," because the carbon is not believed to react with the material. Furthermore, CNTs may not form at all absent the catalyst.

As an alternative theory, the reaction may occur because of the presence of carbon in the catalyst material. Without being bound by any particular theory, carbon may act as a nucleating site for the reaction to proceed. Thus, the carbon in the catalyst material may promote reactions to reduce carbon oxides to solid carbon. As layers of solid carbon are formed, the newly formed carbon material may operate as nucleating sites for subsequent layers of solid carbon products.

The catalyst may include any of groups 5 through 10 of the periodic table (e.g., nickel, molybdenum, chromium, cobalt, tungsten, manganese, ruthenium, platinum, iridium, etc.), as well as lanthanides, actinides, alloys, and other combinations thereof. Catalysts formed from mixtures (e.g., alloys) of these materials may be designed to yield the desired solid carbon morphology.

Various commercially available grades of nickel, molybdenum, platinum, chromium, cobalt, and tungsten, and alloys thereof may be useful as catalysts. Various grades of chromium-, molybdenum-, cobalt-, tungsten-, or nickel-containing alloys or superalloys may be used, for example materials commercially available from Special Metals Corp., of New Hartford, N.Y., under the trade name INCONEL®, or materials commercially available from Haynes International, Inc., of Kokomo, Ind., under the trade name HASTELLOY® (e.g., HASTELLOY® B-2, HASTELLOY® B-3, HASTELLOY® C-4, HASTELLOY® C-2000, HASTELLOY® C-22, HASTELLOY® C-276, HASTELLOY® G-30, HASTELLOY® N, or HASTELLOY® W). The catalyst may be in solid form, such as plates, cylinders, pellets, spheres of various diameters (e.g., as steel shot), or combinations thereof. In some embodiments, catalyst materials may include a stainless steel, such as 15-5 stainless steel, an alloy having 14.0-15.5% Cr, 3.5-5.5% Ni, 2.5-4.5% Cu, 0.15-0.45 Nb+Ta, up to 1.0% Mn, up to 1.0% Si, up to 0.30% S, up to 0.07% C, and up to 0.04% P.

In one embodiment, substantially spherical catalyst material may be used in conjunction with a fluidized-bed reactor. The morphology of CNTs grown on metal catalyst may be dependent on the chemistry of the metal catalyst and the way the catalyst was processed. For example, CNT morphology may be related to grain size and grain boundary shapes within the metal. For example, the characteristic size of these features may influence the characteristic diameter of CNTs formed in the presence of such metal catalysts.

The grain size of a catalyst material may at least partially determine the size of the CNT product. Metals with smaller grain sizes may produce smaller diameter CNTs. The grain size may be a function both of the chemistry of the metal catalyst and the heat-treating methods under which the grains are formed. As used herein, the term "grain size" of a non-ferrous catalyst refers to the mean, median, or mode grain diameter or width of the non-ferrous catalyst surface. For example, cold rolled, hot rolled, precipitation hardened, annealed, case hardened, tempered, or quenched metals may be selected as the catalyst depending on the desired morphology of the solid carbon.

The grain size of the metal crystalline surface may also at least partially determine the size of the CNT product. The grain distribution, including the crystalline grain size and grain boundaries, may be controlled by methods known in the art. For example, grain size may be controlled by controlling nucleation of the metal, such as by grain refinement or inoculation. Inoculants for promoting nucleation may include titanium, boron, aluminum titanium ($Al_3Ti$), titanium diboride ($TiB_2$), etc.

In general, the grain structure of a metal surface may be changed by methods known in the art. For example, a metal structure may be heated to a temperature sufficient to recrystallize the metal structure to form multiple randomly oriented grains. Alternatively, the metal may be heat-treated or annealed to change the grain structure, grain boundary, and grain size. For example, the metal may be annealed by heating the metal to a temperature above its recrystallization temperature, maintaining the temperature for a period of time, then cooling the metal. As another example, metal may be annealed by heating it for a period of time to allow grains within the microstructure of the metal to form new grains through recrystallization.

Recrystallization is a process in which a metal may be plastically deformed, annealed, or otherwise heat-treated. When the metal is heated, the heat-treatment affects grain growth in the metal structure. The size of a crystalline structure may vary with the temperature above the critical temperature and the time at that temperature. Additionally, a faster cooling rate from the recrystallization temperature may provide a larger maximum undercooling and a greater number of nucleation sites, thus producing a finer-grained metal. Thus, in one embodiment, crystal grain size—and thus, nanotube size—may be controlled by nucleation of the catalyst metal, the temperature of the catalyst heat-treatment, the length of time the catalyst metal is above the crystallization temperature, and the cooling process of the metal.

To form catalyst particles having a relatively finer mean grain size, the catalyst material may be heated to a selected temperature, followed by rapid cooling. In some embodiments, CNT diameter and morphology may be controlled by controlling the method of formation of the catalyst. For example, the use of a cold-rolled metal as a catalyst material may result in a different CNT morphology than the use of hot-rolled metal as a catalyst material.

The grain size and grain boundary of catalyst material may be changed to control the size and morphology of the solid carbon product. For example, catalyst material may be annealed at a temperature range from about 600° C. to about 1,100° C., from about 650° C. to about 1,000° C., from about 700° C. to about 900° C., or from about 750° C. to about 850° C. The resulting grain size may be from about 0.1 µm to about 50 µm, from about 0.2 µm to about 20 µm, from about 0.5 µm to about 5 µm, or from about 1.0 µm to about 2.0 µm. Various heat-treating, annealing, and quenching methods are known in the art of metal preparation, grain growth techniques, and grain refinement. Any of these methods may be used to alter the grain size and grain boundaries of the catalyst surface to control the size and morphology of the resulting solid carbon product.

The catalyst surface may be reduced prior to the reaction of carbon oxides. For example, a reducing gas mixture may be introduced into a reactor maintained at a selected temperature, pressure, and concentration to reduce the surface of the catalyst (i.e., to react with or remove oxidized materials). The grain size and grain boundary of the catalyst material may be controlled by heating the catalyst surface and reducing any oxides at the surface. Maintaining the catalyst surface in a reducing environment for longer periods of time may result in relatively larger grain sizes, and shorter reducing treatments may result in relatively smaller grain sizes. Similarly, lower reducing temperatures may result in smaller grain sizes. Oxidation and subsequent reduction of the catalyst surface may alter the grain structure and grain boundaries. The oxidation and/or reduction temperatures may be in the range from about 500° C. to about 1,200° C., from about 600° C. to about 1,000° C., or from about 700° C. to about 900° C. The resulting grain size may range from about 0.1 µm to about 500 µm, from about 0.2 µm to about 100 µm, from about 0.5 µm to about 10 µm, or from about 1.0 µm to about 2.0 µm.

The grain boundary and the mean grain size of the catalyst surface may be controlled, for example, by sputtering (ion bombardment). As used herein, the term "sputtering" refers to the removal of atoms from a surface by the impact of an ion, neutral atoms, neutrons, or electrons. Sputtering may be used to generate surface roughness of a particular grain boundary on the surface of the catalyst. Grain boundaries formed by sputtering may be advantageous for the reduction reactions of carbon oxides. Sputtering may be used to remove atoms from the surface of the metal catalyst. The ion beam energy may determine the resulting grain structure of the metal catalyst surface. For example, in alloys or oxidized metal surfaces, the energy of the ion beam may determine which atoms on the metal surface are removed. The energy applied during sputtering may be selected to remove only a particular atom in certain alloys. Thus, sputtering may result in a grain boundary having atoms or particles with relatively high surface-binding energies on the surface without atoms that may be removed by a low-energy ion beam. Increasing the ion beam energy may remove atoms and particles with higher surface binding energies from the metal surface. Thus, sputtering may be used to produce surfaces having controlled grain boundaries, mean grain sizes, and grain patterns. Sputtering may be used to control the size and morphology of the solid carbon product by controlling the mean grain size, grain boundary, or grain patterns of the metal catalyst surface.

In some embodiments, the catalyst surface may be controlled by chemical etching to form a catalyst surface of a selected mean grain size and with a selected grain boundary. Etching processes include swabbing, immersion, spraying, or other methods. The type of etchant, the strength of the etchant, and the etching time may affect the surface of the metal catalyst. For example, to etch a non-ferrous metal such as nickel-containing alloys or superalloys, an etchant may include a solution of 5 grams of copper(II) chloride ($CuCl_2$) with 100 ml of ethanol and 100 ml of hydrochloric acid. In some embodiments, nitric acid in various concentrations may be used to etch non-ferrous catalysts. If a non-ferrous catalyst includes cobalt, the catalyst may be etched in a solution of iron(III) chloride ($FeCl_3$) in hydrochloric acid, which may result in removing the cobalt. Thus, use of such an etchant may selectively etch the cobalt from a cobalt alloy, leaving other metals on the surface of the catalyst. In this manner, the grain boundary of the surface may be selectively controlled, thereby enabling control of properties of the solid carbon product formed thereon.

Catalyst material may be secured to a structure and placed in a reactor. Alternatively, the catalyst may be pulverized or ball-milled. The pulverization or ball-milling process may affect the catalyst grain size and grain boundary, thereby affecting the morphology of CNTs formed. The pulverized or ball-milled non-ferrous catalyst may be collected and sieved to increase the uniformity of the catalyst particle size. If the catalyst is in powder or particulate form, the catalyst may be carried into the reactor by a carrier gas or a reactant gas. Catalyst in particulate form may also be used in a fluidized-bed reactor. Dynamic action of metal catalyst particles within the fluidized bed may continually cause fresh catalyst surfaces to be exposed as carbon nanotubes are formed and spalled off of the catalyst particle surface. Catalyst particles may be configured to increase the surface area of the catalyst in contact with the carbon oxide gases and the reducing gases as the reaction proceeds.

Reaction temperatures may depend on the composition of the catalyst or on the size of the catalyst particles. Catalyst materials having small particle sizes tend to catalyze reactions at lower temperatures than the same catalyst materials with larger particle sizes. For example, the Bosch reaction may occur at temperatures in the range of approximately 400° C. to 800° C. for iron-based catalysts, depending on the particle size and composition and the desired solid carbon product. In general, graphite and amorphous solid carbon form at lower temperatures, and CNTs form at higher temperatures. CNTs may form at temperatures above about 680° C. In general, the reactions described herein proceed at a wide range of pressures, from near vacuum, to pressures of 4.0 MPa (580 psi) or higher. For example, CNTs may form in pressure ranges of from about 0.28 MPa (40 psi) to about 6.2 MPa (900 psi). In some embodiments, CNTs may form at pressures from about 0.34 MPa (50 psi) to about 0.41 MPa (60 psi), or at a pressure of about 4.1 MPa (600 psi). Typically, increasing the pressure increases the reaction rate.

Under some conditions, carbon forms a buckysphere around a particle of catalyst, which may partially merge with the tube structure of a CNT, forming a nanobud. The introduction of additional catalyst material after the formation of CNTs may induce the formation of CNTs having branched or bud morphology.

When using a solid catalyst, such as a wafer of metal catalyst, CNTs appear to grow in a series of generations. Without being bound by any particular theory, it appears that reaction gases interact with an exposed surface of catalyst, and CNTs begin to grow on the surface. As the growth continues, neighboring CNTs become entangled and lift particles of the catalyst off the surface, exposing a new layer of catalyst material to the reaction gases. As each layer of catalyst material lifts off of the surface, the CNTs become entangled in clumps that resemble "pillows" or cockleburs under magnification.

A fluidized-bed reactor may take advantage of the detachment of CNTs as a separation means. That is, the flow of gases in a fluidized-bed reactor may be selected such that formations of CNTs are entrained in the gas flow, elutriated from the catalyst surface, and subsequently harvested from the gas mixture leaving the reactor.

Without being bound by any particular theory, carbon may act as a nucleating site for solid carbon. For example, as a component of a catalyst material, carbon may promote the reaction. As the reaction continues and each layer of solid carbon is formed, newly formed carbon may act as a nucleating site for subsequent layers of solid carbon. Thus, in one embodiment, the size and morphology of the solid carbon product is controlled by selecting and controlling the carbon composition of the catalyst metal.

A catalyst composition in which catalyst layers are consumed during a reaction may expose fresh surfaces of catalyst, allowing for the formation of solid carbon products to continue uninterrupted. Without being bound by any particular theory, such a mechanism appears to occur, for example, when rusted steel is used as the solid metal catalyst.

Figure 4:
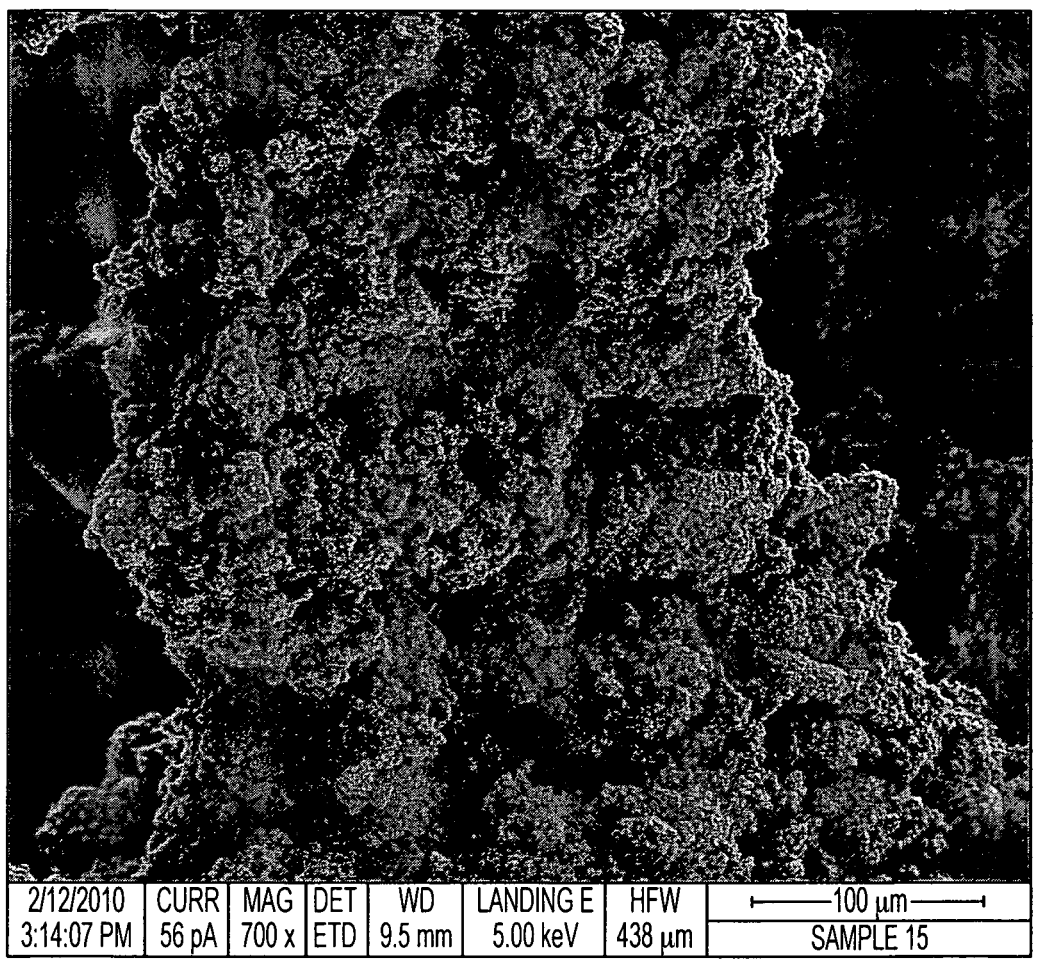
FIG. 4 is a top view of the forest of FIG. 3, shown at 700× magnification.
Figure 19:
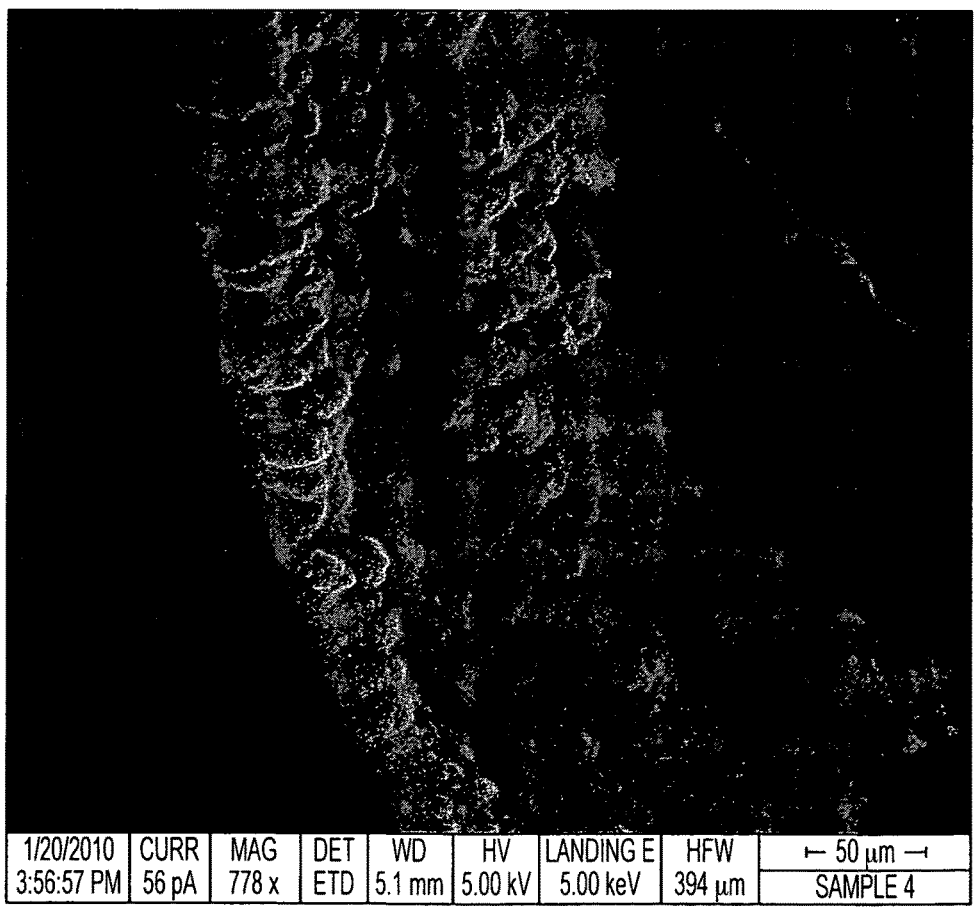
FIG. 19 is an image of the fibrous growth shown in FIG. 18, at 778× magnification, showing the "pillow" morphology as a substructure.

As depicted in, for example, FIGS. 4 and 19, pillow morphology is characterized by the presence of CNTs that are entangled in clusters. The pillows appear as bulbous or billowing conglomerations of nanotubes, similar to the appearance of the outer periphery of cumulus clouds. The pillows may include carbon nanotubes of various diameters, lengths, and types. The pillows may appear in the form of discrete units in forests, piles, and fibers grown on a substrate. Metals of different compositions and forms may yield carbon nanotube pillows under a wide range of reaction gas mixes and reaction temperatures.

CNT pillow formations may form into larger agglomerations. For example, if a sample of carbon nanotube pillows is gently stirred or shaken in ethanol, the pillows agglomerate and interlock so that the boundaries of the pillows become indistinct. The agglomerations may be larger and stronger than the individual pillow formations. The pillow morphology of CNTs may be particularly suitable for forming various types of carbon nanotube paper, felts, electrodes, etc.

Various reactor designs may facilitate the formation and collection of desired solid carbon products. For example, a reactor may be designed to increase the surface area of a non-ferrous catalyst exposed to carbon oxides and reducing gases. In some embodiments, the reactor may be designed to accommodate catalyst particles having a relatively small mean diameter, thereby increasing the exposed catalyst surface area per unit mass of catalyst material. The reactor may be configured to hold layered sheets of catalyst material. In such embodiments, the exposed surface area per unit volume may be optimized, such as in configurations similar to radiator configurations. The reactor may also be designed to promote the breaking off of the solid carbon products from the non-ferrous catalyst surface, such as by the flow of reaction gases. The reactor may further be designed to promote elutriation of solid carbon products out of the reactor with excess reactant gases or a carrier gas, enabling continuous operation of the reactor.

Aerosol and fluidized-bed reactors are well suited for high-volume continuous production of solid carbon products. A fluid-wall reactor has the advantages of providing for the introduction of various substances (catalysts, additional reactants) and of minimizing or eliminating the accumulation of solid carbon products on reactor walls.

In some embodiments, a non-ferrous catalyst material may be conditioned before reduction of carbon oxides. A reactor volume may be purged or displaced by a reducing agent, and the temperature of the reactor may be controlled to reduce any oxides on the catalyst surface. The reactor temperature, the reducing time, and the reducing gas temperature and pressure may be controlled to control the grain size and grain boundary of the catalyst surface, as described above. Altering the grain size and grain boundary of the catalyst surface may alter the size and morphology of the carbon nanotube product. For example, the reducing gas and reactor may range from about 500° C. to about 1,200° C., from about 600° C. to about 1,000° C., or from about 700° C. to about 900° C. The catalyst may be exposed to the reducing agent for a period of time sufficient to reduce any oxides. After conditioning of the catalyst, a reaction gas mixture including a carbon oxide may be introduced into the reactor, and the reactor temperature and pressure may be maintained to suitable conditions for the reduction of the carbon oxide to form a desired solid carbon product.

In some embodiments, the reactor may be an aerosol reactor in which the catalyst is formed in a gas phase or in which the catalyst is preformed and selected for a specific size distribution, mixed into a liquid or carrier gas solution, and then sprayed into the reactor (e.g., via electrospray). The catalyst may then remain distributed in the gas phase or be deposited on solid surfaces in the reaction zone for the growth phase of the carbon product. The catalyst may subsequently transport the product out of the reaction zone. In another embodiment, one or more reactors may be fluidized-bed reactors in which the catalyst or catalyst-coated particles are introduced into the reactor and the solid carbon product is grown on the surface of the particles. The solid carbon may be either elutriated in the reactor, and carried out of the reactor entrained in the reaction gases, or the catalyst particles may be harvested and the solid carbon removed from the surface.

In some embodiments, a reactor is configured such that reactant gases enter at or near the top of the reactor and exit at or near the bottom of the reactor. The catalyst may be placed in the reactor to maximize the surface area of exposed catalyst per unit volume of reactor. For example, the catalyst may be in thin sheets, and the reactor may be configured to receive multiple sheets of catalyst material. The catalyst sheets may be arranged such that reactant gases flow past each sheet of catalyst material before exiting the reactor. For example, the catalyst sheets may be staggered in the reactor, such that the reactant gases flow across a first plate at the top of the reactor, past the first plate at the side of the reactor, then past the bottom of the first plate and the top of the second plate toward an opposite side of the reactor. This process may continue as the reactant gases pass through the reactor. The solid carbon product may be collected at the bottom of the reactor. The downward flow of the reactant gases and downward gravitational forces may promote the removal of solid carbon products from the surface of the catalyst.

The reactors may be batch reactors in which the catalyst is either a fixed solid surface or is mounted on a fixed solid surface (e.g., catalyst nanoparticles deposited on an inert substrate), with the solid carbon grown on the catalyst, and the catalyst and solid carbon product periodically removed from the reactor. Alternatively, the reactors may be continuous, wherein a solid catalyst or catalyst mounted on a solid substrate passes through a flowing gas stream, the resulting solid carbon product is harvested, and the solid surface is reintroduced to the reactor. The solid substrate may be the catalyst material (e.g., a solid piece of a chromium-, molybdenum-, cobalt-, or nickel-containing alloy or superalloy) or a surface on which the catalyst is mounted.

In one embodiment, a fluidized-bed reactor may be designed to retain the catalyst while allowing the solid CNT product to be entrained in the gas flow and to be lofted out of the reaction zone upon reaching a desired size. The shape of the reactor, the gas flow rates, or shape and flow rates in combination may control the residence time of the elutriates and the corresponding size of the solid carbon product (such as the length of the carbon nanotubes).

In one embodiment, particles in a fluidized-bed reactor are of a substantially uniform diameter. The diameter of the catalyst in the fluidized bed may be chosen based on the particular reactor configuration, the flow rate of the reactants through the reactor, the shape of the catalyst, the density of the catalyst, and the density of the reactant gases and any inert carrier gases. The diameter of the catalyst particles may be chosen to avoid entrainment of the catalyst with the reaction product and also to avoid channeling of the reactants through the bed. A diffuser or sparger may distribute the gaseous reactants to provide a uniform flow pattern through the bed particles and limit or prevent channeling of gases through the particle bed.

When the catalyst is a sheet or plate over an object of manufacture, the entire surface of the object of manufacture need not be uniformly coated with the carbon product. The carbon deposition area on the solid surface optionally may be limited to one or more regions by masking, or by selectively depositing the catalyst to promote the formation of the solid carbon on portions of the solid surface.

Solid carbon products may be collected and separated from the gas stream or from solid surfaces on which they form, such as by elutriation, centrifugation, electrostatic precipitation, or filtration. The techniques for separation of the solid product from the gas stream and the catalyst may depend on the type of reactor. For example, the solid carbon product may be harvested directly from a gas stream using electrophoretic or thermophoretic collectors, filters, etc., or by collecting the elutriates as they exit the reactor. After harvesting solid carbon products, gases may be recycled through the reactor. Combining the catalytic conversion process with a separation process may be beneficial because such a carbon separation and sequestration unit may be more economical than conventional separation and sequestration methods.

The catalytic converters described herein may use carbon oxides at relatively low pressures, so that equipment and costs associated with compression, liquefaction, and transport may be reduced. Furthermore, the heat produced in the catalytic converters may provide at least some of the process heat for the separation process. For example, a separation process, such as amine absorption, may receive at least part of the heat required for desorption from the catalytic converter, and deliver low pressure carbon oxide gases to the catalytic converter.

In one embodiment, a cyclone separator is used to separate and collect the solid carbon product. For a solid catalyst or solid surface-mounted catalyst, the solid carbon product may be scraped or otherwise abraded from the surface of the solid carrier material. Alternatively, when using a solid catalyst, the solid carbon product may be rinsed off a surface with a solvent for further processing.

In some cases, it may be beneficial to remove the solid carbon product from the reaction gas mixture prior to cooling (e.g., by withdrawing the solid carbon product from the reactor through a purge chamber wherein the reaction gases are displaced by an inert purging gas such as argon, nitrogen, or helium). Purging prior to cooling helps reduce the deposit or growth of undesirable morphologies on the desired solid carbon product during the cooling process.

In aerosol or fluidized-bed reactors, the residence time in the growth zone may be controlled by one or more forces (such as gravitational, electromagnetic, or centrifugal forces) counteracting the motion of the gas stream. These forces counterbalance the gas flow to help control the residence time, so that the size of the solid carbon product may be controlled.

In another embodiment, catalysts are introduced into an aerosol reactor by an electrospray process. Coulomb forces separate a suspension or solution containing a catalyst powder into small droplets from which individual particles form. The electrospray helps keep the particles separated so that they do not tend to clump or fuse. The electrospray also tends to charge the resulting carbon particles and make them easier to harvest from the aerosol using electrostatic collectors.

In aerosol reactors, catalyst particles may be sprayed into a carrier gas or fluid for transport into the reaction zone. The catalyst may be preconditioned in a catalyst-conditioning process prior to mixing with the reaction gases. Catalyst conditioning by heating in an inert carrier gas may promote the growth of specific chiralities of single wall CNTs. For example, heating catalyst material in a helium environment may promote the growth of chiralities of CNTs having metallic properties. One or more substances may be introduced into the reaction zone to modify the physical properties of the desired solid carbon product, either through incorporation in the solid carbon product, or by surface deposition on the solid carbon product.

The physical properties of the solid carbon products may be substantially modified by the application of additional substances to the surface of the solid carbon. Modifying agents (e.g., ammonia, thiophene, nitrogen gas, and/or surplus hydrogen) may be added to the reaction gases to modify the physical properties of the resulting solid carbon. Modifications and functionalizations may be performed in the reaction zone or after the solid carbon products have been removed.

Some modifying agents may be introduced into the reduction reaction chamber near the completion of the solid carbon formation reaction by, for example, injecting a water stream containing a substance to be deposited, such as a metal ion. The substances may also be introduced as a component of a carrier gas. For example, surplus hydrogen may cause hydrogenation of a carbon lattice in some CNTs, causing the CNTs to have semiconductor properties.

Small amounts of substances (e.g., sulfur) added to the reaction zone may be catalyst promoters that accelerate the growth of carbon products on the catalysts. Such promoters may be introduced into the reactor in a wide variety of compounds. Such compounds may be selected such that the decomposition temperature of the compound is below the reaction temperature. For example, if sulfur is selected as a promoter for an iron-based catalyst, the sulfur may be introduced into the reaction zone as a thiophene gas, or as thiophene droplets in a carrier gas. Examples of sulfur-containing promoters include thiophene, hydrogen sulfide, heterocyclic sulfides, and inorganic sulfides. Other catalyst promoters include volatile lead, bismuth compounds, ammonia, nitrogen, excess hydrogen (i.e., hydrogen in a concentration higher than stoichiometric), and combinations of these.

In some embodiments, a catalyst particle is removed from the surrounding matrix as a CNT grows, and the catalyst particle may become embedded in one of the ends of the CNT. Thus, some of the catalyst material may be physically removed during the reaction, and the catalyst may need to be continually replenished. The material on which a CNT grows may not be considered a catalyst in the classical sense, but is nonetheless referred to herein and in the art as a "catalyst," because the carbon is not believed to react with the material. Furthermore, CNTs may not form at all absent the catalyst. In scanning electron microscope images, catalyst ends appear significantly larger (e.g., 1.2 to 1.6 times the diameter) than the tubes that grow from them. This difference may be due to a carbon shell surrounding the catalyst, it may be indicative of a fundamental relationship between the catalyst particle size and that of the CNT that grows from it, or it may be due to some other factor or coincidence. Whatever the reason, one way to control the size of the CNTs appears to be through the control of the catalyst particle size, or grain size, keeping the catalyst particle size somewhat larger than the desired nanotube size.

The methods disclosed herein may be incorporated into power production, chemical processes, and manufacturing processes in which the combustion of a primary hydrocarbon fuel source is the primary source of heat. The resulting combustion gases from such processes contain carbon oxides that may act as sources of carbon for the manufacture of the desired solid carbon product. The methods are scalable for many different production capacities so that, for example, plants designed with this method in mind may be sized to handle the carbon oxide emissions from the combustion processes of a large coal-fired power plant or those from an internal combustion engine. For example, the methods may be used to reduce carbon dioxide from the atmosphere, combustion gases, process offgases, exhaust gases from the manufacture of Portland cement, and well gases, or from separated fractions thereof.

In another embodiment, the carbon oxides from a source gas mixture are separated from the source mixture and concentrated to form the carbon oxide feedstock for the reduction process. The carbon oxides in the source gases may be concentrated through various means known in the art. In yet another embodiment, the catalytic conversion process may be employed as an intermediate step in a multi-stage power extraction process wherein the first stages cool the combustion gases to the reaction temperature of the reduction process for the formation of the desired solid carbon product. The cooled combustion gases, at the desired temperature of the reduction reaction, may then be passed through the reduction process and subsequently passed through additional power extraction stages.

Coupling this method with a hydrocarbon combustion process for electrical power production has an additional advantage in that the hydrogen required for the reduction process may be formed by the electrolysis of water using off-peak power. The oxygen formed in the electrolysis process may be used as at least a portion of the combustible mixture for the combustion process.

When the methods disclosed herein are coupled with a combustion or chemical process that uses hydrocarbons, a portion of the hydrocarbons of the process may be used as the reducing agent gas. This may include the pyrolysis of the hydrocarbons to form a hydrogen gas that is provided as the reducing agent gas. The process of this disclosure may be adapted to various available hydrocarbon sources.

The reduction process of this method results in the formation of solid carbon product and water. The water may subsequently be condensed and the latent heat extracted for heating purposes, or as part of a low-pressure power extraction cycle. The water may be extracted as a useful co-product, and the associated latent heat of the water may be used for another process.

EXAMPLES

The following examples illustrate the processes described. Each example is explained in additional detail in the following subsection, and scanning electron microscope images of products of some examples are included.

TABLE 1

Summary of Examples 1 through 6

| Example | Carbon Oxide | Reducing Agent | Catalyst | Conditions |
| --- | --- | --- | --- | --- |
| Example 1: Multi-wall Carbon Nanotube Pillows | $CO_2$ | Hydrogen | rust on mild steel | Pressure = 101.3 kPa Temp = 680° C. Time = 1 hour |
| Example 2: Multi-wall Carbon Nanotubes | $CO_2$ | Hydrogen | 304 stainless steel | Pressure = 101.3 kPa Temp = 680° C. Time = 1 hour |
| Example 3: Multi-wall Carbon Nanotubes | $CO_2$ | Hydrogen | 316L stainless steel | Pressure = 97.3 kPa Temp = 700° C. Time = 1 hour |
| Example 4: Multi-wall Carbon Nanotubes | $CO_2$ | Hydrogen | steel wool | Pressure = 70.6 kPa Temp = 700° C. Time = 1 hour |
| Example 5: Graphite platelets | $CO_2$ | Hydrogen | 304 stainless steel | Pressure = 78.5 kPa Temp = 575° C. Time = 2 hours |
| Example 6: Carbon Nanotube Pillows | $CO_2$ | Hydrogen | 304 stainless steel | Pressure = 101.3 kPa Temp = 650° C. Time = 1 hour |

Figure 2:
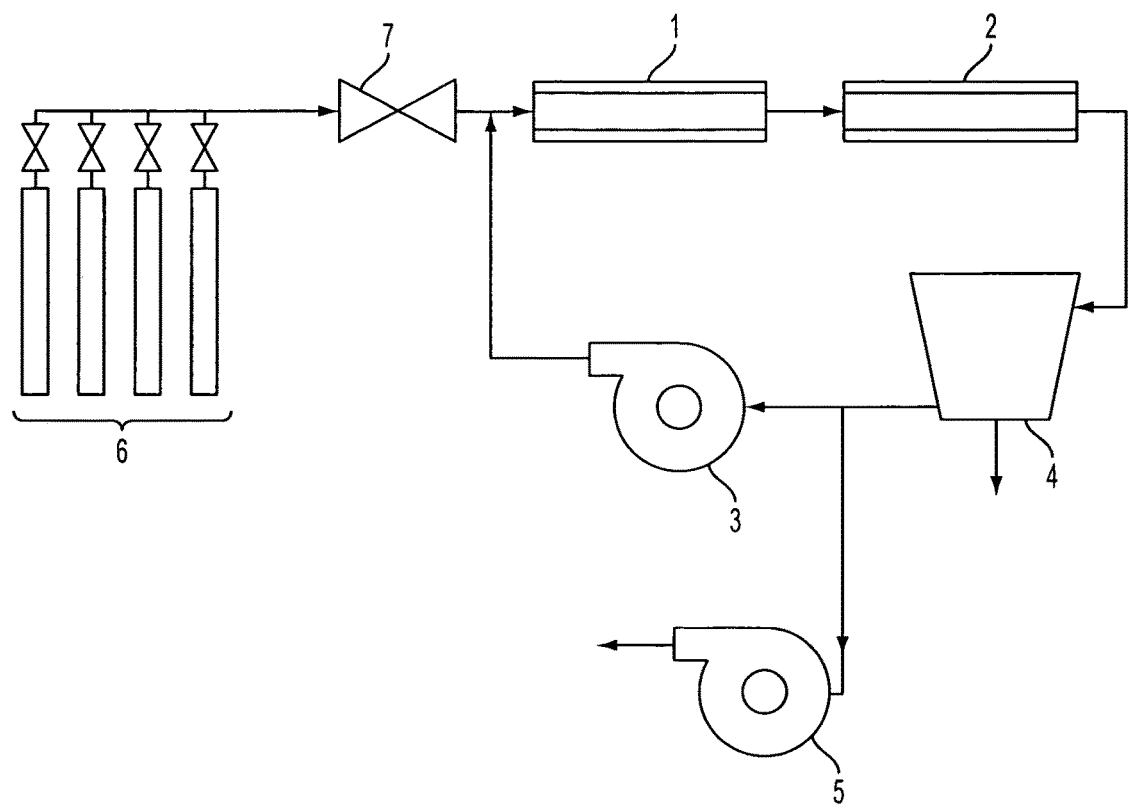
FIG. 2 is a simplified schematic of an experimental setup for the examples disclosed herein.

The laboratory setup for all the examples is illustrated in FIG. 2. The tests were performed in a batch mode. The experimental apparatus includes two tube furnaces 1, 2 connected in series. Each furnace included a quartz outer shell. The two-furnace arrangement allowed separate concurrent tests in each of the tube furnaces 1, 2 at different reaction temperatures and with different catalysts, but with the same reaction gas mixture and pressure. Catalyst samples (i.e., metal tubes) were placed inside the tube furnaces 1, 2. The tube furnaces 1, 2 were heated for approximately one to two hours, and, after the reaction, were cooled for four to six hours so that the samples could be removed. The tube furnaces 1, 2 may also operate independently with appropriate piping and valves. The components illustrated in FIG. 2, together with associated piping, instrumentation, and appurtenances are collectively referred to as the "experimental apparatus" in the following description of examples.

The gases used in various combinations in the examples were: research grade carbon dioxide ($CO_2$), available from PraxAir; research grade methane ($CH_4$), available from PraxAir; standard grade nitrogen ($N_2$), available from PraxAir; research grade helium (He), available from Air Liquide; and research grade hydrogen ($H_2$), available from PraxAir.

As depicted in FIG. 2, gases stored in a gas supply 6 passed through a mixing valve 7. The mixing valve 7 mixed the gases and controlled the flow of gases to the tube furnaces 1, 2. The gases flowed through the tube furnaces 1 and 2, to a condenser 4, generally maintained at about 3° C. to remove water. The dried gases passed through a compressor 3 and back into the tube furnace 1. A vacuum pump 5 was used intermittently to evacuate the tube furnaces 1, 2 if a particular experiment required purging the furnaces 1, 2 with inert gases.

The temperature of the first tube furnace 1 was measured by a type-K thermocouple located inside the outer quartz shell at approximately the centerline of the first tube furnace 1. The temperature of the second tube furnace 2 was measured by a type-K thermocouple located at approximately the centerline of the second tube furnace 2 in a well drilled in the ceramic insulation of the tube furnace 2. The temperatures are reported as shown on these thermocouples.

No attempt was made to measure or to control the recirculation flow rate, and the quality of the product and speed of reaction seemed to be independent of flow rate (e.g., whether a high-volume compressor or a low-volume pump were used). Without being bound by any particular theory, the flow rates may have all been above a critical threshold. Flow rates may be important for design and operation of production facilities, but are not particularly important in the tests reported herein because the volume of the experimental apparatus was much larger than the volume of the catalyst and resulting solid carbon product. Appropriate tests to determine the optimum flow rates for a specific production design will readily occur to a skilled practitioner.

During the experiments, the pressure of the gases in the experimental apparatus would suddenly begin to rapidly drop as the temperature increased. The temperature at which the pressure began to drop varied with the catalyst and gas mixture. This drop in pressure may be an indication of the onset of formation of the solid carbon product. When the pressure dropped, additional reaction gases were added to the experimental apparatus via the mixing valve 7 to maintain pressure. After a short time, the pressure would begin to rise, at which point the mixing valve 7 was closed. The magnitude and duration of the pressure drop appear to be an indication of the onset of CNT growth and/or the rate of growth.

The start-up procedure followed one of two methods: heating the experimental apparatus in an inert gas (helium or nitrogen), or heating the experimental apparatus in air. In the case of heating in the inert gas, the experimental apparatus was evacuated and purged by the vacuum pump 5 for approximately five minutes, after which the vacuum pump 5 was turned off and isolated. The experimental apparatus was brought to atmospheric pressure with the inert gas. The inert gas was then turned off, and the heating elements of the tube furnaces 1, 2 were turned on to begin the heating cycle. In the case of air, the tube furnaces 1, 2 were not purged at start-up, and were simply brought up to operating temperature.

When the furnaces reached approximately the experimental set point temperature, the experimental apparatus was evacuated and purged with a reaction gas mixture (typically a stoichiometric mixture of carbon dioxide and reducing gas) for five minutes. The experimental apparatus was then brought to atmospheric pressure while the reaction gases and the temperature continued to rise and until the experimental apparatus gauge temperature was at the selected test temperature.

In the examples, the tube furnaces 1, 2 were operated for a fixed time (typically 1 hour), after which the tube furnaces 1, 2 were turned off. After the tube furnaces 1, 2 were turned off, the vacuum pump 5 was turned on, the reaction gases evacuated and the experimental apparatus purged with an inert gas (either helium or nitrogen) for approximately five minutes. Then the vacuum pump 5 was turned off and the experimental apparatus was brought up to atmospheric pressure with an inert purge gas and allowed to cool.

During the experiments, there were no observed differences in the quality of the CNTs produced based on the inert gas used for purging and cooling. Implementations of continuous flow reactors based on the examples herein will readily occur to a skilled practitioner.

Example 1

A sample of mild steel wafer with extensive red rust spots was used as the catalyst. The mild steel wafer was placed in the tube furnace 1 at approximately the centerline. The vacuum pump 5 was started, and helium was used to purge the experimental apparatus for five minutes. After five minutes, the vacuum pump 5 was turned off, the compressor 3 was turned on, the refrigerated condenser 4 was turned on, and the helium gas continued to flow until the pressure reached 90.6 kPa (680 Torr), at which point the gas flow was shut off. The heating element of the tube furnace 1 was then turned on.

When the furnace 1 temperature reached a temperature of 680° C., the vacuum pump 5 was turned on, and reaction gases in a stoichiometric mixture of carbon dioxide and hydrogen (delivered from the gas supply 6 by the mixing valve 7) were used to purge the experimental apparatus for five minutes. After five minutes, the vacuum pump 5 was turned off. When the experimental apparatus reached a pressure of 101.3 kPa (760 Torr), the mixing valve 7 was closed to stop the flow of reaction gases into the tube furnace 1. The compressor 3 and the refrigerated condenser 4 were operating to circulate the reaction gases through the tube furnaces 1, 2. Additional reaction gases were added by periodically opening the mixing valve 7 to keep the experimental apparatus gauge pressure between 85.3 kPa (640 Torr) and 101.5 kPa (760 Torr). The reaction gases circulated through the tube furnaces 1, 2 for one hour, after which the heating element of the furnace 1 was shut off, the vacuum pump 5 was started, and the experimental apparatus was purged with helium for five minutes from gas supply 6 controlled by mixing valve 7. The vacuum pump 5 was then shut off and the helium purge gas continued to flow until the gauge pressure in the experimental apparatus was 98.7 kPa (740 Torr). The furnace 1 was then left to cool.

Figure 3:
FIG. 3 is a side view of CNT "forest" growth of "pillow" morphology on a substrate produced as described in Example 1.
Figure 5:
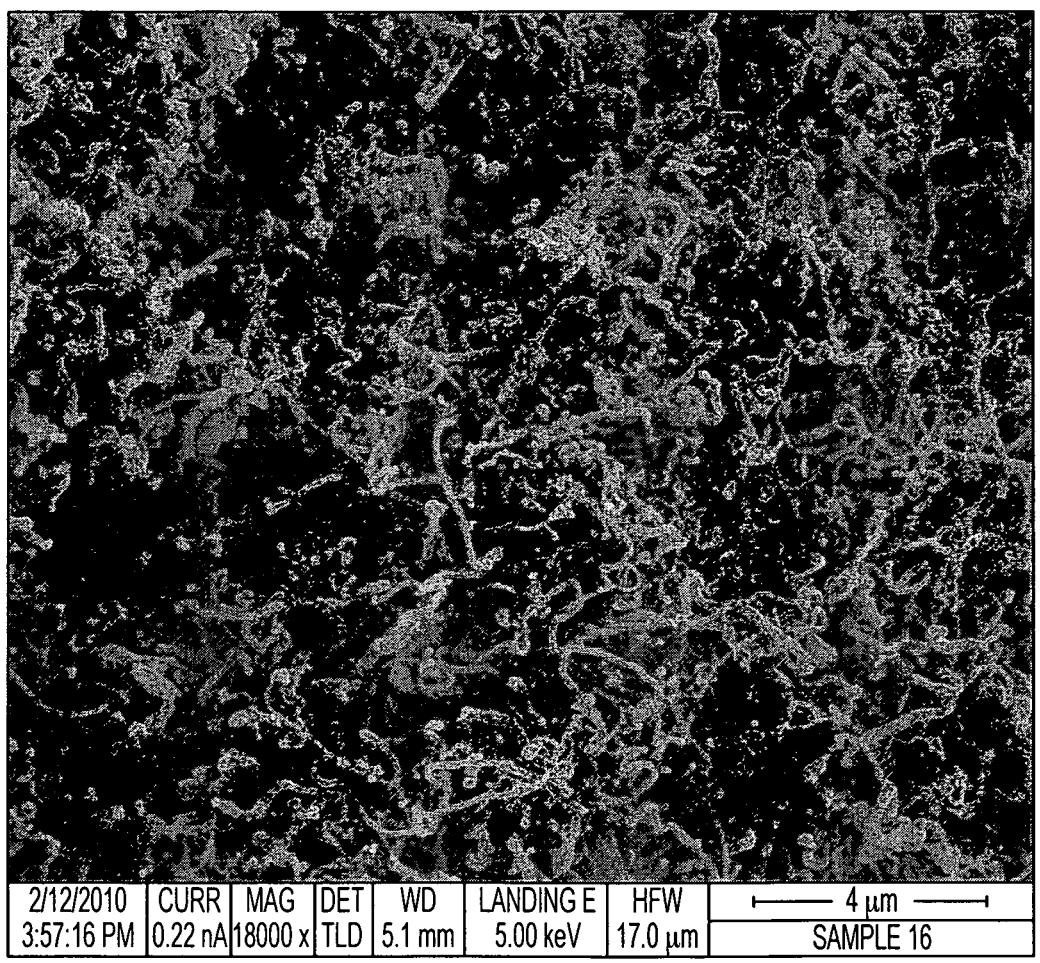
FIG. 5 is a top view of the forest of FIG. 3, shown at 18,000× magnification.
Figure 6:
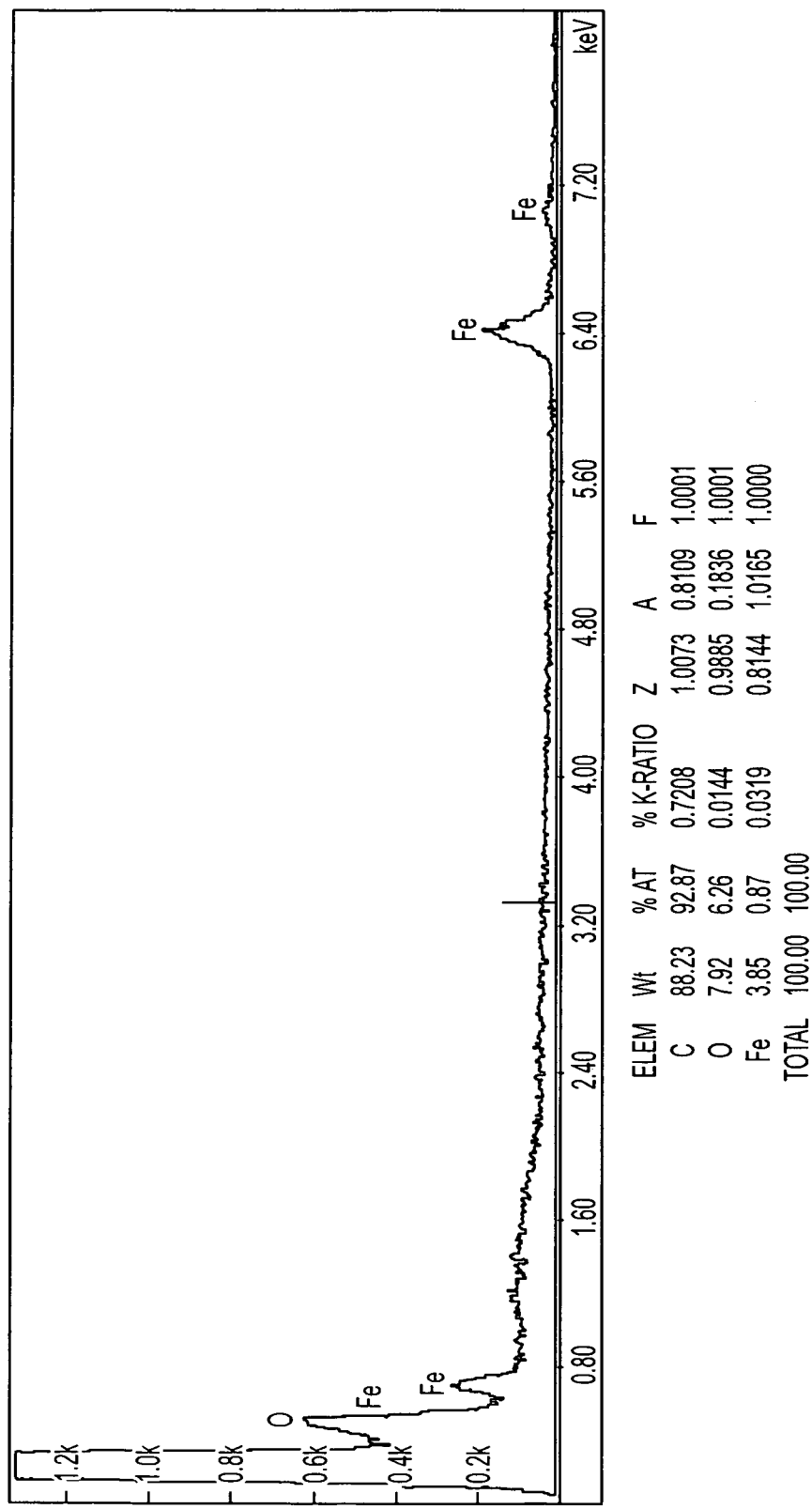
FIG. 6 shows an elemental analysis of the CNTs shown in FIGS. 3 through 5.

The steel sample was removed after the furnace 1 had cooled. FIG. 3 shows a photograph of the steel sample after it was removed, including a "forest" type of growth on the substrate. This forest is comprised of CNT "pillows." FIG. 4 shows an SEM (scanning electron microscope) image of the same sample under 700× magnification. FIG. 5 is a top view and shows the same sample of FIG. 4 under 18,000× magnification and shows the details of a typical pillow. The size of the CNTs (tens to hundreds of nanometers in diameter) indicates that they are probably multi-wall CNTs. FIG. 5 also shows the catalyst in the growth tip end of each CNT at bright spots. The average diameter of the growth tip appears to be approximately 1.2 to 1.3 times the diameter of the associated carbon nanotube. FIG. 6 shows an elemental analysis of the CNTs in FIG. 5, indicating that the CNTs are primarily carbon with minor iron and oxygen constituents, perhaps due to the catalyst particles embedded in the growth tips of the CNTs.

Example 2

A quartz disk was placed lying flat on a wafer of 304 stainless steel, which was used as the catalyst. The wafer was placed in furnace 1 at approximately the centerline. The experimental apparatus was helium-purged and heated as in Example 1. Reaction gases were added and recirculated for one hour at a temperature of 680° C. and a pressure between 85.3 kPa (640 Torr) and 101.3 kPa (760 Torr), as in Example 1.

Figure 7:
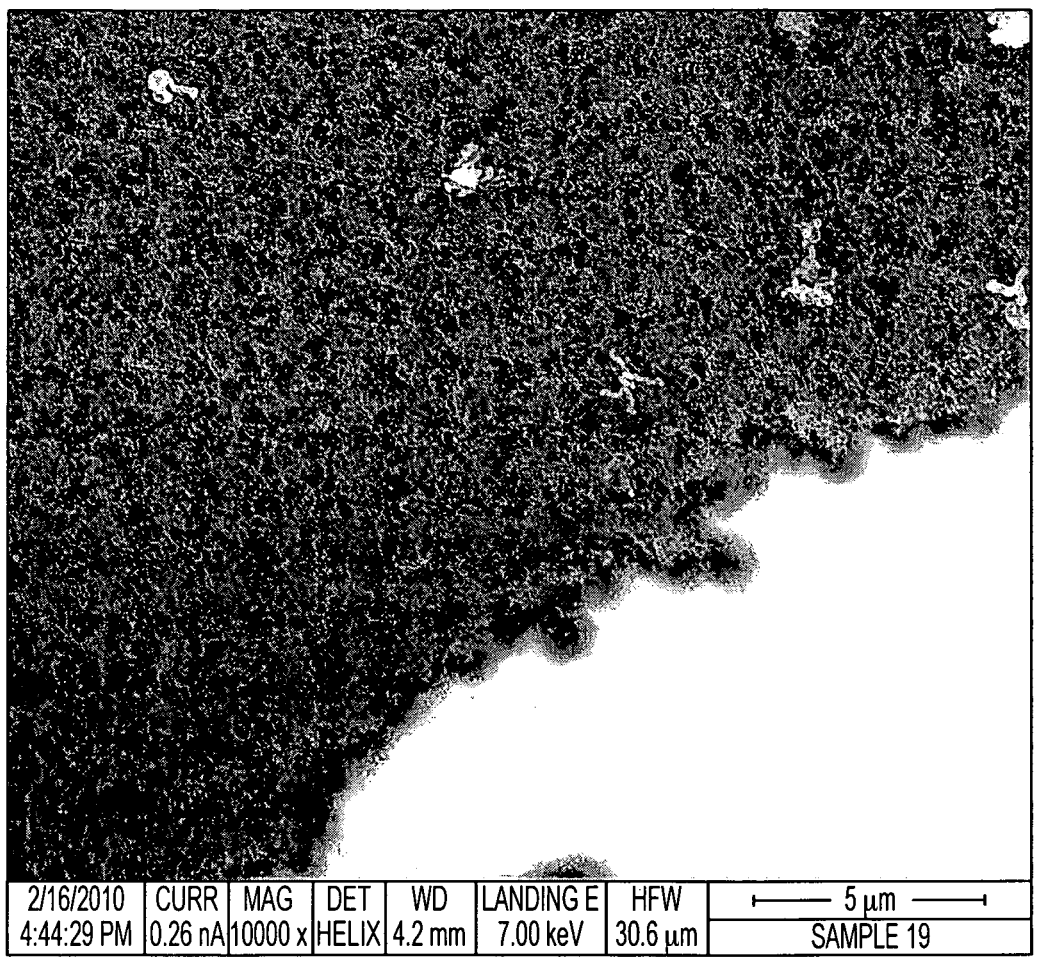
FIG. 7 shows a sample of CNTs at 10,000× magnification produced as described in Example 2.
Figure 8:
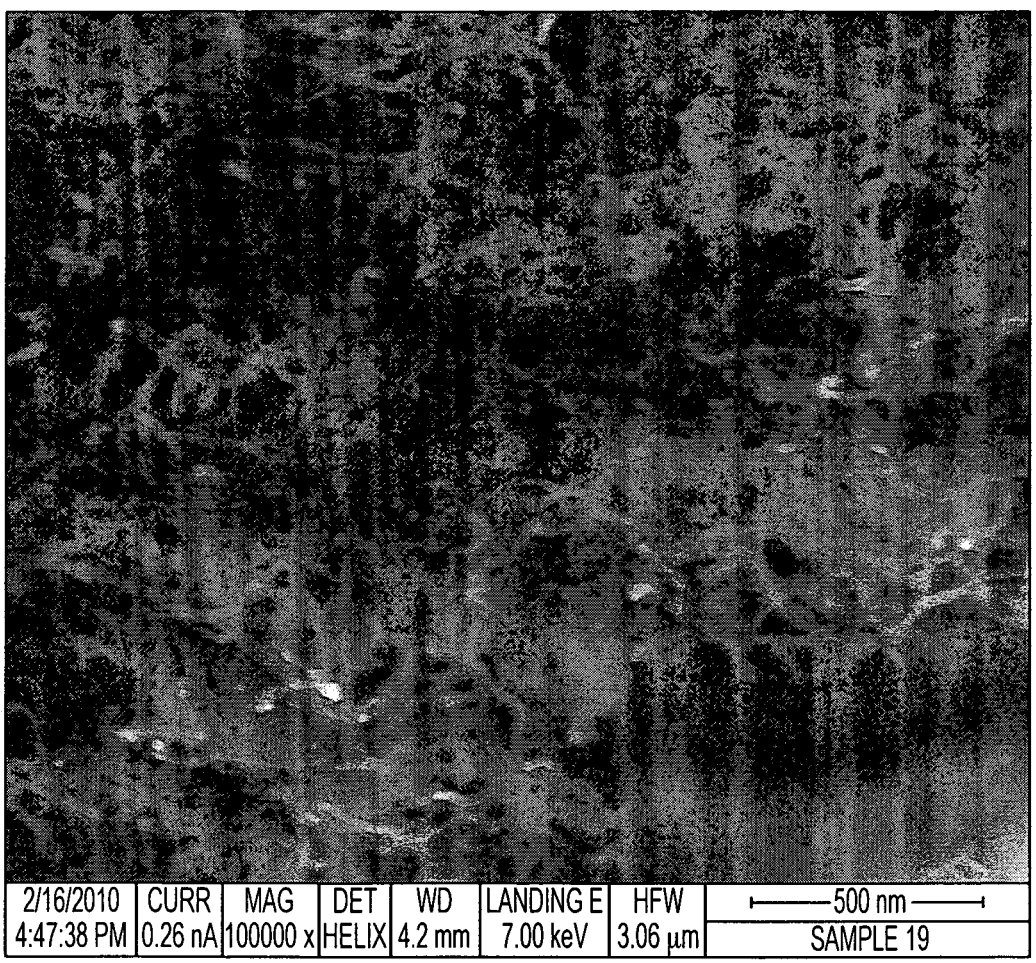
FIG. 8 shows the sample depicted in FIG. 7, at 100,000× magnification.

The stainless steel sample was removed from the furnace 1 after the furnace 1 had cooled. A mat of CNTs had grown between the quartz and the stainless steel wafer. Portions of the CNT mat adhered to both the quartz and the stainless steel surfaces. FIG. 7 shows the sample under 10,000× magnification, and FIG. 8 shows the sample under 100,000× magnification. The size of the CNTs (tens to hundreds of nanometers in diameter) indicates that they are probably multi-wall CNTs.

Example 3

A wafer of 316L stainless steel was used as the catalyst. The 316L stainless steel wafer was placed in furnace 1 at approximately the centerline. The experimental apparatus was helium-purged and heated as in Example 1. Reaction gases were added and recirculated for one hour as in Example 1, but at a temperature of 700° C. and a pressure between 93.3 kPa (700 Torr) and 97.3 kPa (730 Torr).

Figure 9:
FIG. 9 is a photograph of a stainless steel wafer with a CNT forest thereon, formed as described in Example 3.
Figure 10:
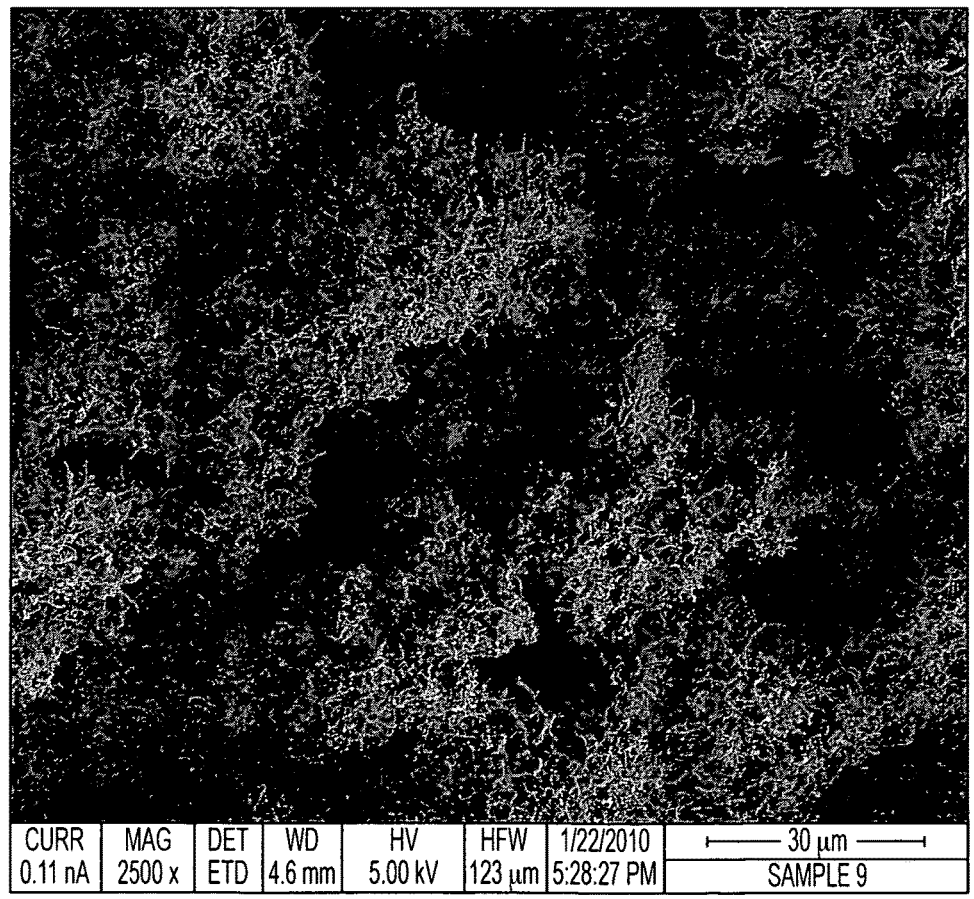
FIG. 10 is an image of a region of the CNT forest of FIG. 9, at 2,500× magnification.
Figure 11:
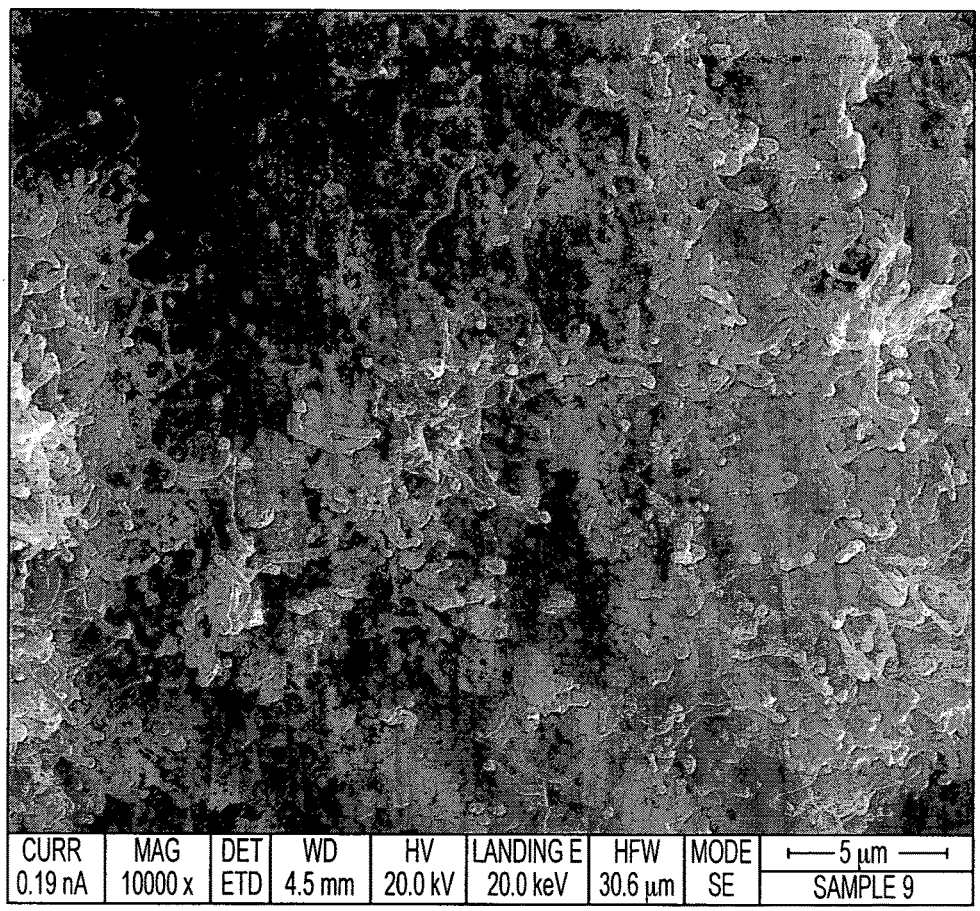
FIG. 11 is an image of the CNT forest of FIG. 9, shown at 10,000× magnification.

The stainless steel wafer was removed from the furnace 1 after the furnace 1 had cooled. FIG. 9 is a photograph of the stainless steel wafer. The carbon nanotubes grew on only a portion of the wafer. The reasons for this are unclear. FIG. 10 shows an image of a region of the CNT forest on the wafer at 2,500× magnification, and FIG. 11 shows an image of the same region of the CNT forest at 10,000× magnification. The diameter of the tubes indicates that they are likely multi-wall CNTs.

Example 4

A sample of mild steel wool was used as the catalyst. The steel wool was placed in the furnace 1 near the centerline and heated in air. The compressor 3, the refrigerated condenser 4, and the heating element of the tube furnace 1 were turned on, circulating air through the experimental apparatus. When the furnace 1 temperature reached 645° C., the vacuum pump 5 was started, and a stoichiometric mixture of carbon dioxide and hydrogen flowed from the gas supply 6 (via the mixing valve 7) into the tube furnace 1 for five minutes. The temperature of the furnace 1 continued to increase to a set point of 700° C. At the end of five minutes, the vacuum pump 5 was shut off and the gases continued to flow until the gauge pressure of the experimental apparatus was 70.6 kPa (530 Torr), at which point the reaction gas flow rate was reduced to a lower flow rate sufficient to keep the pressure between 66.6 kPa (500 Torr) and 70.6 kPa (530 Torr). The reaction gases circulated through the tube furnaces 1, 2 for one hour, after which the heating element of furnace 1 was shut off, the vacuum pump 5 was started, and the experimental apparatus was purged with helium for five minutes. The vacuum pump 5 was then shut off, and the helium purge gas continued to flow until the gauge pressure in the experimental apparatus was 93.3 kPa (700 Torr). The furnace 1 was then left to cool.

Figure 12:
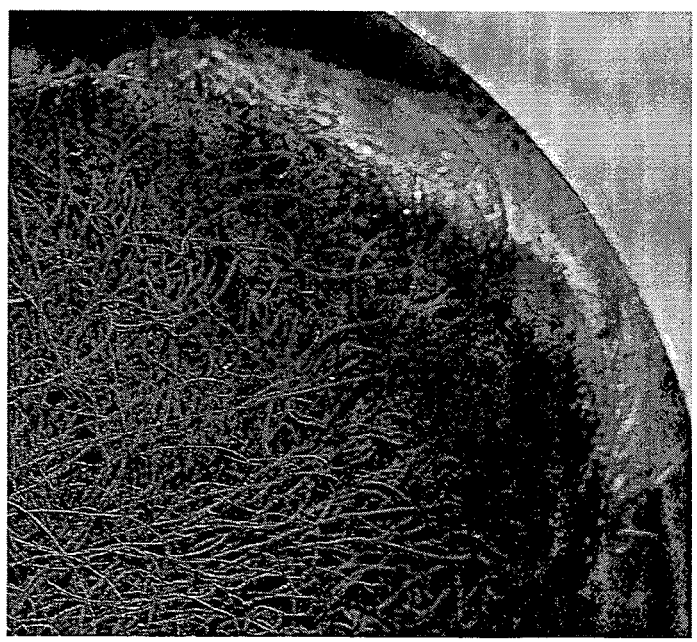
FIG. 12 is a photograph of steel wool produced as described in Example 4.
Figure 13:
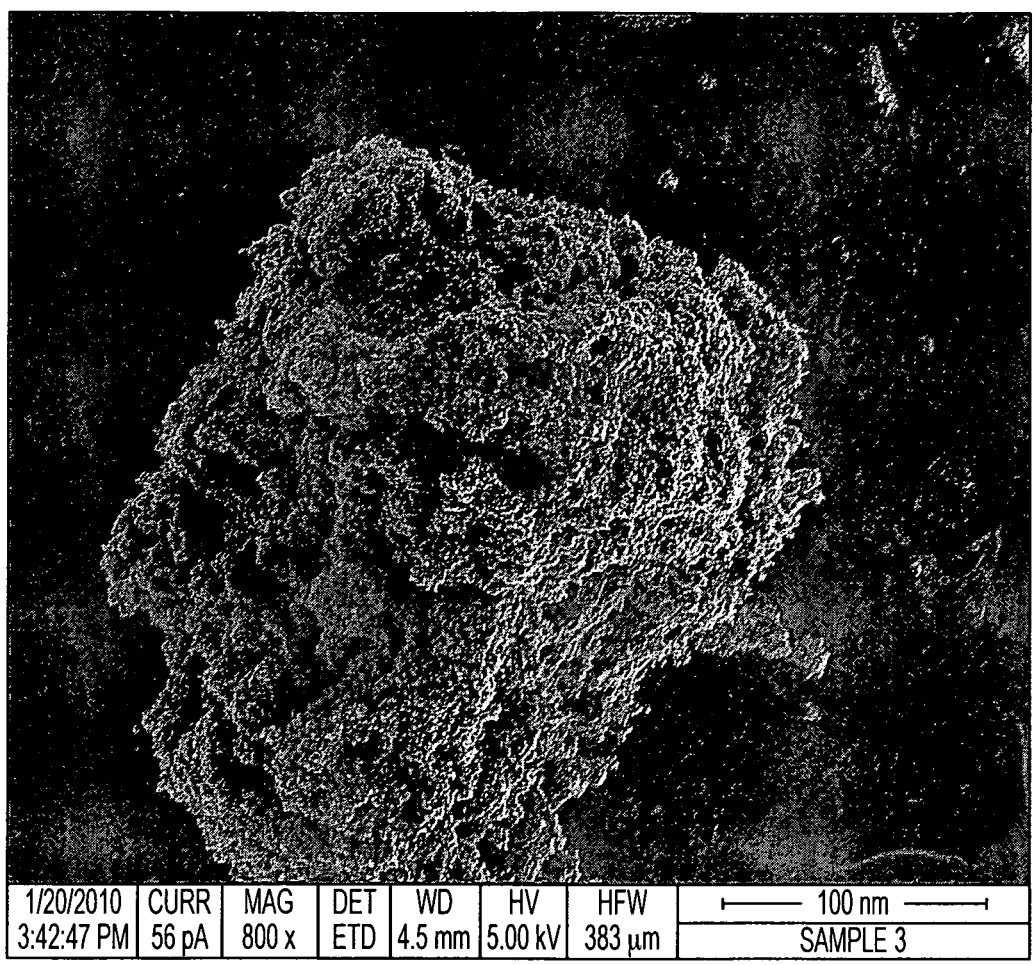
FIG. 13 is an image of a particle of the powder shown in FIG. 12, at 800× magnification.
Figure 14:
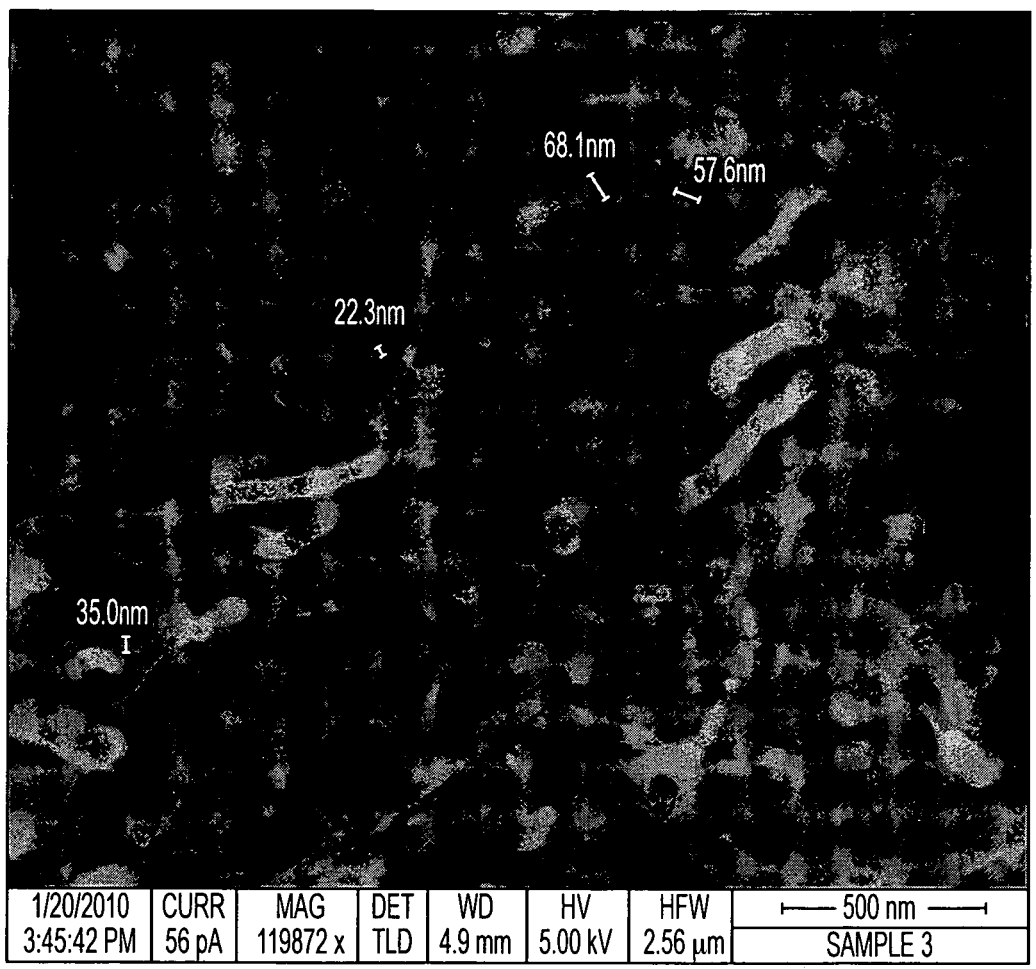
FIG. 14 is an image of a particle of the powder shown in FIG. 12, at approximately 120,000× magnification.

The steel wool sample with the solid carbon product was removed after the furnace 1 had cooled. FIG. 12 is a photograph of the steel wool sample. The powdery black band of solid carbon product was sampled and examined under SEM, shown in an image of a particle of the powder at 800× magnification in FIG. 13. The depicted particle is a single "pillow" of the pile of pillows comprising the powdery black band. FIG. 14 shows an image of the same pillow at approximately 120,000× magnification. The diameter indicates that the CNTs are likely multi-wall.

Example 5

A sample of 316 stainless steel wire was used as the catalyst. The wire was placed in the furnace 1 near the exit of the furnace 1. The heating element of the furnace 1, the refrigerated condenser 4, and the vacuum pump 5 were turned on. Reaction gases in a stoichiometric mixture of carbon dioxide and hydrogen (delivered from the gas supply 6 by the mixing valve 7) were used to purge the experimental apparatus for five minutes. After five minutes, the vacuum pump 5 was turned off, the compressor 3 was turned on, and the reaction gas mixture continued to flow until the gauge pressure of the experimental apparatus was 78.5 kPa (589 Torr), at which point the reaction gas flow was shut off. The reaction gases circulated through the tube furnaces 1, 2 for two hours at 575° C., after which the heating element of the furnace 1 was shut off, the vacuum pump 5 was started, and the experimental apparatus was purged with helium for five minutes. The vacuum pump 5 was then shut off, and the helium continued to flow until the gauge pressure in the experimental apparatus was 93.3 kPa (700 Torr). The furnace 1 was then left to cool.

Figure 15:
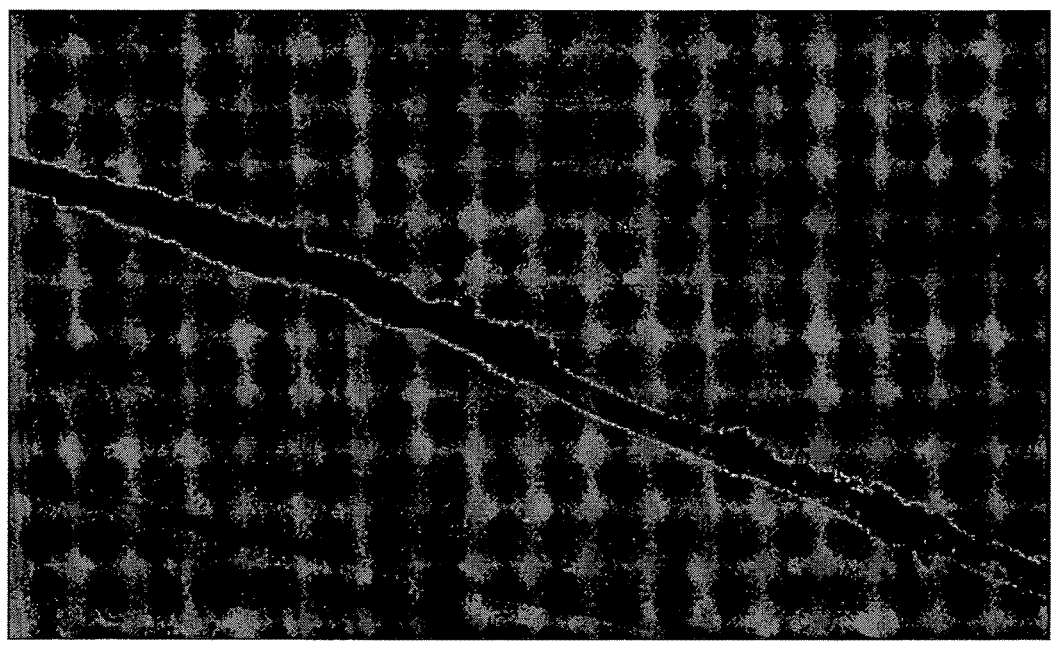
FIG. 15 is a photograph of a stainless steel wire with a surface growth of graphite platelets, produced as described in Example 5.
Figure 16:
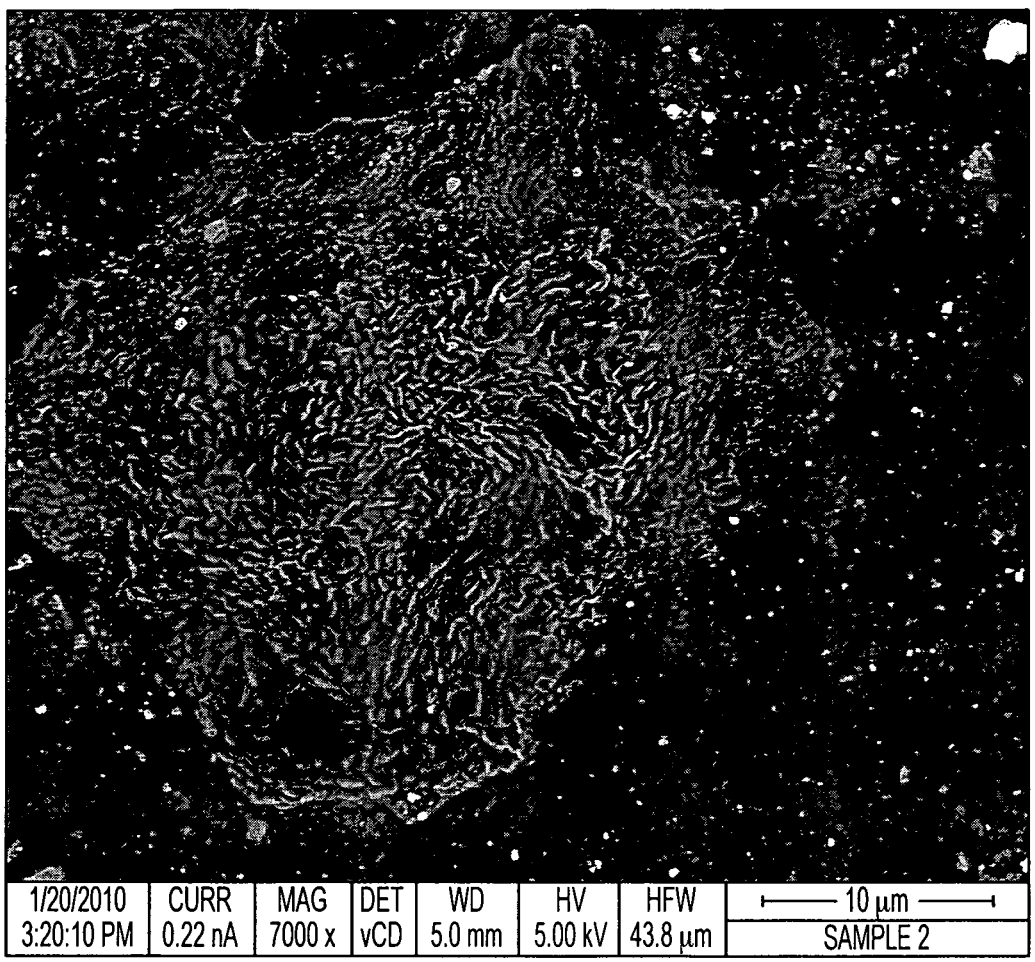
FIG. 16 is an image of a graphite platelet shown in FIG. 15, at 7,000× magnification.
Figure 17:
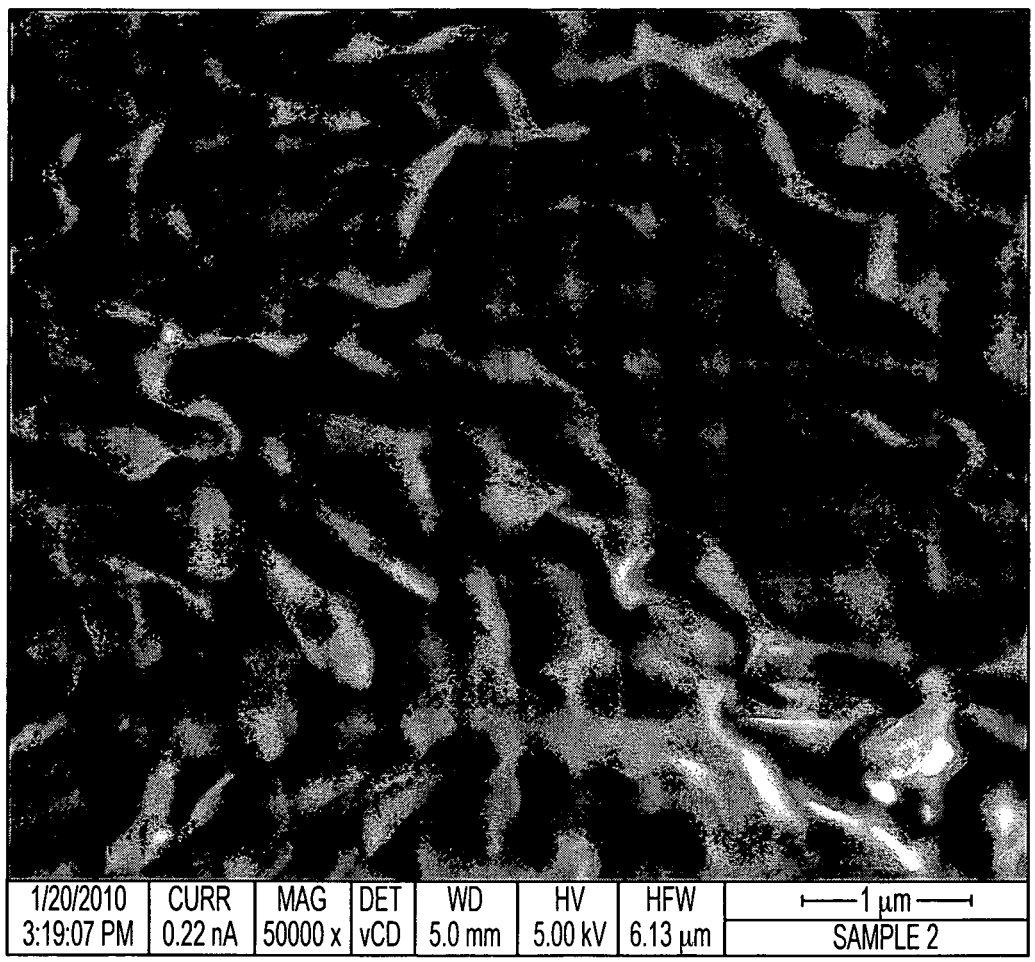
FIG. 17 is an image of a graphite platelet shown in FIG. 15, at 50,000× magnification.

The steel wire was removed from the furnace 1 after the furnace 1 had cooled. FIG. 15 is a photograph of the steel wire sample with the surface growth of the solid carbon product, which in this example, includes graphite platelets. Samples of the graphite platelets were imaged using SEM, as shown in FIG. 16 at 7,000× magnification and in FIG. 17 at 50,000× magnification.

Example 6

A wafer of 304 stainless steel was used as the catalyst. Quartz discs were place on the upper surface of the stainless steel wafer. The stainless steel wafer and quartz discs were placed in the furnace 1 at approximately the centerline. The experimental apparatus was helium-purged and heated as in Example 1. Reaction gases were added and recirculated at a temperature of 650° C. and a pressure between 85.3 kPa (640 Torr) and 101.3 kPa (760 Torr), as in Example 1.

Figure 18:
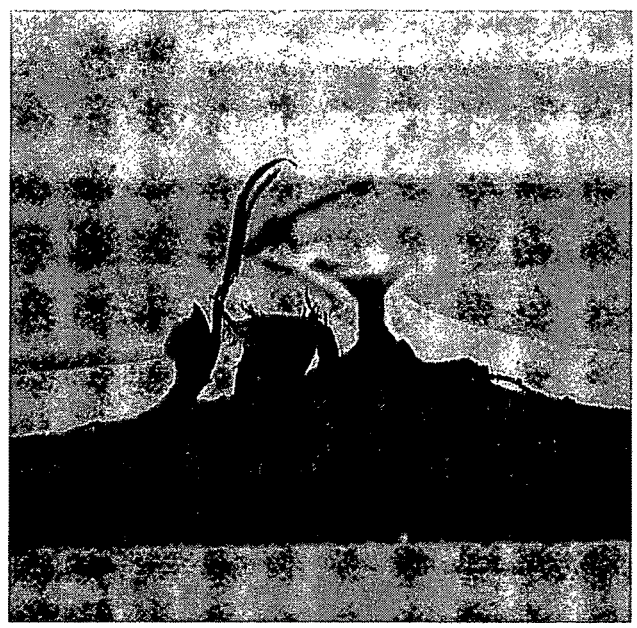
FIG. 18 is a photograph of a stainless steel wafer with a fibrous growth of carbon nanotube "pillows," produced as described in Example 6.
Figure 20:
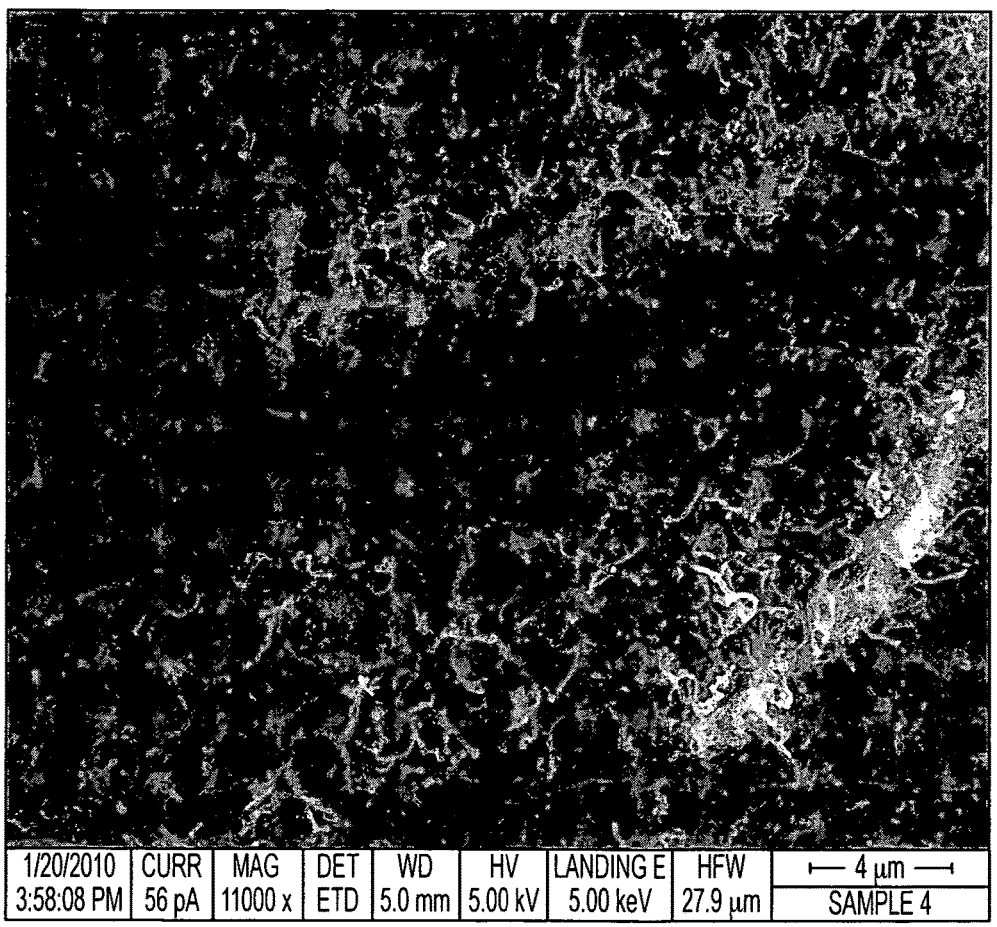
FIG. 20 is an image of a "pillow" shown in FIG. 18, at 11,000× magnification.
Figure 21:
FIG. 21 is an image of a "pillow" shown in FIG. 18, at 70,000× magnification.

The stainless steel wafer and quartz discs were removed after the furnace 1 had cooled. FIG. 18 is a photograph of the sample with graphite platelets on a surface. Samples of the graphite platelets were imaged using SEM, as shown in FIG. 19 at 778× magnification. FIG. 19 shows pillows comprising the fibers. FIG. 20 shows one of the pillows at 11,000× magnification including the entangled structure of the carbon nanotubes. FIG. 21 shows a 70,000× magnification showing the detail of some of the carbon nanotubes of the same pillow as is shown in FIG. 20.

Substitution of the catalyst in the previous examples with catalysts comprised of groups 5 through 10 of the periodic table (e.g., nickel, molybdenum, chromium, cobalt, tungsten, manganese, ruthenium, platinum, iridium, etc.), actinides, lanthanides, and alloys and other combinations thereof may yield substantially similar results. Thus, substitution of catalyst with a chromium-, molybdenum-, cobalt-, tungsten-, or nickel-containing alloy or superalloy may yield a substantially similar result, with the size and morphology of the nanotube product dependent on the grain size of the catalyst material. Catalysts may also include mixtures of such metals. Similar reaction conditions as those described herein may be used with such catalysts. For example, the reaction temperature may range from about 500° C. to about 1,200° C., from about 600° C. to about 1,000° C., or from about 700° C. to about 900° C. In some embodiments, the temperature may be at least 650° C., such as at least 680° C., to produce a selected solid carbon product. The size and morphology of the solid carbon product (e.g., CNTs) may depend on the grain size of the non-ferrous catalyst.

For Examples 7 through 39 below, metal coupons were cut from a sheet of material, or another metal was catalyst was used as indicated. Coupons were generally approximately 13 mm to 15 mm wide, approximately 18 mm to 22 mm long, and approximately 2 mm to 6 mm thick. Coupons were separately placed in quartz boats about 8.5 cm long and 1.5 cm wide, and the boats were inserted end-to-end into a quartz tube having an inner diameter of about 2.54 cm and a length of about 1.2 m. The quartz tube was then placed in a tube furnace. The quartz tube was purged with hydrogen gas to reduce the surface of the coupons before the tube furnace was heated to operating conditions. After the tube furnace reached operating conditions, reaction gases were introduced into the quartz tube (i.e., flowed continuously through the quartz tube) such that both the upper and lower surfaces of each coupon were exposed to reaction gas. The temperature, pressure, and gas composition were measured at each coupon. After the test, the coupons were removed from the quartz tube. Weight changes and carbon formation were noted.

Example 7: 304H Stainless Steel

Figure 22:
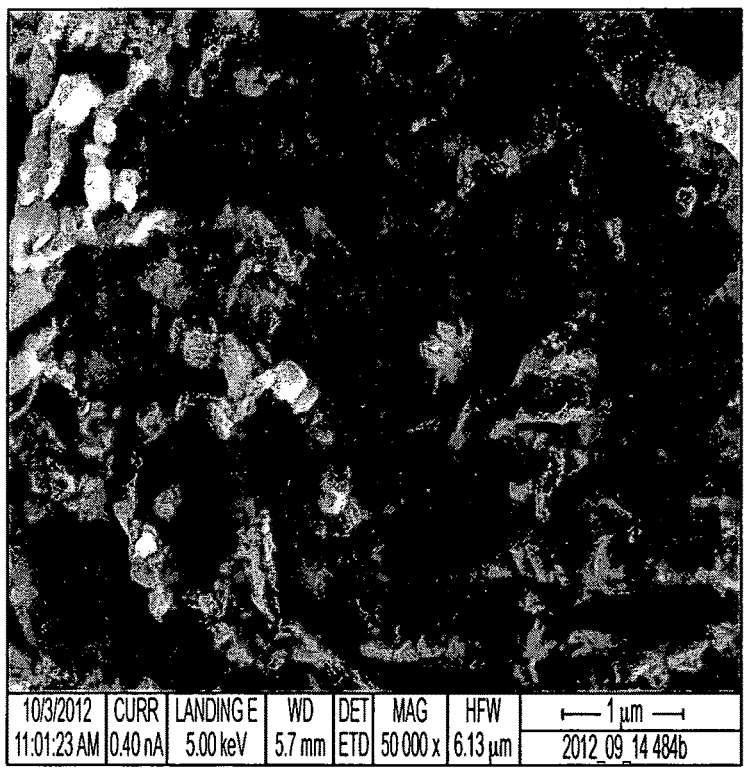
FIGS. 22 through 57 show samples of solid carbon at 50,000× magnification produced as described in Examples 7 through 17.
Figure 23:
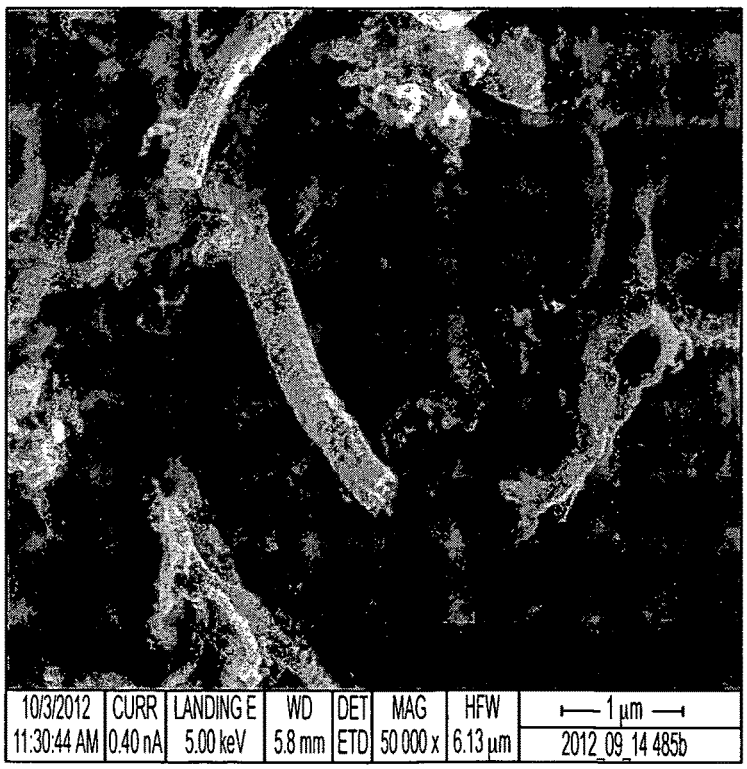
Figure 24:
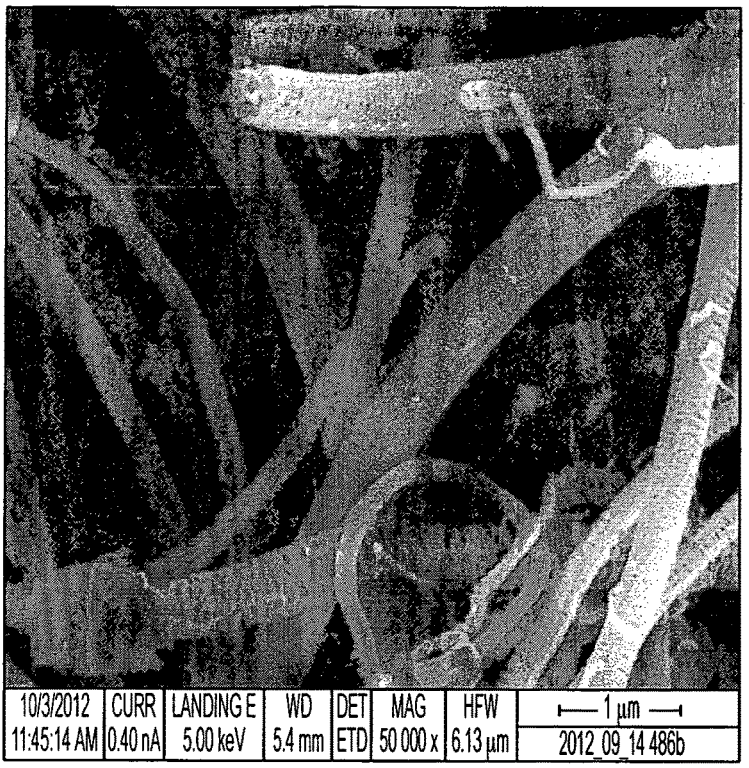

Three coupons were cut from a sheet of 304H stainless steel, and were washed in hydrochloric acid to remove contaminants and oxidation. The coupons were placed in quartz boats in a quartz tube as described above. A reaction gas containing about 50% $H_2$ and 50% CO was introduced into the quartz tube at about 4.0 MPa. The gases flowed over the coupons for about 4 hours at 2000 sccm (standard cubic centimeters per minute). Solid carbon formed on each coupon at the rates shown in Table 2 below. Methane, carbon dioxide, and water were also formed in the quartz tube. After the test, solid carbon was physically removed from the coupons and tested for BET specific surface area, as shown in Table 2. Samples of the solid carbon were imaged using SEM, as shown in FIGS. 22 through 24 at 50,000× magnification. About 17.9 grams of water were collected from the gases during the test.

TABLE 2

Solid Carbon Formation on 304H Stainless Steel

| Sample # | 1 | 2 | 3 |
|---|---|---|---|
| Distance from inlet (in.) | 21.0 | 23.9 | 27.3 |
| Temperature (° C.) | 650.3 | 651.6 | 636.4 |
| Deposition rate (g/cm$^2$/hr) | 0.096 | 0.053 | 0.033 |
| Surface Area (m$^2$/g) | 310.0 | 314.5 | 322.1 |
| SEM image | FIG. 22 | FIG. 23 | FIG. 24 |

Example 8: 25-35MA Stainless Steel

Figure 25:
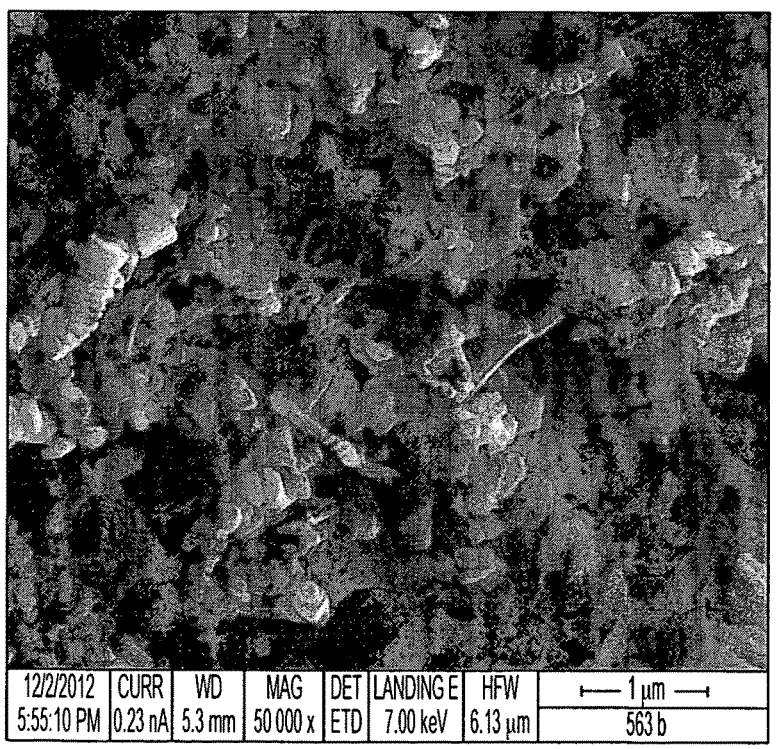
Figure 26:
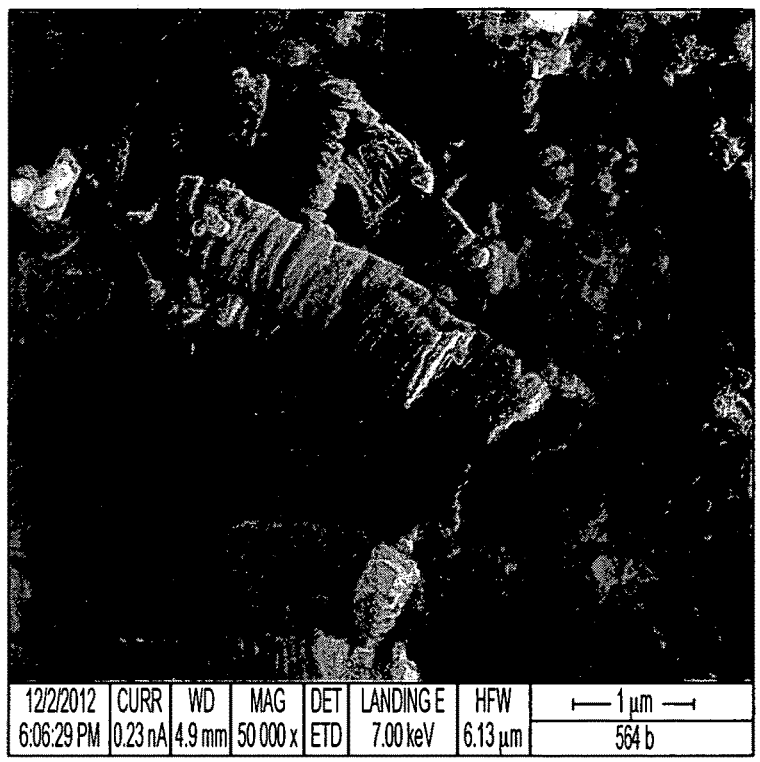
Figure 27:
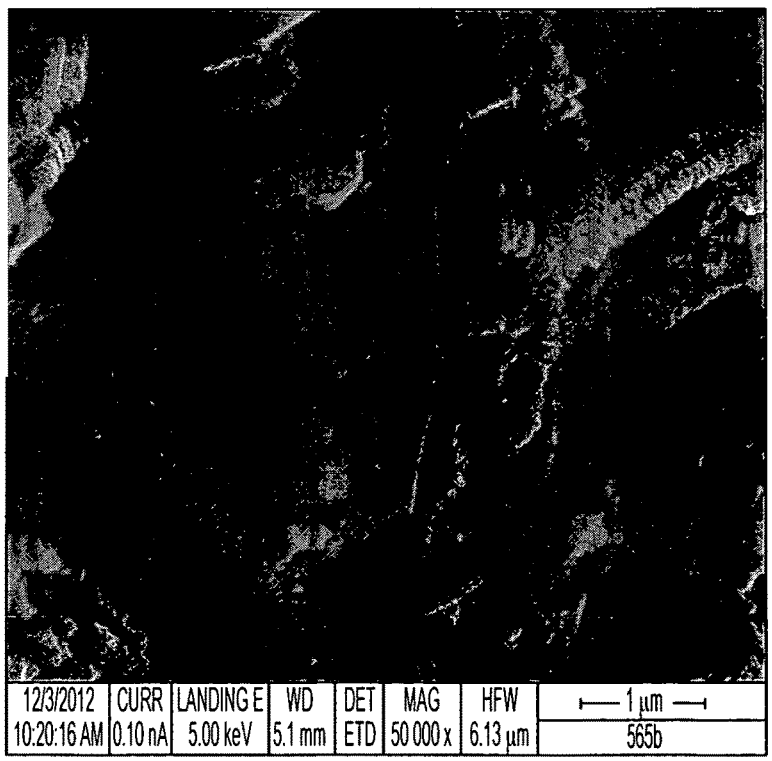

Three coupons were cut from a sheet of 25-35MA stainless steel (an alloy having 23%-27% Cr, 33%-37% Ni, 1.5% Mn, 2.0% Si, 0.35%-0.55% C, 0.50%-1.25% Nb, up to 0.50% Mo, with the balance Fe, available from MetalTek International, of Waukesha, Wis.) and were washed in hydrochloric acid to remove contaminants and oxidation. The coupons were placed in quartz boats in a quartz tube as described above. A reaction gas containing about 50% $H_2$ and 50% CO was introduced into the quartz tube at about 4.0 MPa. The gases flowed over the coupons for about 4 hours at 2000 sccm. Solid carbon formed on each coupon at the rates shown in Table 3 below. Methane, carbon dioxide, and water were also formed in the quartz tube. After the test, solid carbon was physically removed from the coupons and tested for BET specific surface area, as shown in Table 3. Samples of the solid carbon were imaged using SEM, as shown in FIGS. 25 through 27 at 50,000× magnification. About 17.9 grams of water were collected from the gases during the test.

TABLE 3

Solid Carbon Formation on 25-35MA Stainless Steel

| Sample # | 1 | 2 | 3 |
|---|---|---|---|
| Distance from inlet (in.) | 20.5 | 24.1 | 27.5 |
| Temperature (° C.) | 640.9 | 649.8 | 632.5 |
| Deposition rate (g/cm$^2$/hr) | 0.067 | 0.052 | 0.056 |
| Surface Area (m$^2$/g) | 142.6 | 165.7 | 171.1 |
| SEM image | FIG. 25 | FIG. 26 | FIG. 27 |

Example 9: 25-35MA Stainless Steel

Figure 28:
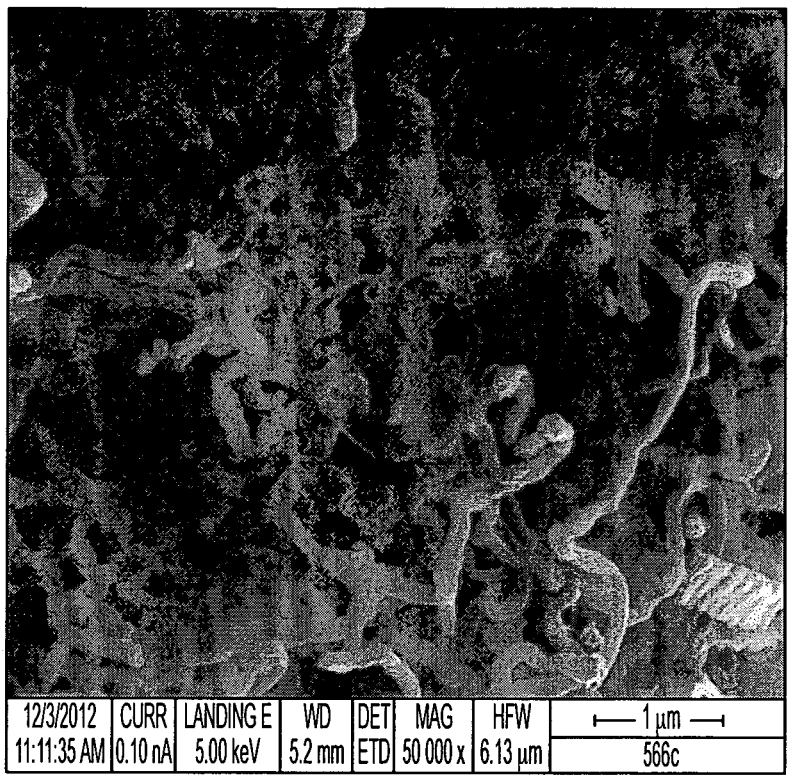
Figure 29:
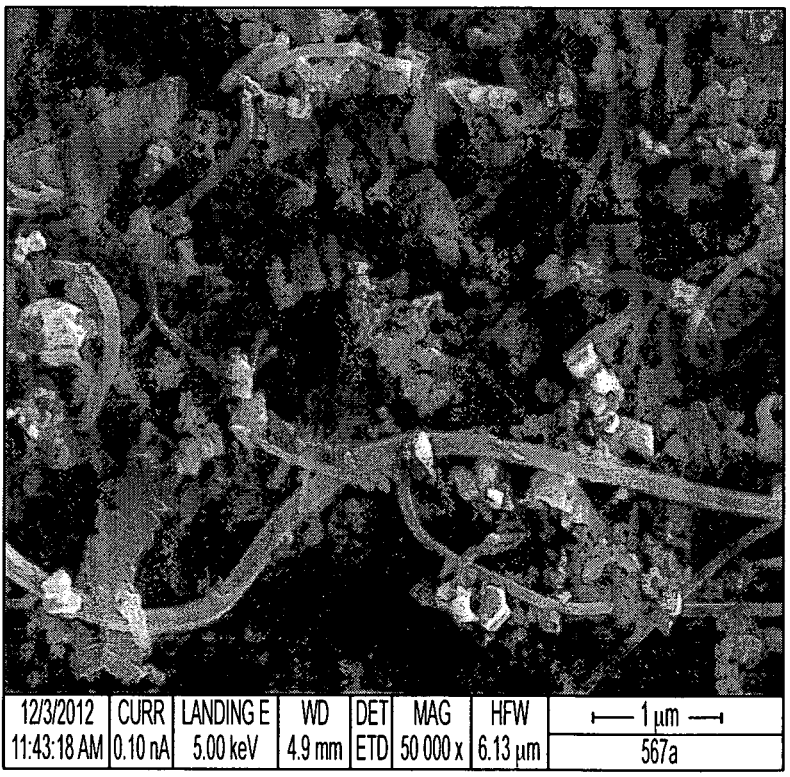
Figure 30:
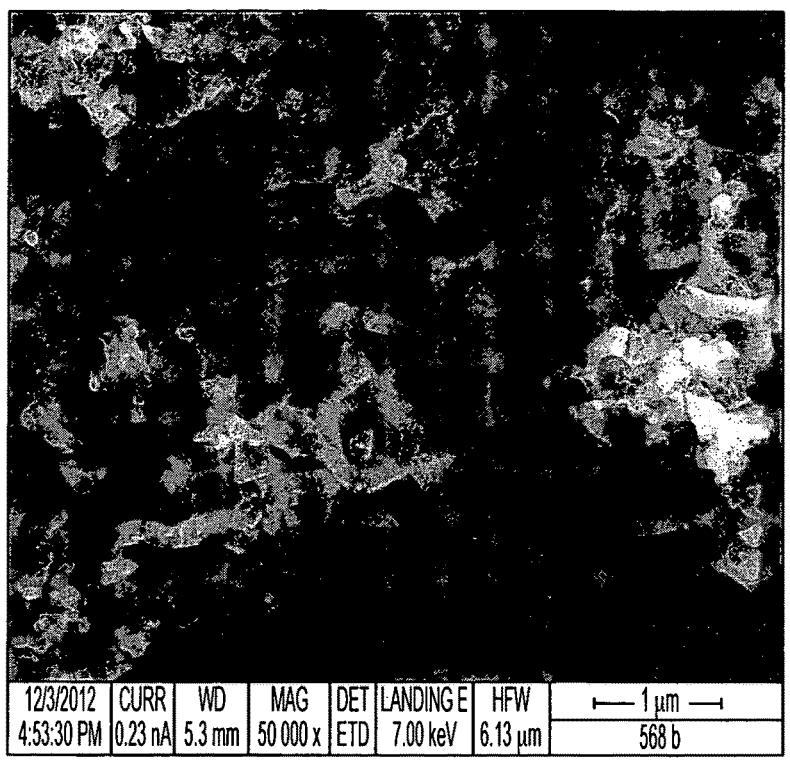

Three coupons were cut from a sheet of 25-35MA stainless steel and were washed in hydrochloric acid to remove contaminants and oxidation. The coupons were placed in quartz boats in a quartz tube as described above. A reaction gas containing about 50% $H_2$ and 50% CO was introduced into the quartz tube at about 4.0 MPa. The gases flowed over the coupons for about 4 hours at 2000 sccm. Solid carbon formed on each coupon at the rates shown in Table 4 below. Methane, carbon dioxide, and water were also formed in the quartz tube. After the test, solid carbon was physically removed from the coupons and tested for BET specific surface area, as shown in Table 4. Samples of the solid carbon were imaged using SEM, as shown in FIGS. 28 through 30 at 50,000× magnification. About 25.0 grams of water were collected from the gases during the test.

TABLE 4

Solid Carbon Formation on 25-35MA Stainless Steel

| Sample # | 1 | 2 | 3 |
|---|---|---|---|
| Distance from inlet (in.) | 20.1 | 24.3 | 27.8 |
| Temperature (° C.) | 648.1 | 646.4 | 626.7 |
| Deposition rate (g/cm$^2$/hr) | 0.100 | 0.055 | 0.034 |
| Surface Area (m$^2$/g) | 166.4 | 161.8 | 178.2 |
| SEM image | FIG. 28 | FIG. 29 | FIG. 30 |

Example 10: Super 20-32NB Stainless Steel

Figure 31:
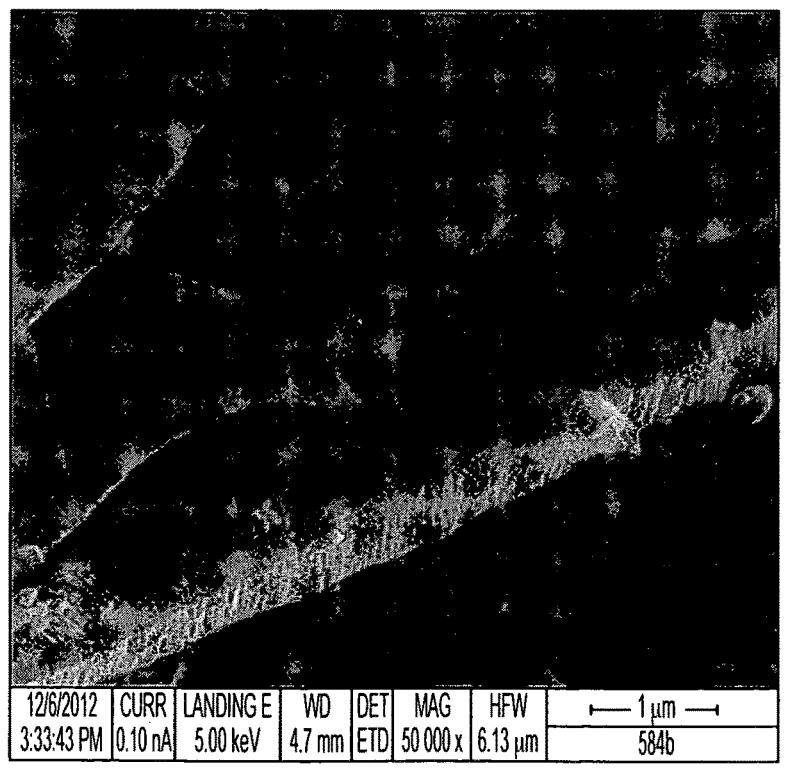
Figure 32:
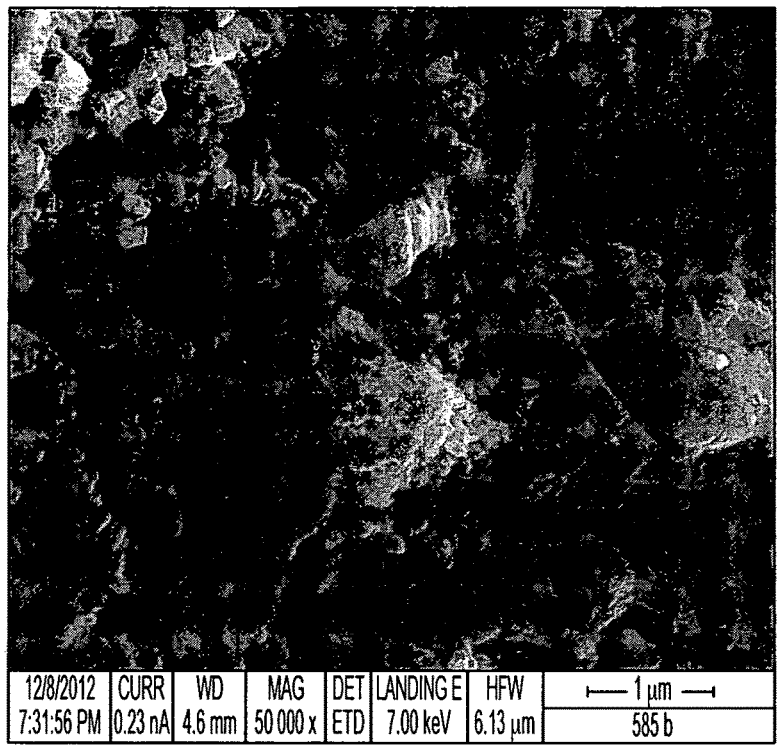
Figure 33:
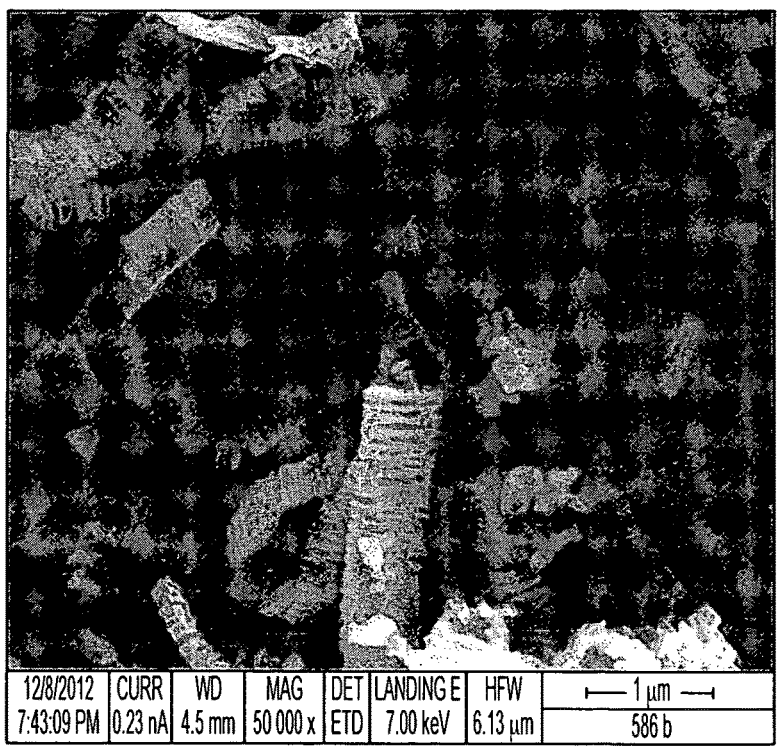

Three coupons were cut from a sheet of Super 20-32Nb stainless steel (an alloy having 20% Cr, 33% Ni, 1.25% Mn, 0.60% Si, up to 0.12% C, 0.50%-1.25% Nb, up to 0.50% other materials, with the balance Fe, available from MetalTek International, of Waukesha, Wis.) and were washed in hydrochloric acid to remove contaminants and oxidation. The coupons were placed in quartz boats in a quartz tube as described above. A reaction gas containing about 50% $H_2$ and 50% CO was introduced into the quartz tube at about 4.0 MPa. The gases flowed over the coupons for about 4 hours at 2000 sccm. Solid carbon formed on each coupon at the rates shown in Table 5 below. Methane, carbon dioxide, and water were also formed in the quartz tube. After the test, solid carbon was physically removed from the coupons and tested for BET specific surface area, as shown in Table 5. Samples of the solid carbon were imaged using SEM, as shown in FIGS. 31 through 33 at 50,000× magnification. About 27.3 grams of water were collected from the gases during the test.

TABLE 5

Solid Carbon Formation on Super 20-32Nb Stainless Steel

| Sample # | 1 | 2 | 3 |
|---|---|---|---|
| Distance from inlet (in.) | 20.1 | 24.0 | 27.5 |
| Temperature (° C.) | 647.9 | 650.0 | 630.0 |
| Deposition rate (g/cm$^2$/hr) | 0.122 | 0.048 | 0.057 |
| Surface Area (m$^2$/g) | 194.6 | 193.9 | 205.6 |
| SEM image | FIG. 31 | FIG. 32 | FIG. 33 |

Example 11: HAYNES® 230 Alloy

Figure 34:
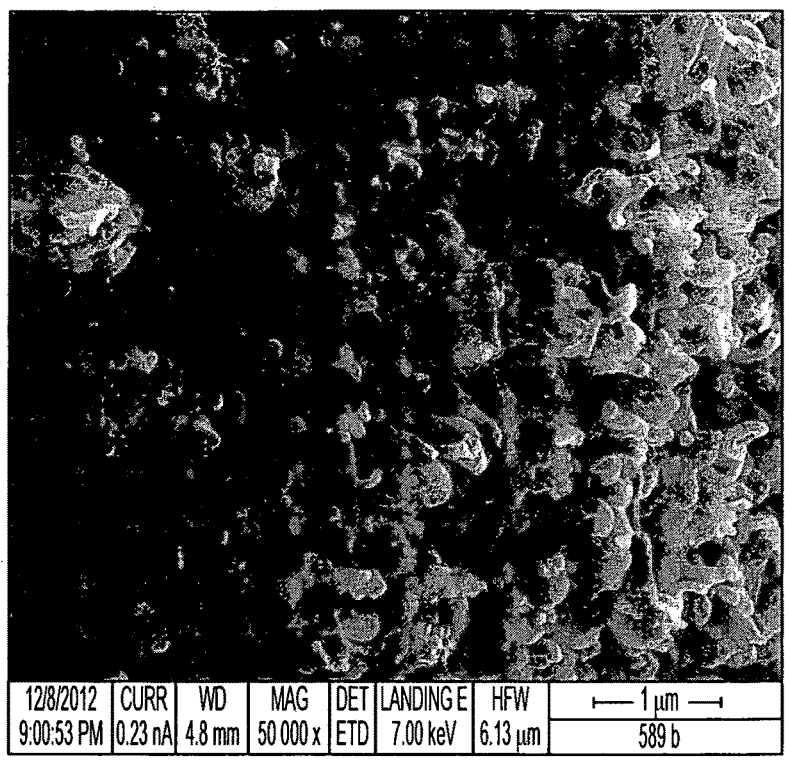
Figure 35:
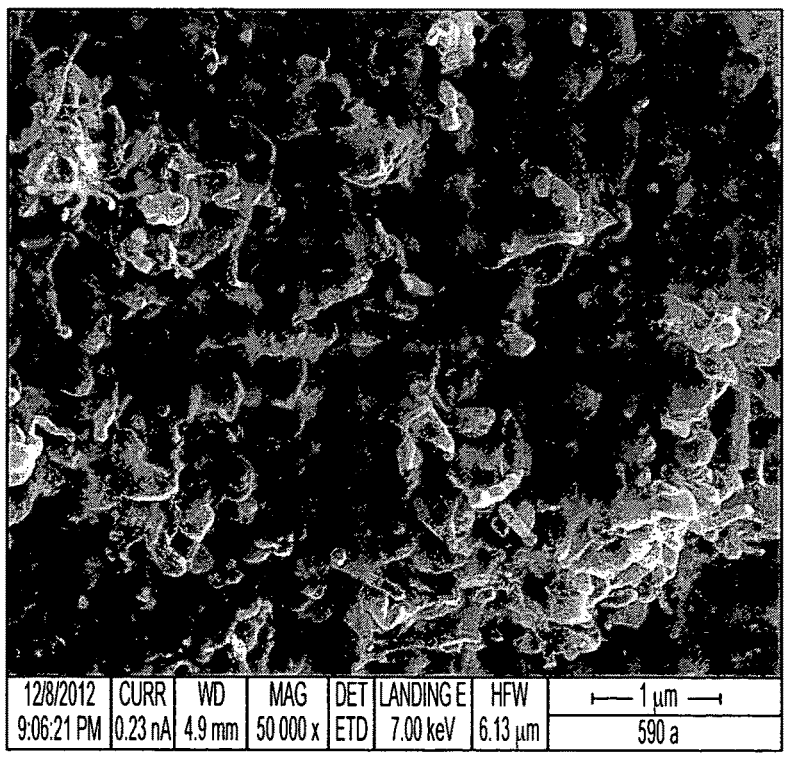
Figure 36:
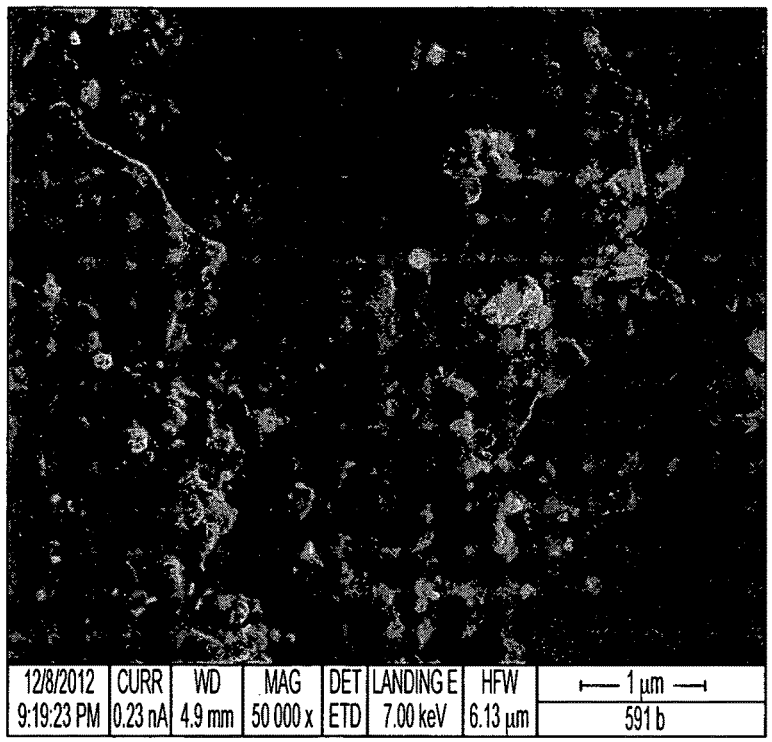

Three coupons were cut from a sheet of HAYNES® 230 alloy (an alloy having 22% Cr, 57% Ni, 14% W, 2% Mo, 3% Fe, 5% Co, 0.5% Mn, 0.4% Si, 0.3% Al, 0.10% C, 0.02 La, and 0.015% B, available from Haynes International, of Kokomo, Ind.) and were washed in hydrochloric acid to remove contaminants and oxidation. The coupons were placed in quartz boats in a quartz tube as described above. A reaction gas containing about 50% $H_2$ and 50% CO was introduced into the quartz tube at about 4.0 MPa. The gases flowed over the coupons for about 4 hours at 2000 sccm. Solid carbon formed on each coupon at the rates shown in Table 6 below. Methane, carbon dioxide, and water were also formed in the quartz tube. After the test, solid carbon was physically removed from the coupons and tested for BET specific surface area, as shown in Table 6. Samples of the solid carbon were imaged using SEM, as shown in FIGS. 34 through 36 at 50,000× magnification. About 20.9 grams of water were collected from the gases during the test.

TABLE 6

Solid Carbon Formation on HAYNES ® 230 Alloy

| Sample # | 1 | 2 | 3 |
|---|---|---|---|
| Distance from inlet (in.) | 20.8 | 24.3 | 27.9 |
| Temperature (° C.) | 639.4 | 649.5 | 629.5 |
| Deposition rate (g/cm$^2$/hr) | 0.032 | 0.073 | 0.070 |
| Surface Area (m$^2$/g) | 130.9 | 129.1 | 195.4 |
| SEM image | FIG. 34 | FIG. 35 | FIG. 36 |

Example 12: HAYNES® HR-160 Alloy

Figure 37:
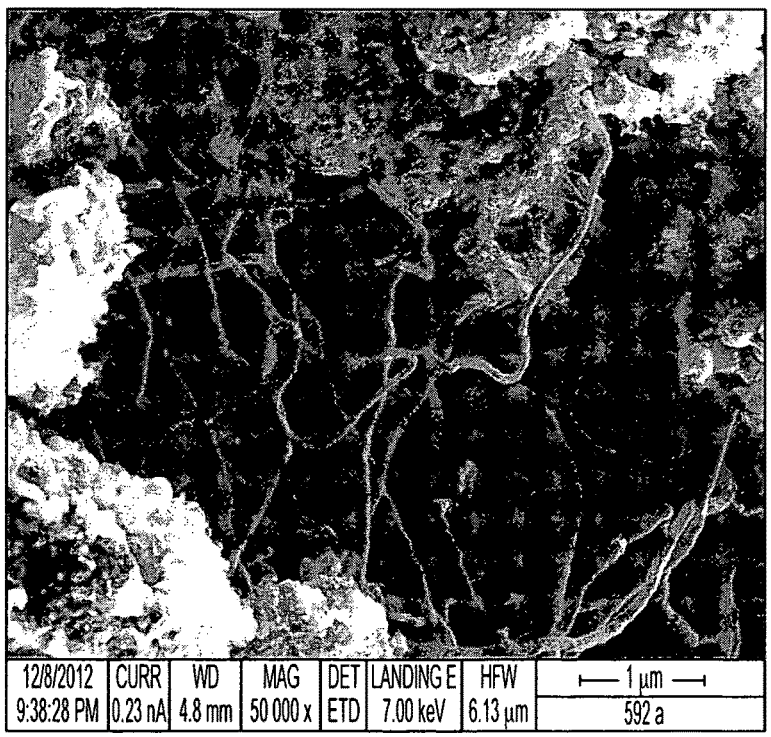
Figure 38:
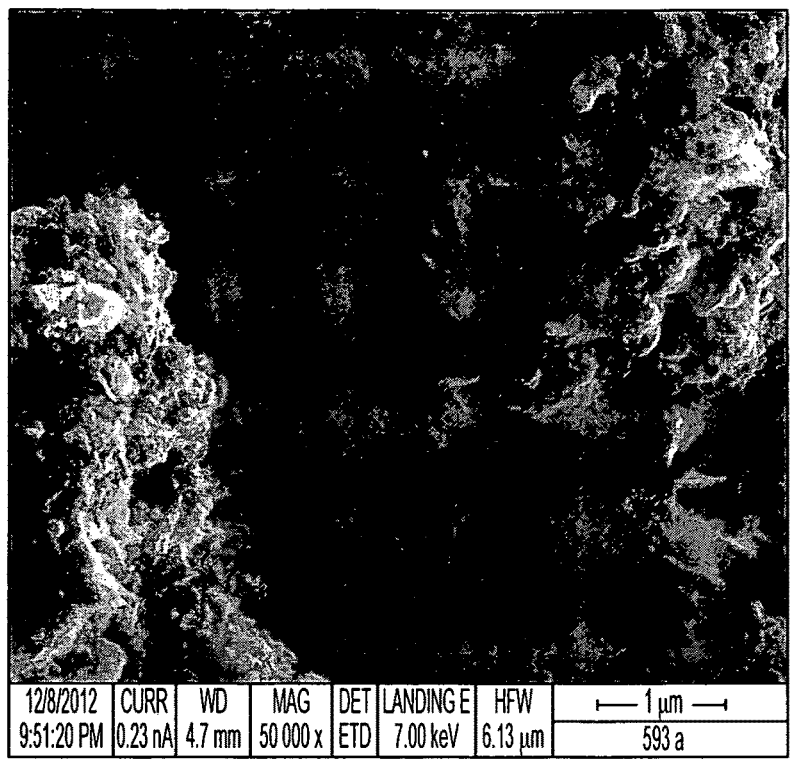
Figure 39:
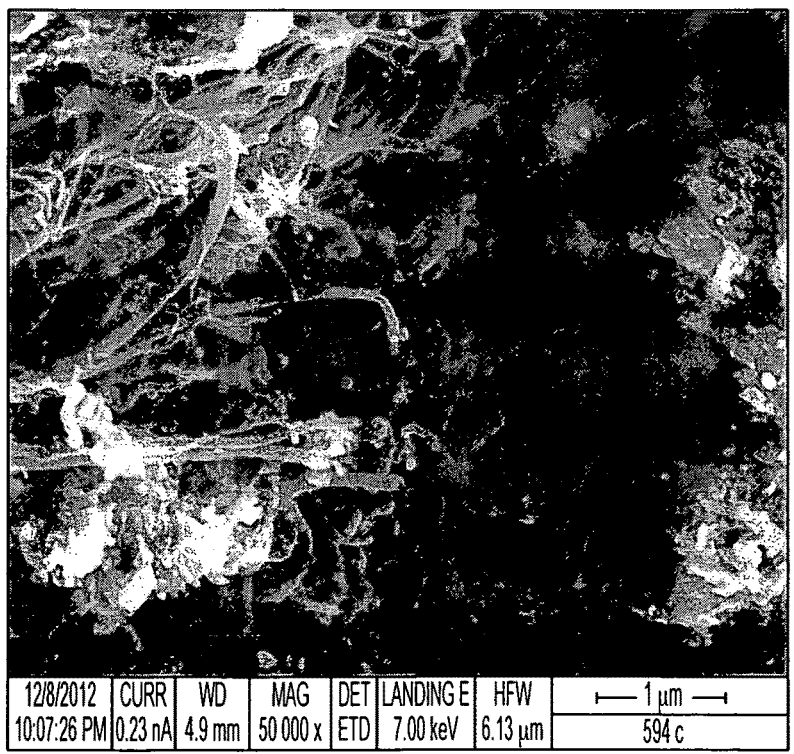

Three coupons were cut from a sheet of HAYNES® HR-160 alloy (an alloy having 28% Cr, 37% Ni, 29% Co, 2% Fe, 2.75% Si, 0.5% Mn, 0.5% Ti, 0.05% C, and up to 1% each of W, Mo, Nb, available from Haynes International, of Kokomo, Ind.) and were washed in hydrochloric acid to remove contaminants and oxidation. The coupons were placed in quartz boats in a quartz tube as described above. A reaction gas containing about 50% $H_2$ and 50% CO was introduced into the quartz tube at about 4.0 MPa. The gases flowed over the coupons for about 4 hours at 2000 sccm. Solid carbon formed on each coupon at the slow reaction rates shown in Table 7 below. Methane and carbon dioxide were formed in only small amounts. After the test, samples of the solid carbon were imaged using SEM, as shown in FIGS. 37 through 39 at 50,000× magnification. About 20.4 grams of water were collected from the gases during the test.

TABLE 7

Solid Carbon Formation on HAYNES ® HR-160 Alloy

| Sample # | 1 | 2 | 3 |
|---|---|---|---|
| Distance from inlet (in.) | 20.9 | 24.7 | 28.1 |
| Temperature (° C.) | 646.4 | 648.3 | 638.0 |
| Deposition rate (g/cm$^2$/hr) | 0.0003 | 0.0003 | 0.0002 |
| SEM image | FIG. 37 | FIG. 38 | FIG. 39 |

Example 13: NICROFER® 6025HT Alloy

Three coupons were cut from a sheet of NICROFER® 6025HT alloy (an alloy having 24%-26% Cr, 8%-11% Fe, 0.15%-0.25% C, up to 0.5% Mn, up to 0.5% Si, up to 0.10% Cu, 1.8%-2.4% Al, 0.10%-0.20% Ti, 0.05%-0.12% Y, 0.01%-0.10% Zr, up to 0.02% P, up to 0.1% S, and the balance Ni, available from ThyssenKrupp VDM, of Werdohl, Germany) and were washed in hydrochloric acid to remove contaminants and oxidation. The coupons were placed in quartz boats in a quartz tube as described above. A reaction gas containing about 50% $H_2$ and 50% CO was introduced into the quartz tube at about 4.0 MPa. The gases flowed over the coupons for about 4 hours at 2000 sccm. Solid carbon formed on each coupon at the slow reaction rates shown in Table 8 below. Methane and carbon dioxide were formed in only small amounts. After the test, solid carbon was physically removed from the coupons and samples of the solid carbon were imaged using SEM, as shown in FIGS. 34 through 36 at 50,000× magnification. About 0.48 grams of water were collected from the gases during the test.

TABLE 8

Solid Carbon Formation on NICROFER ® 6025HT Alloy

Figure 40:
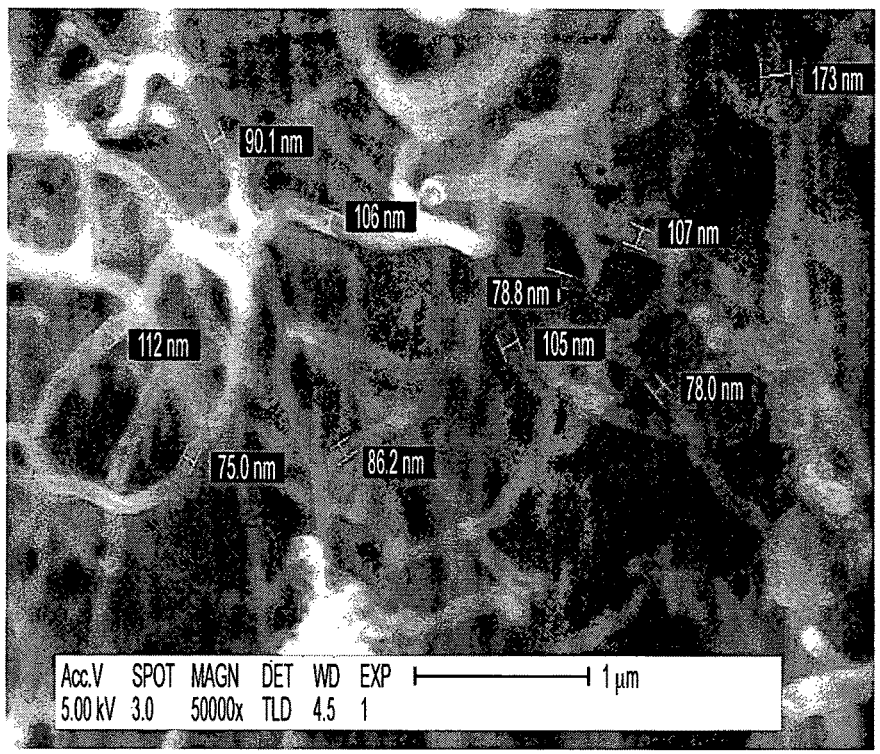
Figure 41:
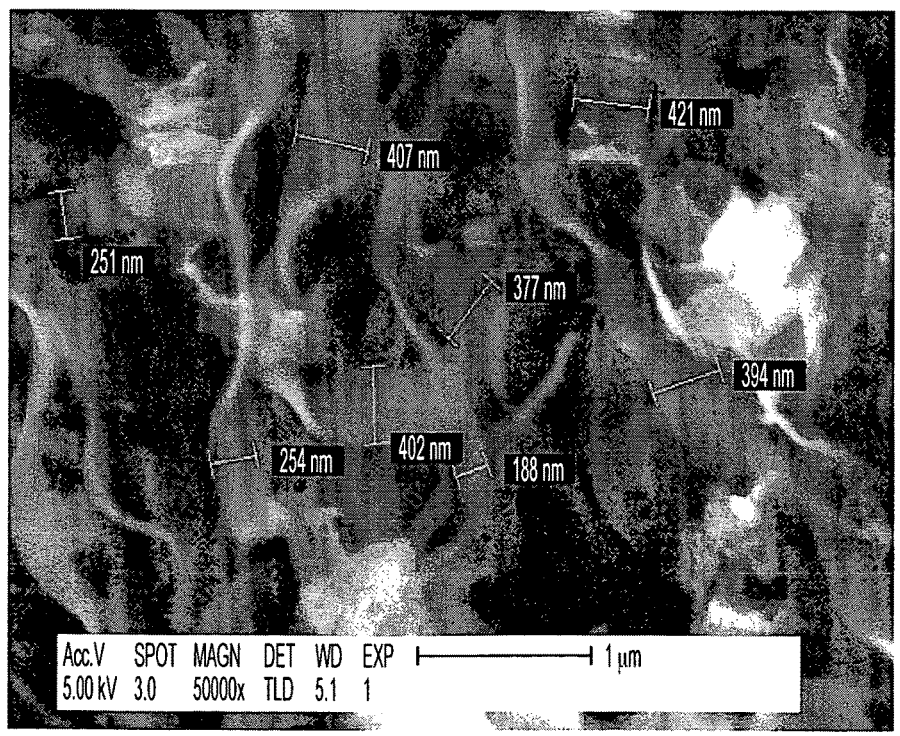
Figure 42:
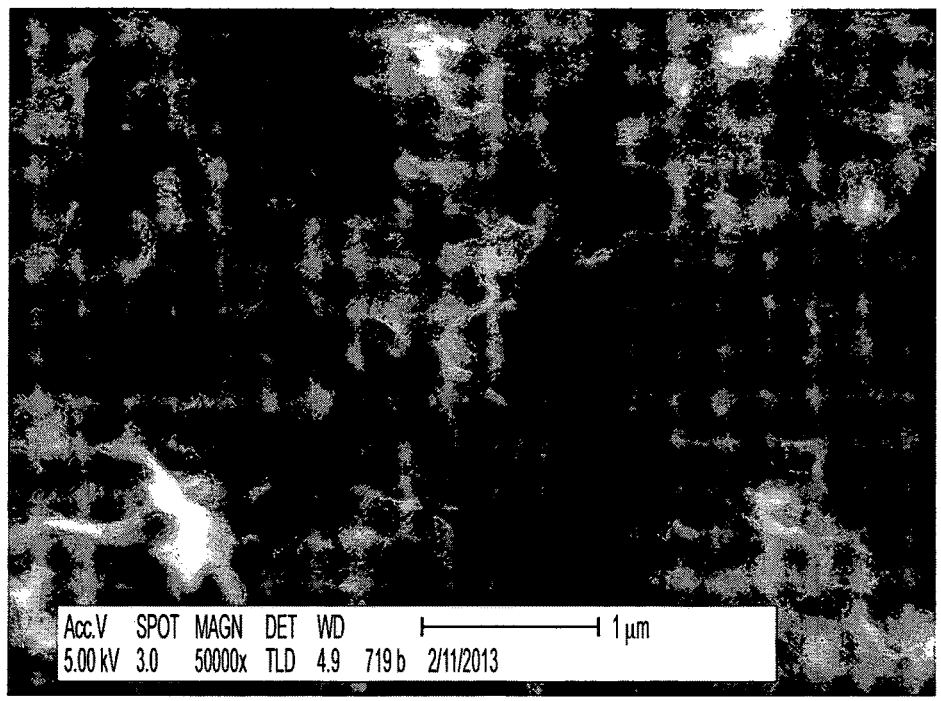

| Sample # | 1 | 2 | 3 |
|---|---|---|---|
| Distance from inlet (in.) | 20.9 | 24.1 | 28.2 |
| Temperature (° C.) | 644.8 | 649.2 | 627.3 |
| Deposition rate (g/cm²/hr) | 0.001 | 0.0005 | 0.0001 |
| SEM image | FIG. 40 | FIG. 41 | FIG. 42 |

Example 14: ASTM F321 Alloy

Figure 43:
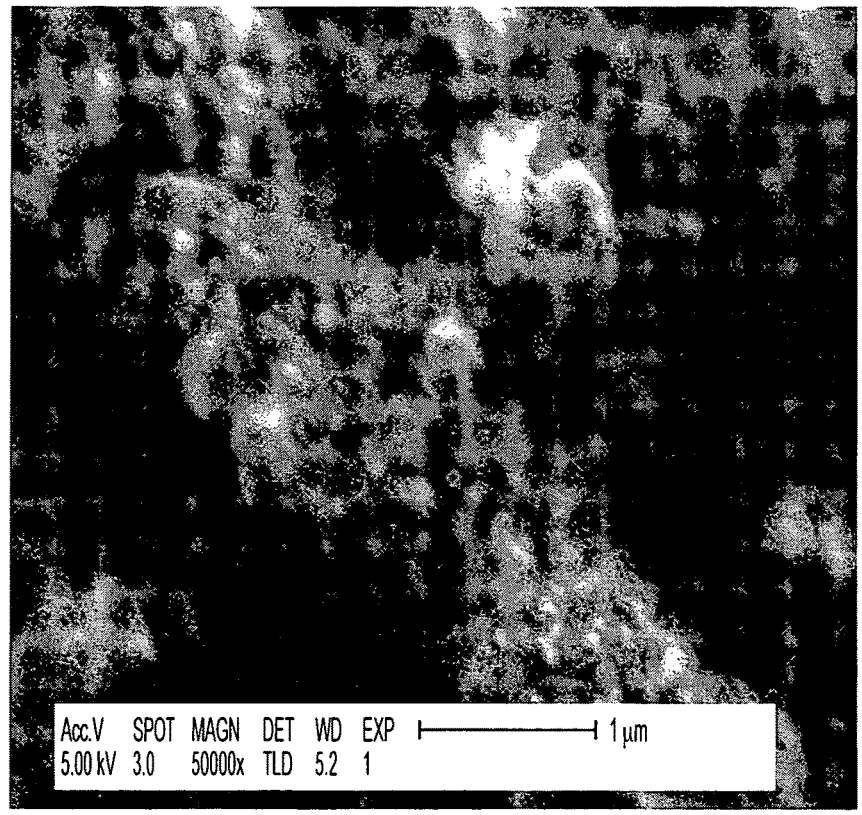
Figure 44:
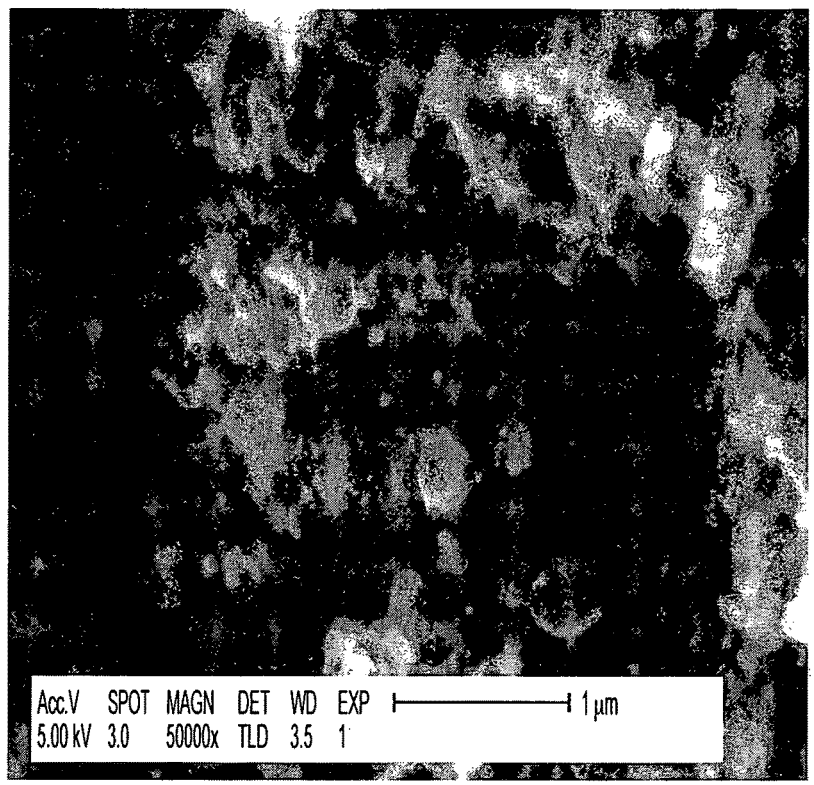
Figure 45:
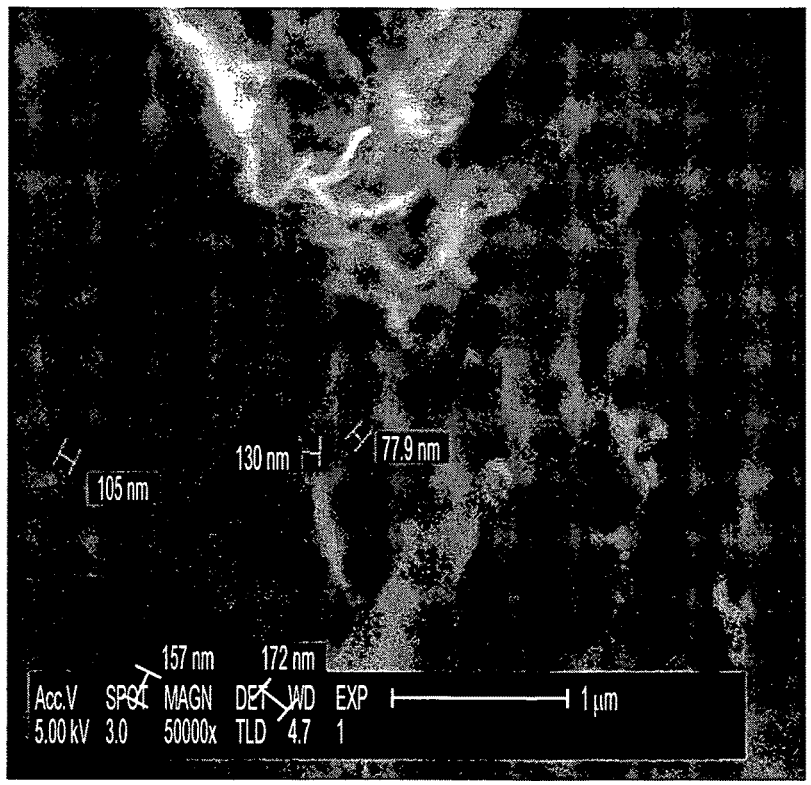

Three coupons were cut from a sheet of ASTM F321 alloy (i.e., an alloy having 0.08% C, 2.0% Mn, 0.45% P, 0.030% S, 1.0% Si, 9.0%-12.0% Ni, 17.0%-19.0% Cr, with the balance Fe, in accordance with ASTM Standard A182) and were washed in hydrochloric acid to remove contaminants and oxidation. The coupons were placed in quartz boats in a quartz tube as described above. A reaction gas containing about 50% H₂ and 50% CO was introduced into the quartz tube at about 4.0 MPa. The gases flowed over the coupons for about 4 hours at 2000 sccm. Solid carbon formed on each coupon at the rates shown in Table 9 below. Methane, carbon dioxide, and water were also formed in the quartz tube. After the test, solid carbon was physically removed from the coupons and tested for BET specific surface area, as shown in Table 9. Samples of the solid carbon were imaged using SEM, as shown in FIGS. 43 through 45 at 50,000× magnification. About 20.9 grams of water were collected from the gases during the test.

TABLE 9

Solid Carbon Formation on ASTM F321 Alloy

| Sample # | 1 | 2 | 3 |
|---|---|---|---|
| Distance from inlet (in.) | 20.8 | 24.0 | 27.5 |
| Temperature (° C.) | 653.3 | 649.4 | 630.3 |
| Deposition rate (g/cm²/hr) | 0.034 | 0.019 | 0.011 |
| Surface Area (m²/g) | 141.8 | 146.7 | 166.5 |
| SEM image | FIG. 43 | FIG. 44 | FIG. 45 |

Example 15: INCONEL® 693 Alloy

Twelve coupons were cut from a sheet of INCONEL® 693 alloy (i.e., an alloy having 27%-31% Cr, 2.5%-6.0% Fe, 2.5%-4.0% Al, 0.5%-2.5% Nb, up to 1.0% Mn, up to 1.0% Ti, up to 0.5% Cu, up to 0.5% Si, up to 0.15% C, up to 0.01% S, with the balance Ni, available from Special Metals Corporation, of New Hartford, N.Y.) and were washed in hydrochloric acid to remove contaminants and oxidation. The coupons were placed in quartz boats in a quartz tube as described above. A reaction gas containing about 50% H₂ and 50% CO was introduced into the quartz tube at about 4.0 MPa. The gases flowed over the coupons for about 5 hours at 2000 sccm. Solid carbon formed on the coupon at the rates shown in Table 10 below. Methane, carbon dioxide, and water were also formed in the quartz tube. After the test, solid carbon was physically removed from the coupons and imaged using SEM, as shown in FIGS. 46 through 54 at 50,000× magnification. About 1.1 grams of water were collected from the gases during the test.

TABLE 10

Solid Carbon Formation on INCONEL ® 693 Alloy

Figure 46:
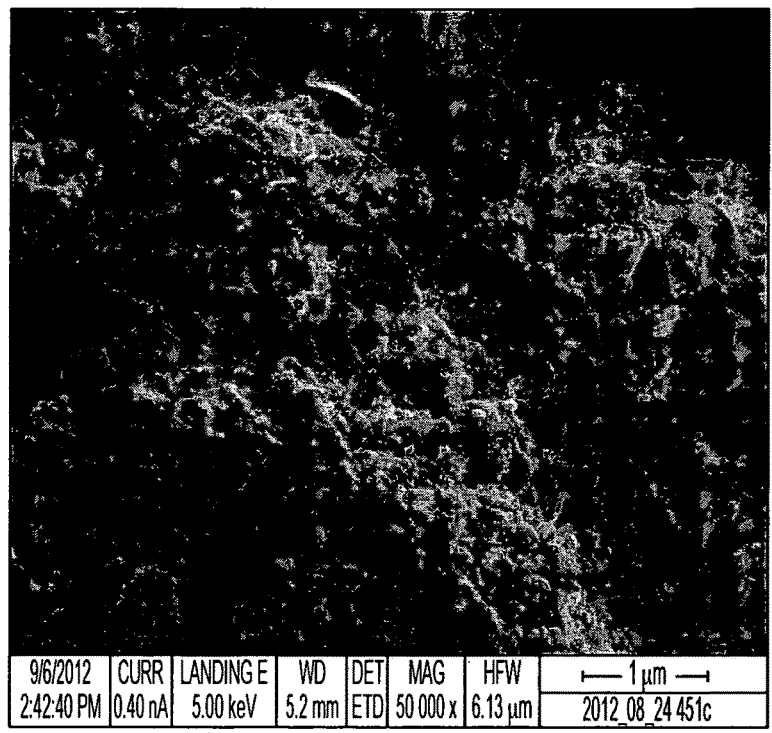
Figure 47:
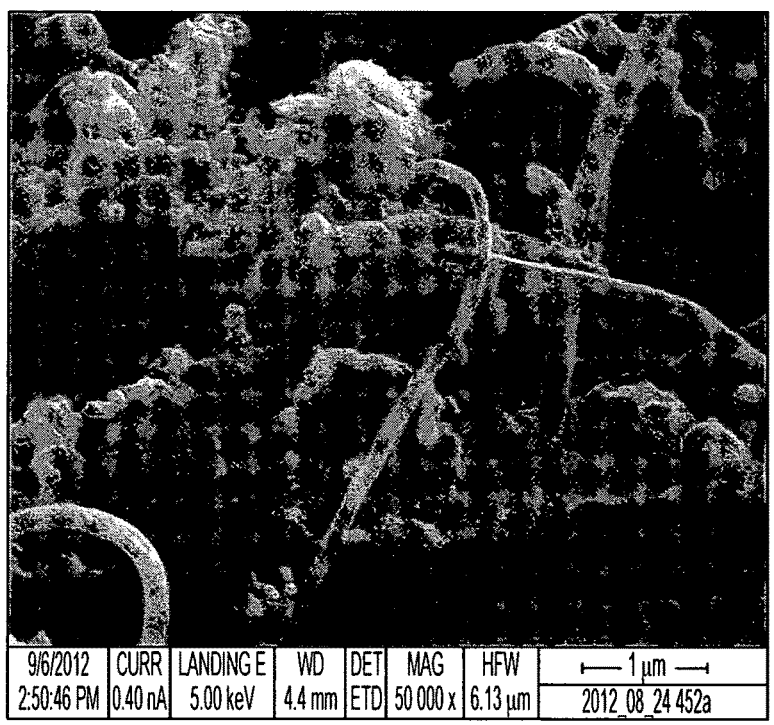
Figure 48:
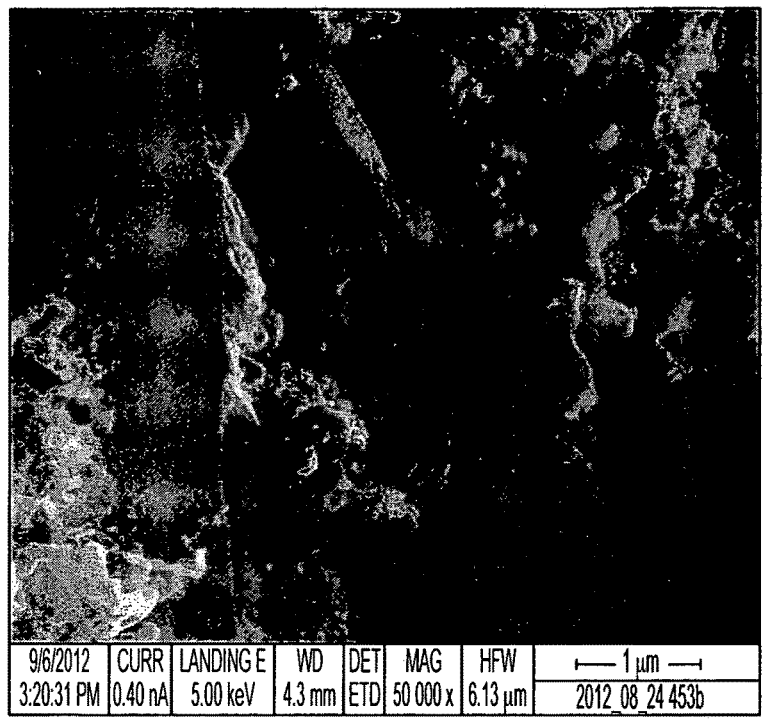
Figure 49:
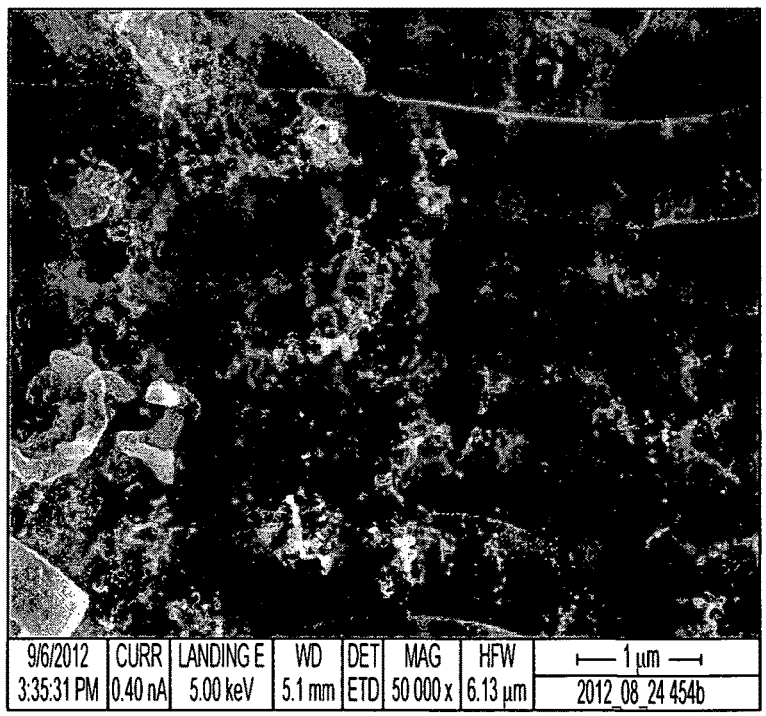

| Sample # | 1 | 2 | 3 | 4 | 5 | 6 |
|---|---|---|---|---|---|---|
| Distance from inlet (in.) | 5.8 | 9.1 | 12.5 | 16.1 | 19.5 | 23.5 |
| Temperature (° C.) | 444.2 | 582.0 | 646.1 | 688.9 | 712.7 | 744.4 |
| Deposition rate (g/cm²/hr) | 0.000 | 0.000 | 0.00034 | 0.00024 | 0.0001 | 0.0076 |
| SEM image | | | FIG. 46 | FIG. 47 | FIG. 48 | FIG. 49 |

Figure 50:
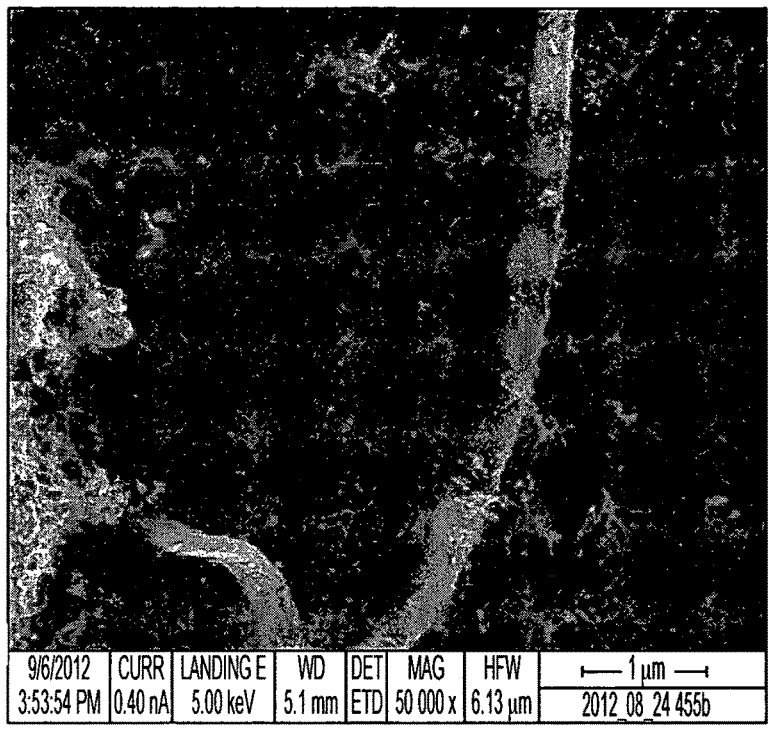
Figure 51:
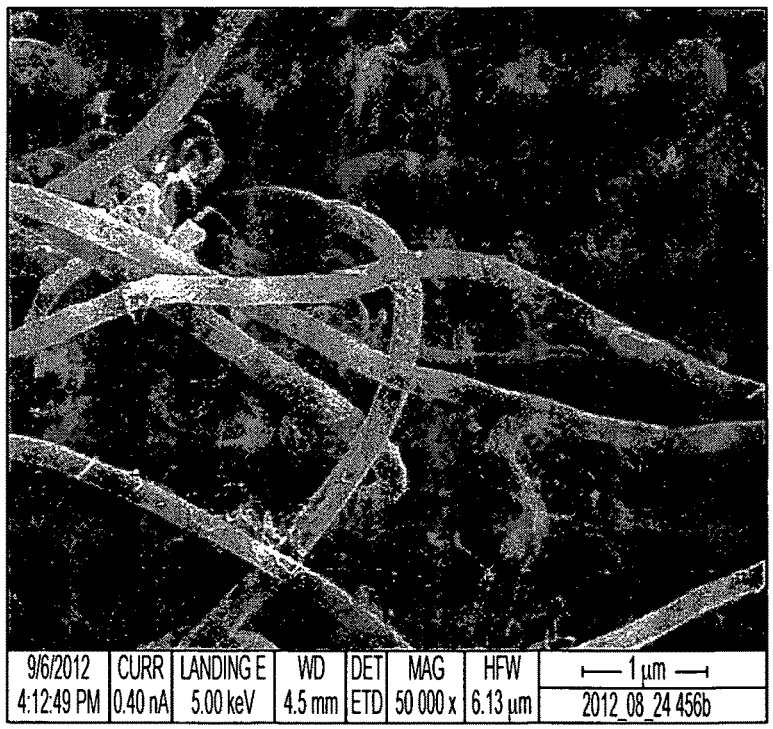
Figure 52:
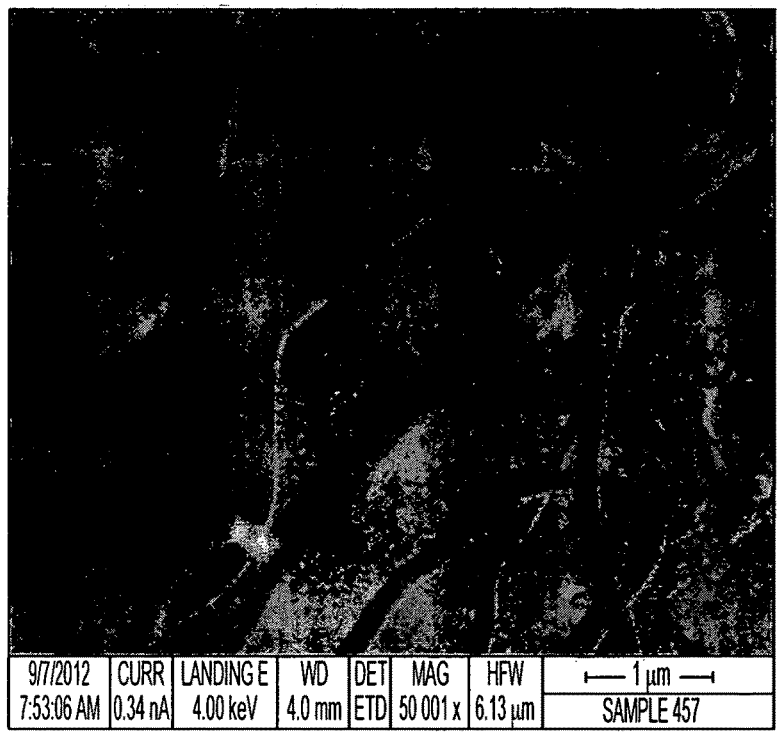
Figure 53:
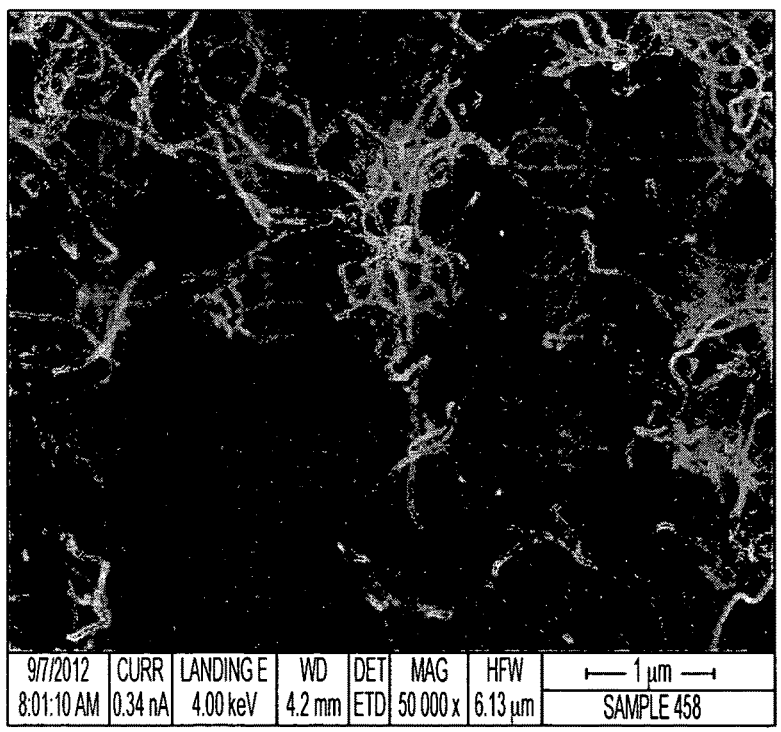
Figure 54:
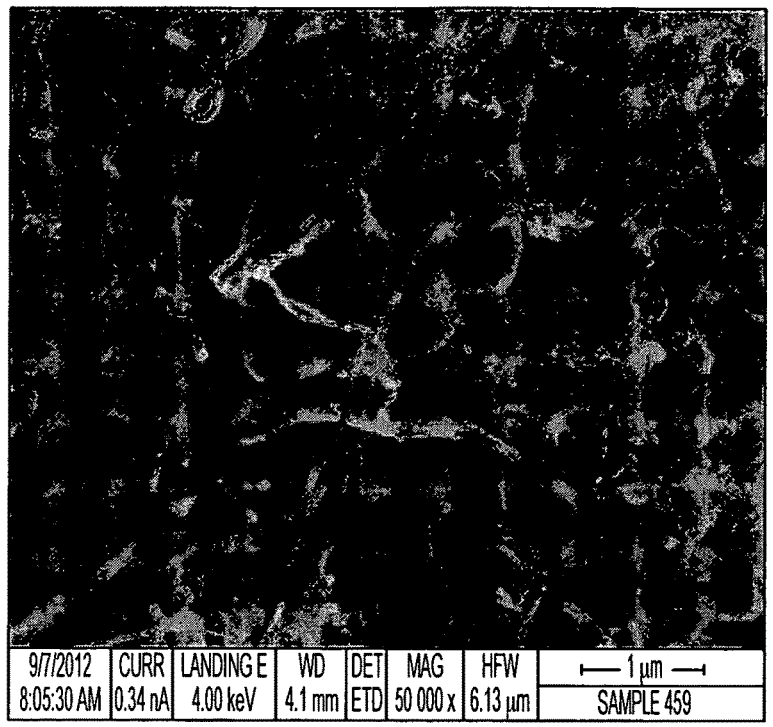

| Sample # | 7 | 8 | 9 | 10 | 11 | 12 |
|---|---|---|---|---|---|---|
| Distance from inlet (in.) | 26.8 | 30.0 | 33.4 | 36.8 | 40.9 | 44.9 |
| Temperature (° C.) | 770.2 | 801.0 | 840.5 | 885.9 | 830.4 | 435.4 |
| Deposition rate (g/cm²/hr) | 0.0061 | 0.0001 | 0.0001 | 0.0001 | <0.0001 | 0.000 |
| SEM image | FIG. 50 | FIG. 51 | FIG. 52 | FIG. 53 | FIG. 54 | |

Example 16: Alonized Stainless Steel Tube

Figure 55:
Figure 56:
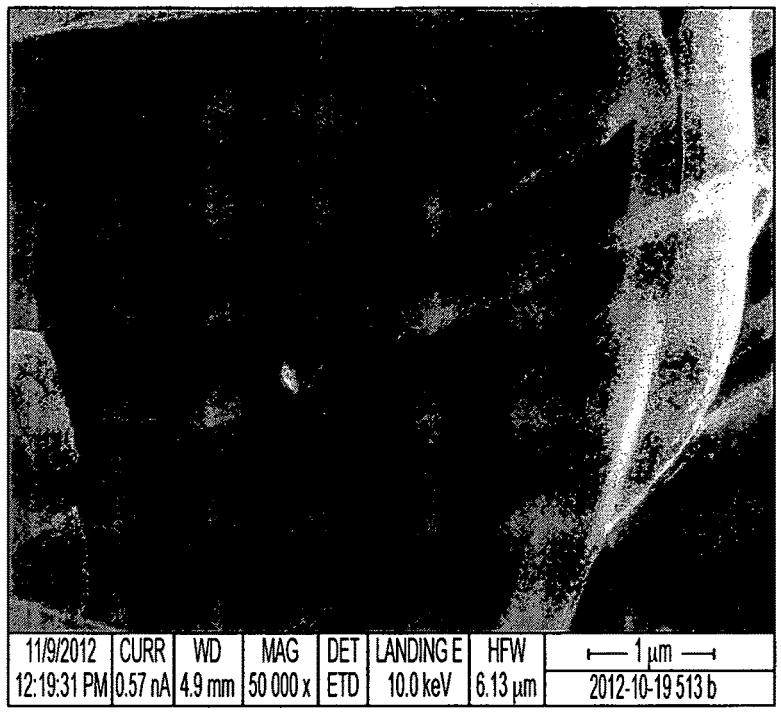

An alonized stainless steel tube was placed in a tube furnace without any coupons inside. The tube was purged with hydrogen gas to reduce the surface of the tube before the tube furnace was heated to operating conditions. After the tube furnace reached operating conditions, a reaction gas containing about 50% H₂ and 50% CO was introduced into the tube at about 4.0 MPa. The gases flowed inside the tube for about 4 hours at 2000 sccm. Solid carbon formed on the interior of the tube between a point 24 inches (60 cm) from the gas inlet and 28 inches (71 cm) from the gas inlet. Methane, carbon dioxide, and water were also formed in the quartz tube. After the test, about 2.21 g of solid carbon were collected from the tube. Samples of the solid carbon were tested for BET surface area as shown in Table 11. Samples were imaged using SEM, as shown in FIGS. 55 and 56 at 50,000× magnification. About 20.3 grams of water were collected from the gases during the test.

TABLE 11

Solid Carbon Formation in an Alonized Stainless Steel Tube

| Sample # | 1 | 2 |
|---|---|---|
| Distance from inlet (in.) | 24.0 | 28.0 |
| Temperature (° C.) | 650 | 630 |
| Deposition rate (g/cm²/hr) | 0.443 | 0.443 |
| Surface Area (m²/g) | 324.5 | 324.2 |
| SEM image | FIG. 55 | FIG. 56 |

Example 17: KANTHAL® Alloy Tube

Figure 57:
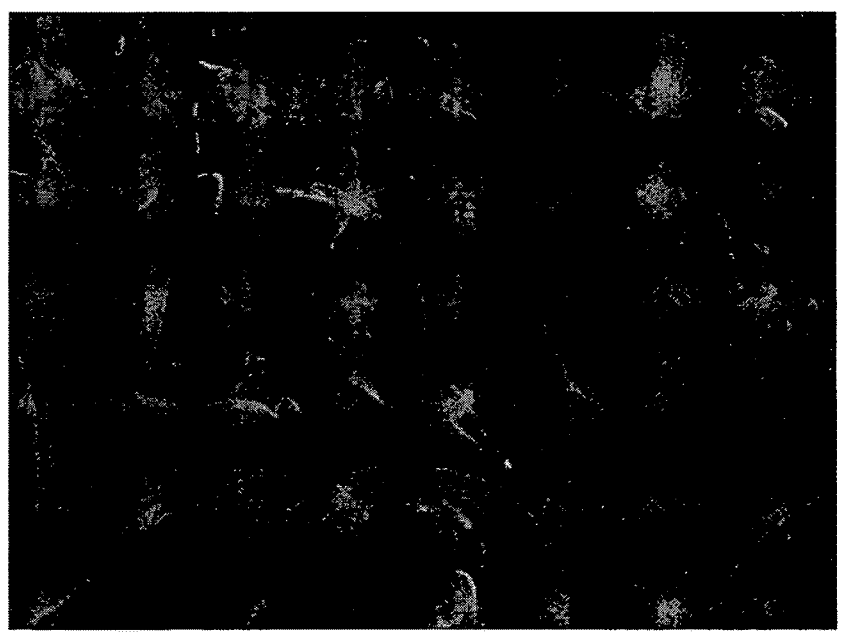

A tube formed of KANTHAL® alloy (an alloy of iron, chromium, and aluminum, available from Sandvik Materials Technology, of Sandviken, Sweden) was placed in a tube furnace without any coupons inside. The tube was purged with hydrogen gas to reduce the surface of the tube before the tube furnace was heated to operating conditions. After the tube furnace reached operating conditions, a reaction gas containing about 50% $H_2$ and 50% CO was introduced into the tube at about 4.0 MPa. The gases flowed inside the tube for about 4 hours at 2000 sccm. Very little solid carbon formed on the interior of the tube between a point 10 inches (25 cm) from the gas inlet and 33 inches (84 cm) from the gas inlet. Methane, carbon dioxide, and water formed in the tube in small amounts. After the test, about 0.1 g of solid carbon were collected from the tube. A sample of the solid carbon was imaged using SEM, as shown in FIG. 57 at 50,000× magnification. About 1.69 grams of water were collected from the gases during the test.

TABLE 12

Solid Carbon Formation in a KANTHAL ® Alloy Tube

| Sample # | 1 |
|---|---|
| Distance from inlet (in.) | 24.0 |
| Temperature (° C.) | 651 |
| Deposition rate (g/cm²/hr) | 0.0003 |
| SEM image | FIG. 57 |

Example 18: Galvanized Steel

Twelve coupons were cut from a sheet of galvanized steel (i.e., mild steel treated with zinc oxide) and were washed in ethanol to remove contaminants and oxidation. The coupons were placed in quartz boats in a quartz tube as described above. A reaction gas containing about 45% $H_2$ and 45% CO and 10% Ar was introduced into the quartz tube at about 4.0 MPa. The gases flowed over the coupons for about 4 hours at 1200 sccm. Solid carbon formed on each coupon at the rates shown in Table 13 below. Methane, carbon dioxide, and water were also formed in the quartz tube. After the test, solid carbon was physically removed from the coupons and tested for BET surface area, as shown in Table 13. Samples of the solid carbon were imaged using SEM, as shown in FIGS. 58 through 67 at 10,000× magnification. About 13.24 grams of water were collected from the gases during the test.

TABLE 13

Solid Carbon Formation on Galvanized Steel

Figure 58:
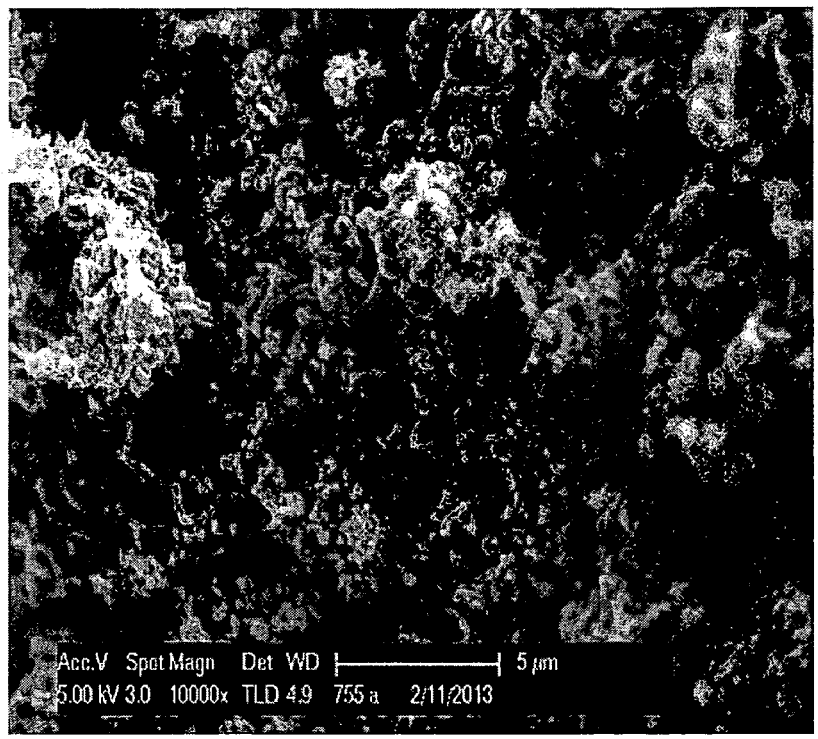
FIGS. 58 through 132 show samples of solid carbon at 10,000× magnification produced as described in Examples 18 through 31.
Figure 59:
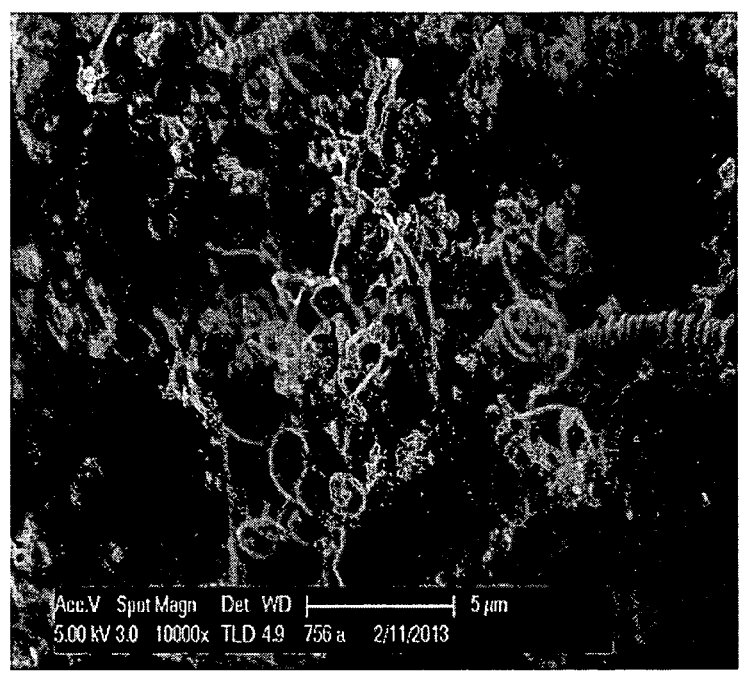
Figure 60:
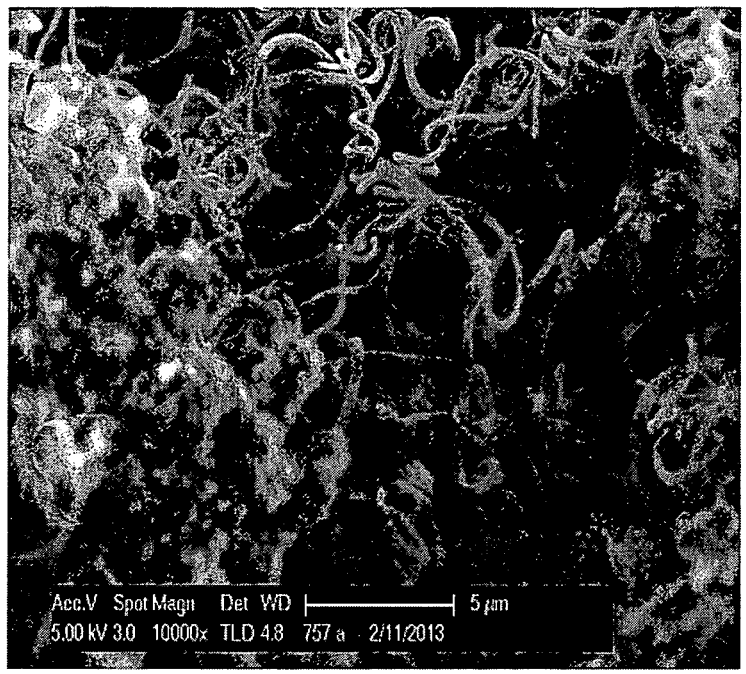
Figure 61:
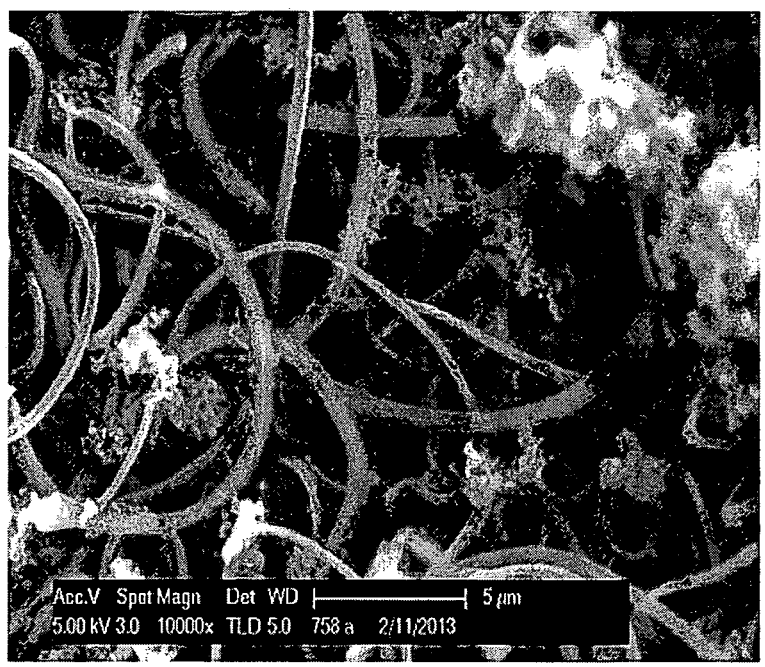

| Sample # | 1 | 2 | 3 | 4 | 5 | 6 |
|---|---|---|---|---|---|---|
| Distance from inlet (in.) | 5.0 | 9.0 | 12.4 | 16.3 | 19.1 | 23.3 |
| Temperature (° C.) | 274.9 | 468.1 | 544.6 | 595.1 | 616.4 | 646.3 |
| Deposition rate (g/cm²/hr) | 0.0000 | 0.0000 | 0.0514 | 0.0522 | 0.0359 | 0.0073 |
| Surface Area (m²/g) | | | 219.2 | 300.4 | 308.4 | 179.6 |
| SEM image | | | FIG. 58 | FIG. 59 | FIG. 60 | FIG. 61 |

Figure 62:
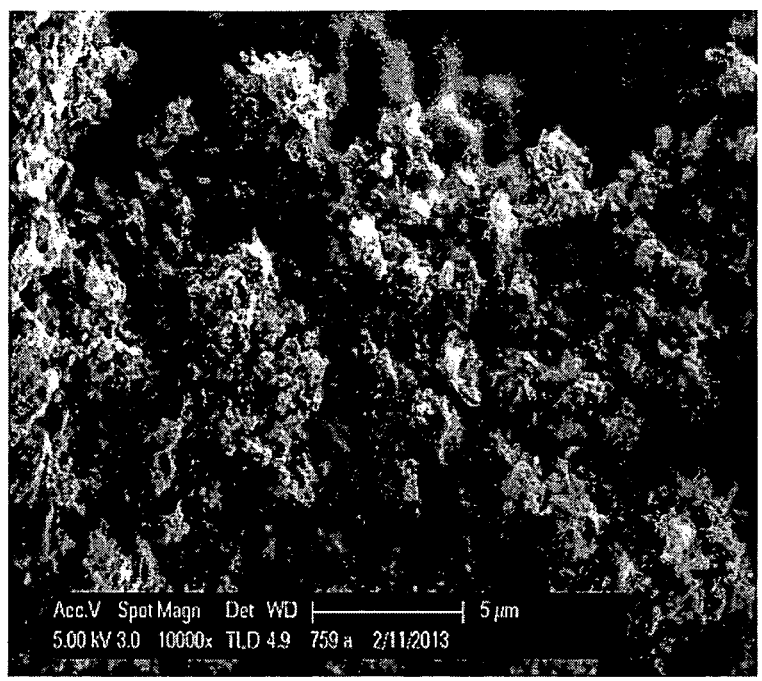
Figure 63:
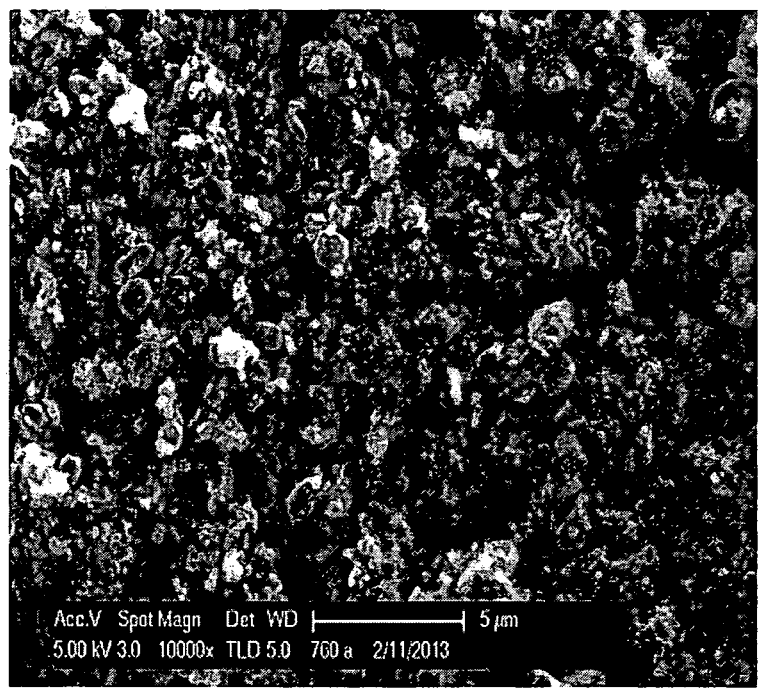
Figure 64:
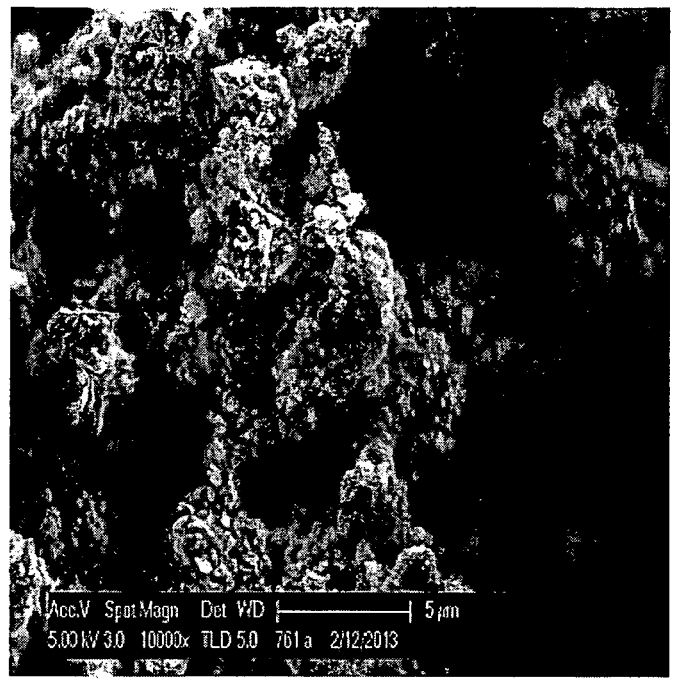
Figure 65:
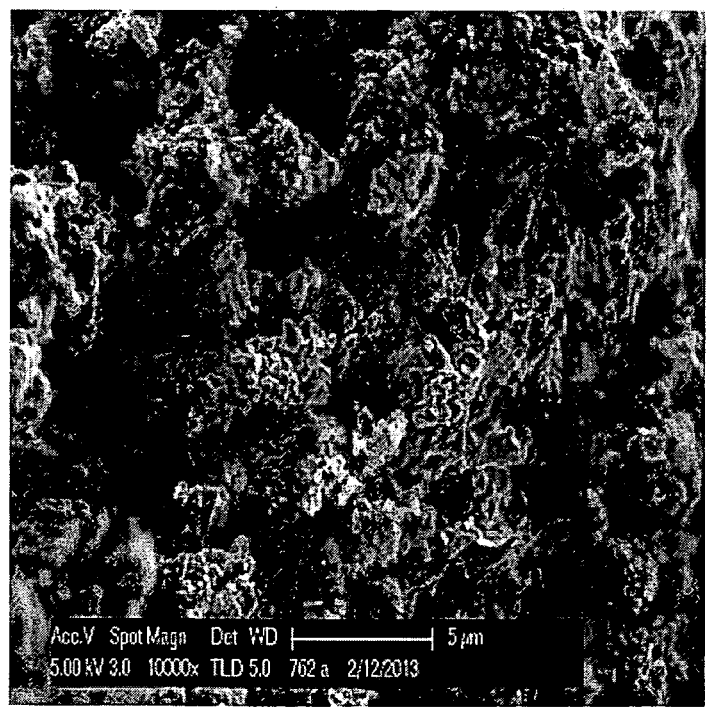
Figure 66:
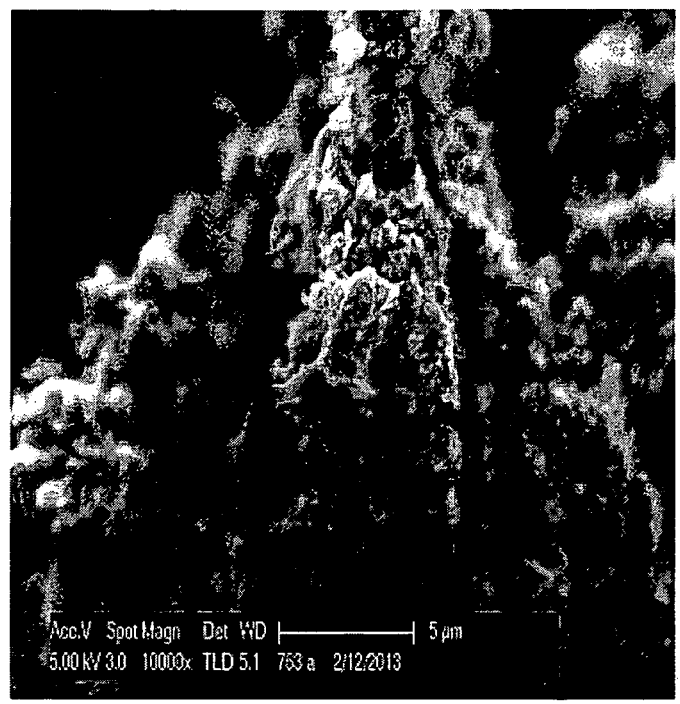
Figure 67:
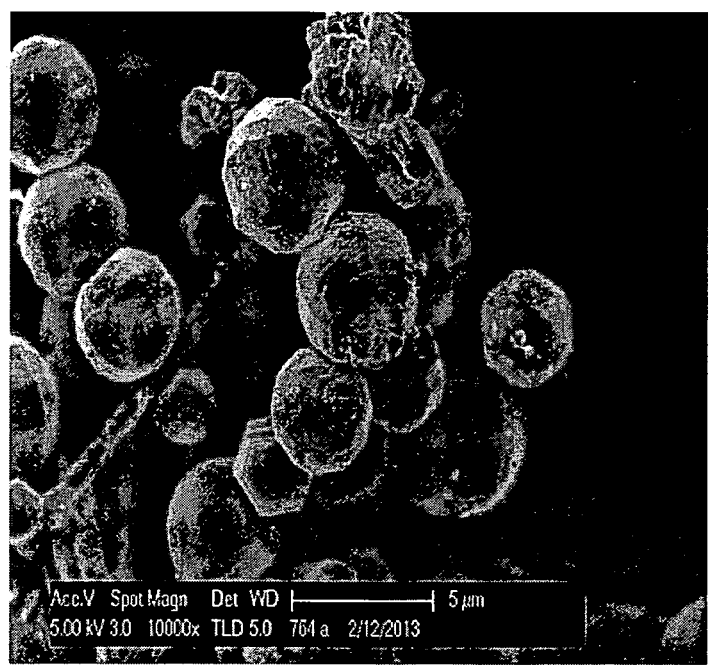

| Sample # | 7 | 8 | 9 | 10 | 11 | 12 |
|---|---|---|---|---|---|---|
| Distance from inlet (in.) | 26.8 | 30.3 | 35.4 | 37.3 | 41.2 | 44.8 |
| Temperature (° C.) | 667.1 | 696.5 | 766.0 | 790.8 | 733.0 | 413.7 |
| Deposition rate (g/cm²/hr) | 0.0067 | 0.0063 | 0.0111 | 0.0006 | 0.0137 | 0.0007 |
| Surface Area (m²/g) | 178.9 | 141.9 | 98.7 | 48.4 | 141.8 | |
| SEM image | FIG. 62 | FIG. 63 | FIG. 64 | FIG. 65 | FIG. 66 | FIG. 67 |

Example 19: Copper

Twelve coupons were cut from a sheet of copper and were washed in ethanol to remove contaminants and oxidation. The coupons were placed in quartz boats in a quartz tube as described above. A reaction gas containing about 45% $H_2$ and 45% CO and 10% Ar was introduced into the quartz tube at about 4.0 MPa. The gases flowed over the coupons for about 4 hours at 1200 sccm. Solid carbon did not appear to form at any appreciable rate on the copper coupons at the conditions shown in Table 14 below. No water was collected from the gases during the test.

TABLE 14

Solid Carbon Formation on Copper

| Sample # | 1 | 2 | 3 | 4 | 5 | 6 |
|---|---|---|---|---|---|---|
| Distance from inlet (in.) | 5.0 | 8.9 | 12.5 | 15.4 | 19.5 | 23.0 |
| Temperature (° C.) | 289.7 | 482.9 | 543.0 | 574.4 | 606.9 | 641.9 |

| Sample # | 7 | 8 | 9 | 10 | 11 | 12 |
|---|---|---|---|---|---|---|
| Distance from inlet (in.) | 26.6 | 30.1 | 33.6 | 37.1 | 40.8 | 44.4 |
| Temperature (° C.) | 690.8 | 748.4 | 797.4 | 789.3 | 710.5 | 430.2 |

Example 20: Brass

Twelve coupons were cut from a sheet of brass and were washed in ethanol to remove contaminants and oxidation. The coupons were placed in quartz boats in a quartz tube as described above. A reaction gas containing about 45% $H_2$ and 45% CO and 10% Ar was introduced into the quartz tube at about 4.0 MPa. The gases flowed over the coupons for about 4 hours at 1200 sccm. Solid carbon did not appear to form at any appreciable rate on the brass coupons at the conditions shown in Table 15 below. No water was collected from the gases during the test.

TABLE 15

Solid Carbon Formation on Brass

| Sample # | 1 | 2 | 3 | 4 | 5 | 6 |
|---|---|---|---|---|---|---|
| Distance from inlet (in.) | 5.8 | 9.4 | 12.8 | 16.5 | 20.4 | 23.4 |
| Temperature (° C.) | 297.9 | 482.2 | 556.7 | 596.0 | 623.5 | 647.4 |

TABLE 15-continued

Solid Carbon Formation on Brass

| Sample # | 7 | 8 | 9 | 10 | 11 | 12 |
|---|---|---|---|---|---|---|
| Distance from inlet (in.) | 27.1 | 30.6 | 34.0 | 37.9 | 41.3 | 45.0 |
| Temperature (° C.) | 672.0 | 705.0 | 744.4 | 798.4 | 729.6 | 390.1 |

MPa. The gases flowed over the coupons for about 4 hours at 1200 sccm. Solid carbon formed on each coupon at the rates shown in Table 17 below. Methane, carbon dioxide, and water were also formed in the quartz tube. After the test, solid carbon was physically removed from the coupons and tested for BET surface area, as shown in Table 17. Samples of the solid carbon were imaged using SEM, as shown in FIGS. 70 through 78 at 10,000× magnification. About 10.77 grams of water were collected from the gases during the test.

TABLE 17

Figure 70:
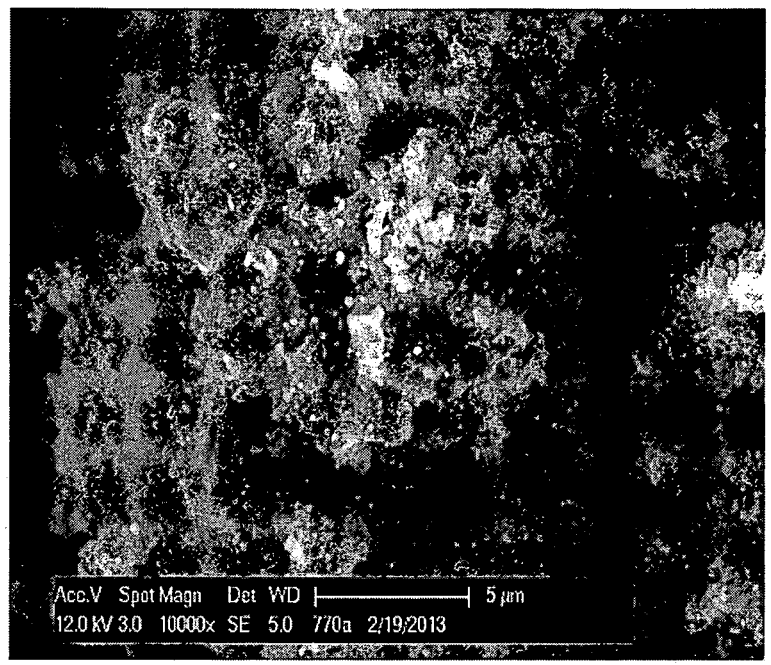
Figure 71:
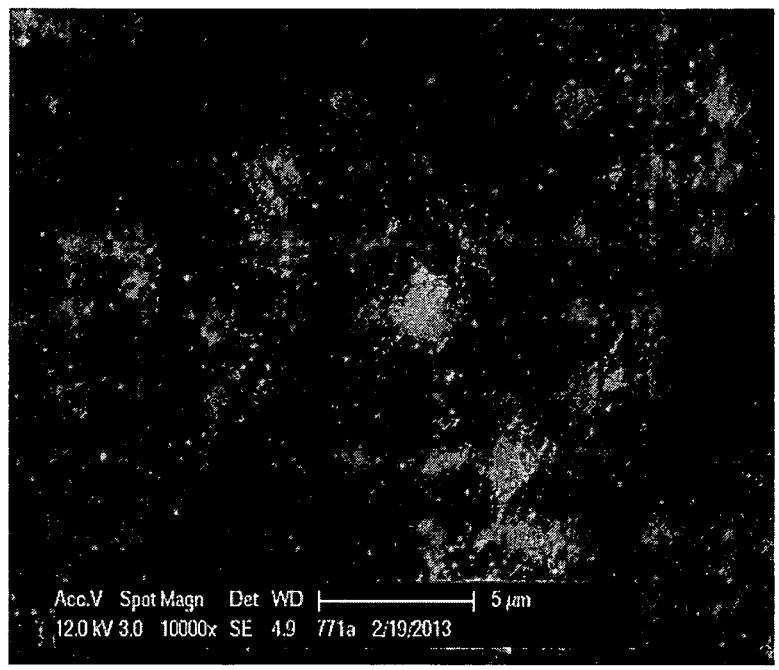
Figure 72:
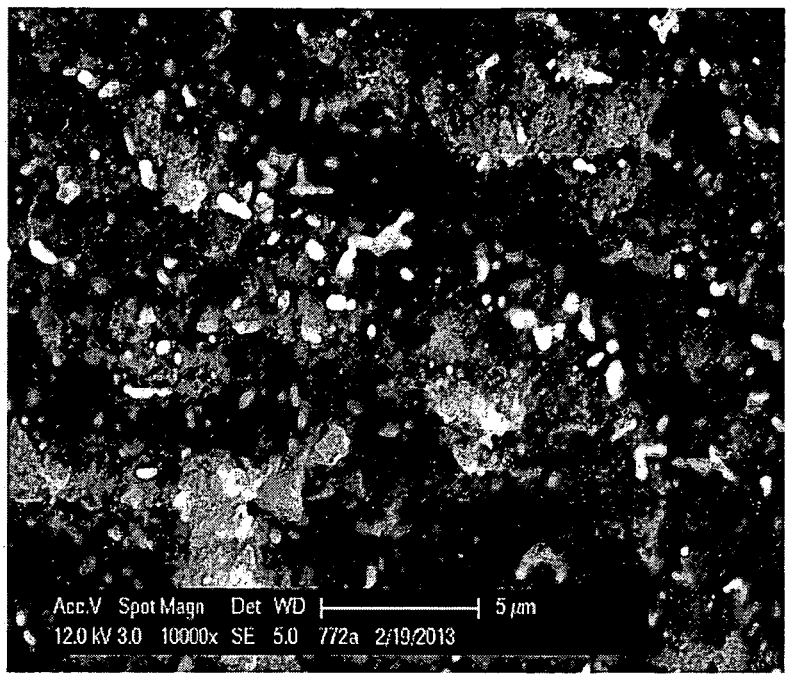
Figure 73:
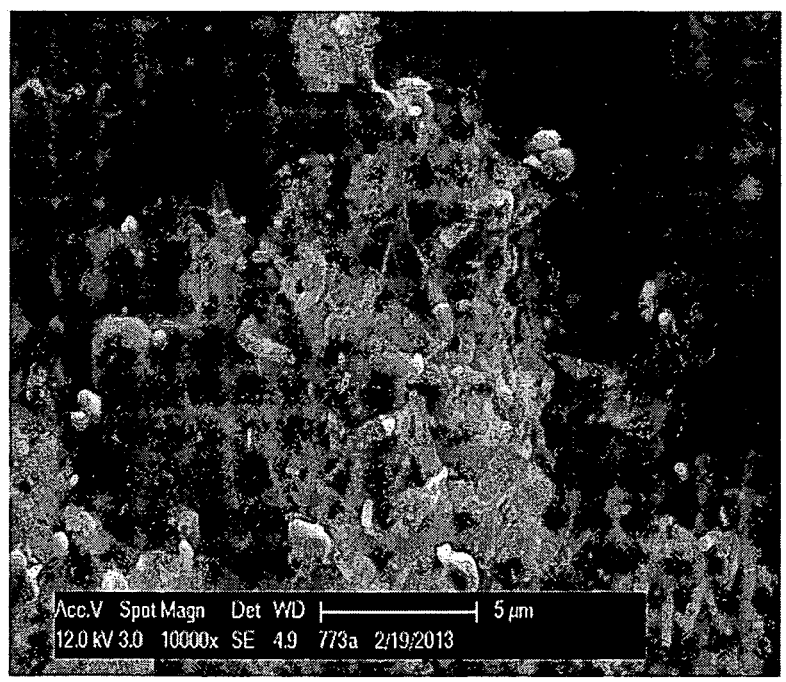
Figure 74:
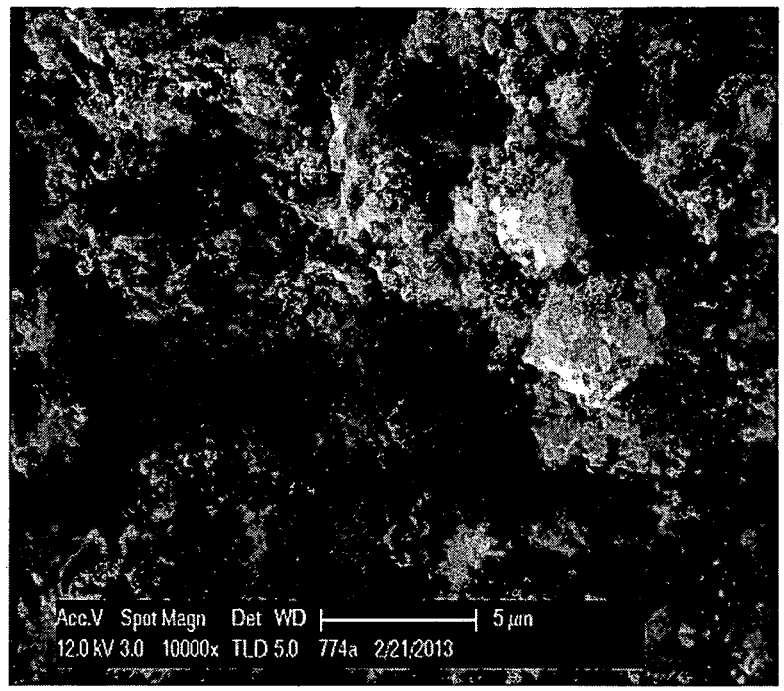
Figure 75:
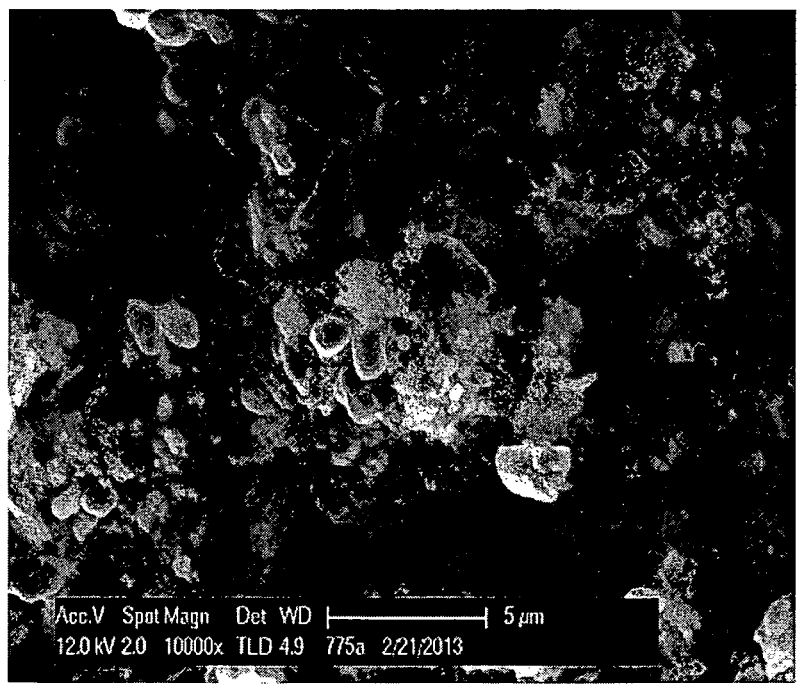
Figure 76:
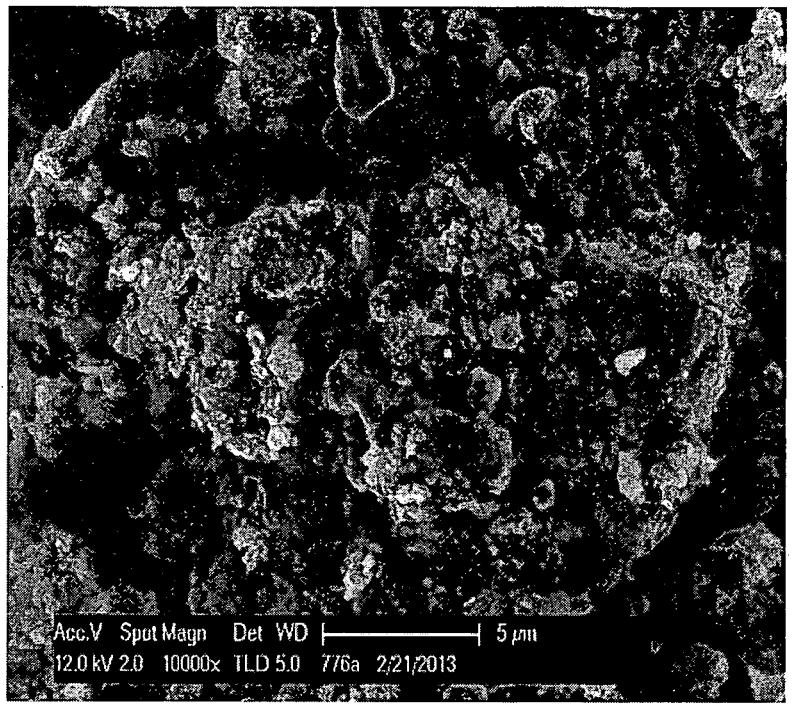
Figure 77:
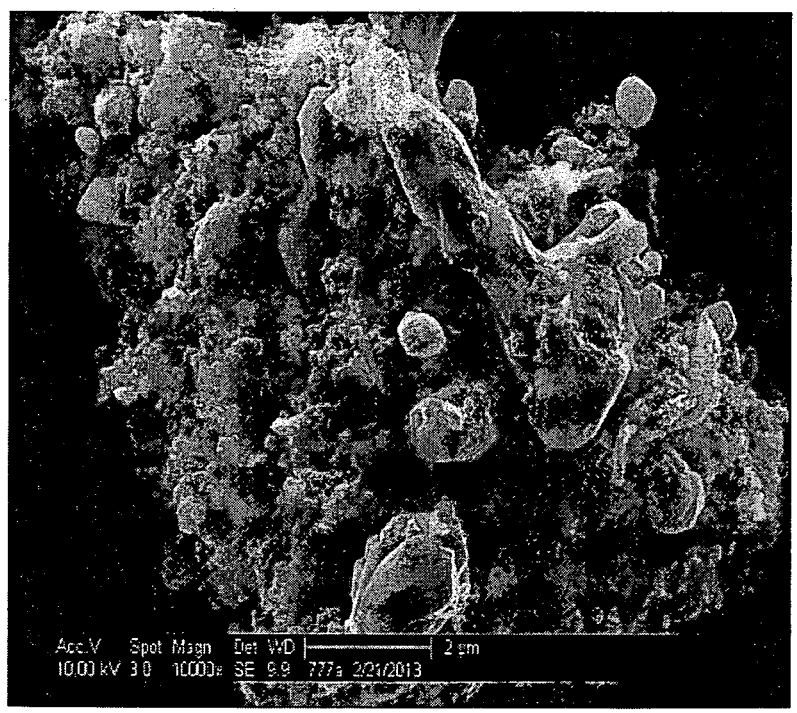
Figure 78:
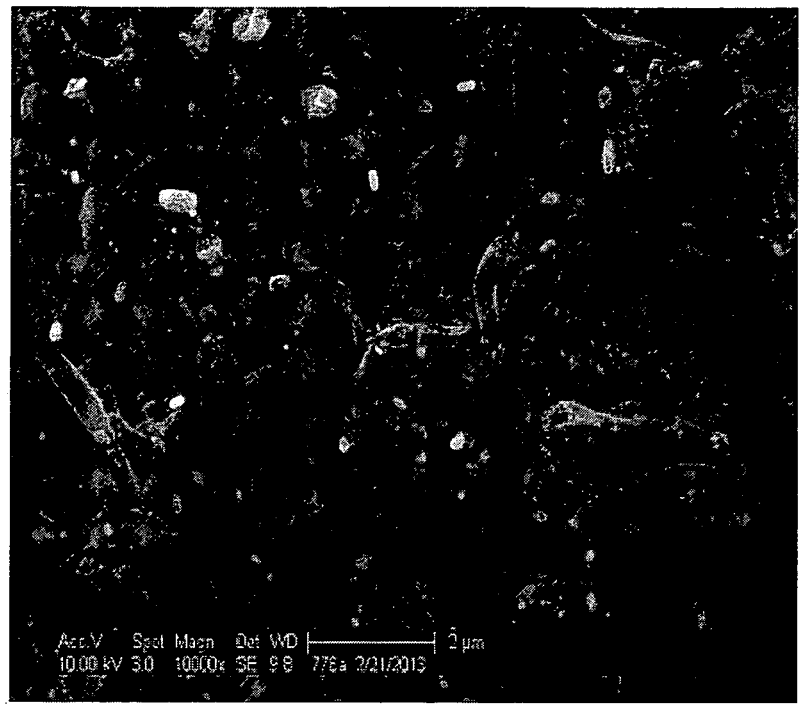

| Solid Carbon Formation on Cold-rolled Steel | | | | | | |
|---|---|---|---|---|---|---|
| Sample # | 1 | 2 | 3 | 4 | 5 | 6 |
| Distance from inlet (in.) | 5.0 | 8.9 | 12.4 | 16.1 | 19.7 | 23.4 |
| Temperature (° C.) | 299.4 | 483.2 | 544.4 | 582.9 | 609.7 | 647.0 |
| Deposition rate (g/cm$^2$/hr) | 0.000 | 0.0001 | 0.064 | 0.023 | 0.009 | 0.007 |
| Surface Area (m$^2$/g) | | | 239.1 | 277.2 | 259.5 | 174.9 |
| SEM image | | | FIG. 70 | FIG. 71 | FIG. 72 | FIG. 73 |
| Sample # | 7 | 8 | 9 | 10 | 11 | 12 |
| Distance from inlet (in.) | 26.8 | 30.1 | 33.9 | 37.3 | 41.6 | 45.0 |
| Temperature (° C.) | 692.7 | 751.3 | 800.5 | 787.6 | 657.4 | 359.2 |
| Deposition rate (g/cm$^2$/hr) | 0.008 | 0.011 | 0.003 | 0.021 | 0.036 | 0.000 |
| Surface Area (m$^2$/g) | 164.9 | 95.3 | | 91.9 | 232.1 | |
| SEM image | FIG. 74 | FIG. 75 | FIG. 76 | FIG. 77 | FIG. 78 | |

Example 21: Molybdenum

Figure 68:
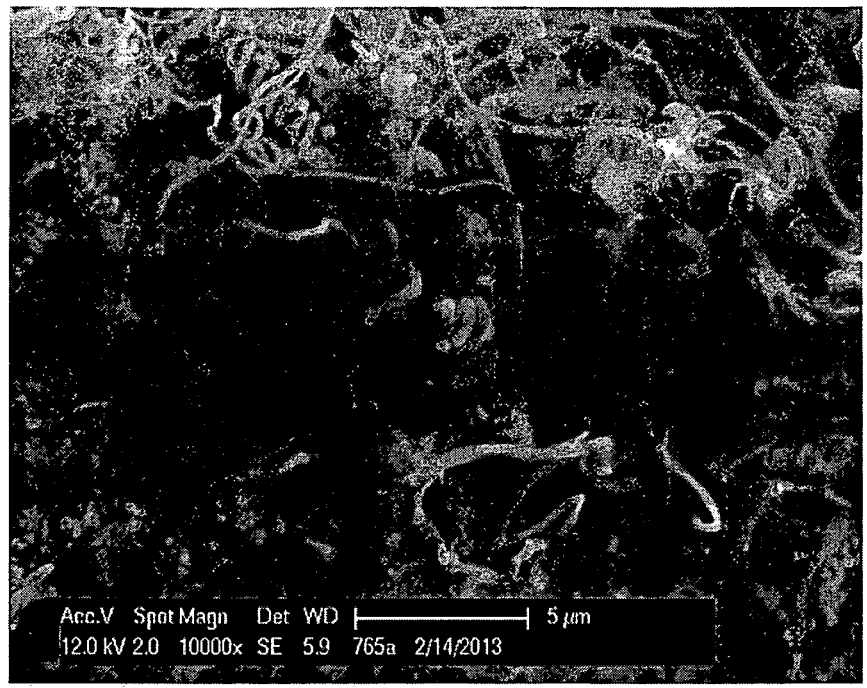
Figure 69:
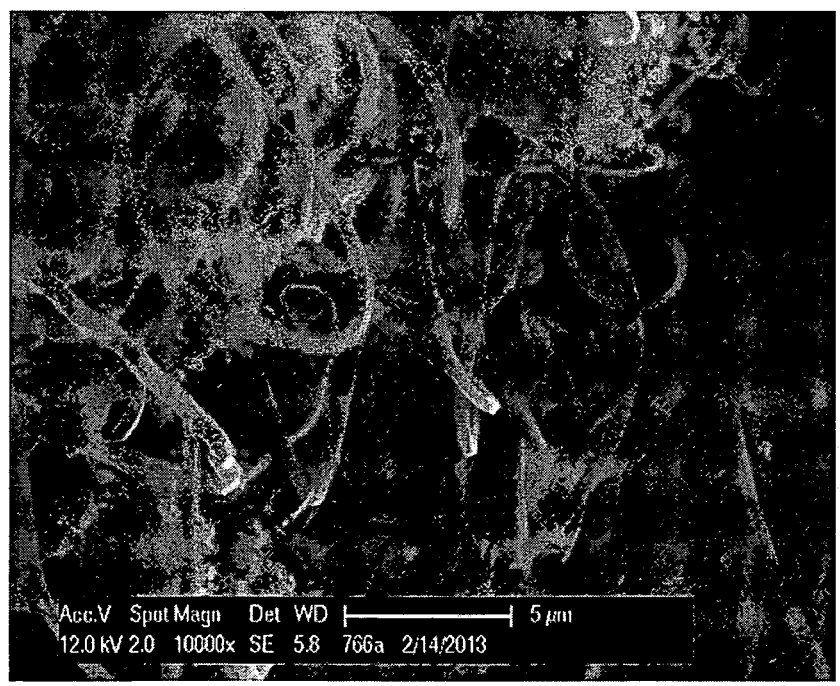

Three coupons were cut from a sheet of molybdenum metal and were washed in ethanol to remove contaminants and oxidation. The coupons were placed in quartz boats in a quartz tube as described above. A reaction gas containing about 45% $H_2$ and 45% CO and 10% Ar was introduced into the quartz tube at about 4.0 MPa. The gases flowed over the coupons for about 4 hours at 2000 sccm. Solid carbon formed on each coupon at the rates shown in Table 16 below. Some methane and carbon dioxide formed in the quartz tube. After the test, solid carbon was physically removed from the coupons and measured, as shown in Table 16. Samples of the solid carbon were imaged using SEM, as shown in FIGS. 68 and 69 at 10,000× magnification. No detectable water was collected from the gases during the test.

TABLE 16

| Solid Carbon Formation on Molybdenum | | | |
|---|---|---|---|
| Sample # | 1 | 2 | 3 |
| Distance from inlet (in.) | 21.875 | 25.25 | 28.25 |
| Temperature (° C.) | 626.91 | 671.43 | 713.37 |
| Deposition rate (g/cm$^2$/hr) | 0.00009 | 0.00028 | 0.00027 |
| SEM image | | FIG. 68 | FIG. 69 |

Example 22: Cold-Rolled Steel

Twelve coupons were cut from a sheet of cold-rolled steel (i.e., mild steel) and were washed in hydrochloric acid to remove contaminants and oxidation. The coupons were placed in quartz boats in a quartz tube as described above. A reaction gas containing about 45% $H_2$ and 45% CO and 10% Ar was introduced into the quartz tube at about 4.0

Example 23 Molybdenum Wire

Figure 79:
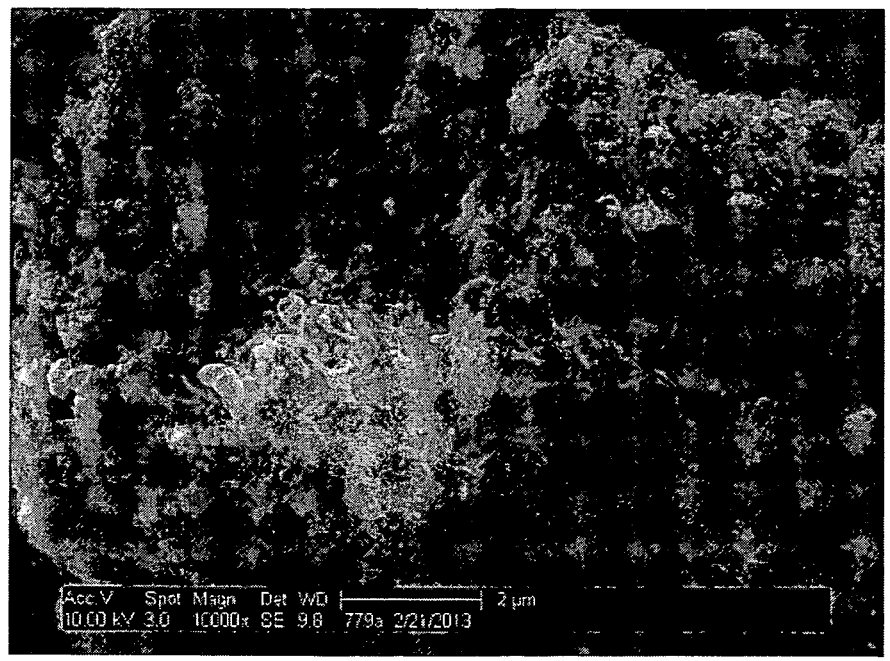
Figure 80:
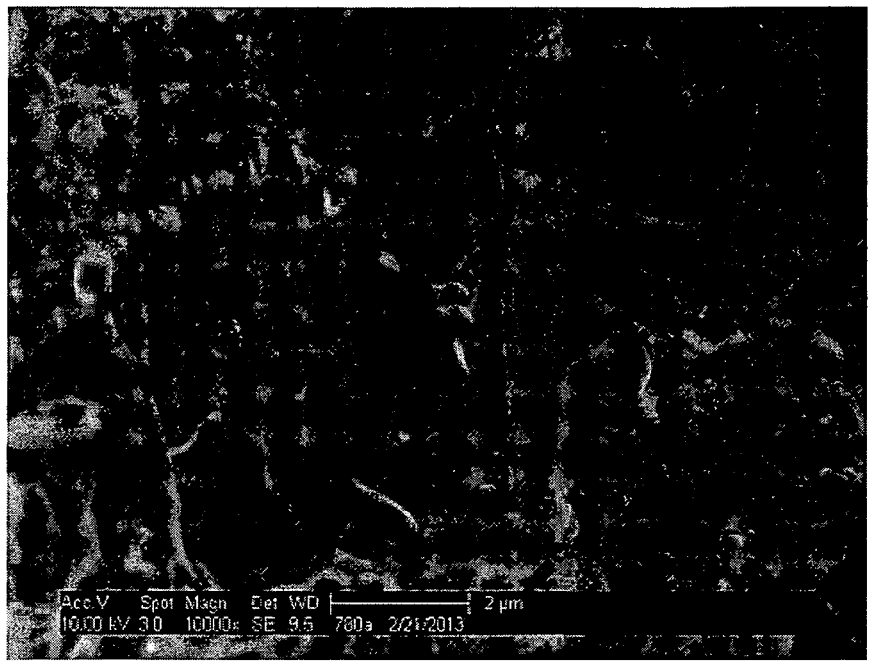
Figure 81:

Three pieces of wire, each about 2.5 cm to about 3.0 cm long, were cut from a roll of about 2.3 mm diameter molybdenum wire and were washed in ethanol to remove contaminants and oxidation. The wires were placed in quartz boats in a quartz tube as described above. A reaction gas containing about 50% $H_2$ and 50% CO was introduced into the quartz tube at about 4.0 MPa. The gases flowed over the wires for about 4 hours at 2000 sccm. Solid carbon formed on each wire at the rates shown in Table 18 below. Methane, carbon dioxide, and water were also formed in the quartz tube. After the test, solid carbon was physically removed from the coupons and measured, as shown in Table 18. Samples of the solid carbon were imaged using SEM, as shown in FIGS. 79 through 81 at 10,000× magnification. About 1.11 grams of water were collected from the gases during the test.

TABLE 18

| Solid Carbon Formation on Molybdenum Wire | | | |
|---|---|---|---|
| Sample # | 1 | 2 | 3 |
| Distance from inlet (in.) | 19.3 | 23.9 | 27.1 |
| Temperature (° C.) | 636.7 | 649.8 | 645.0 |
| Deposition rate (g/cm$^2$/hr) | 0.0001 | 0.0002 | 0.0001 |
| SEM image | FIG. 79 | FIG. 80 | FIG. 81 |

Example 26: Galvanized Heat-Treated Steel

Twelve coupons were cut from a sheet of galvanized mild steel (i.e., mild steel treated with zinc oxide) that has been heat-treated (as available from Hercules Industries, of Denver, Colo., under the trade name PAINTLOCK) and were washed in ethanol to remove contaminants and oxidation. The coupons were placed in quartz boats in a quartz tube as described above. A reaction gas containing about 45% $H_2$ and 45% CO and 10% Ar was introduced into the quartz tube at about 4.0 MPa. The gases flowed over the coupons for about 4 hours at 1200 sccm. Solid carbon formed on each coupon at the rates shown in Table 19 below. Methane, carbon dioxide, and water were also formed in the quartz tube. After the test, solid carbon was physically removed from the coupons and tested for BET surface area, as shown in Table 19. Samples of the solid carbon were imaged using SEM, as shown in FIGS. 82 through 90 at 10,000× magnification. About 12.6 grams of water were collected from the gases during the test.

TABLE 19

Solid Carbon Formation on Galvanized Heat-Treated Steel

Figure 82:
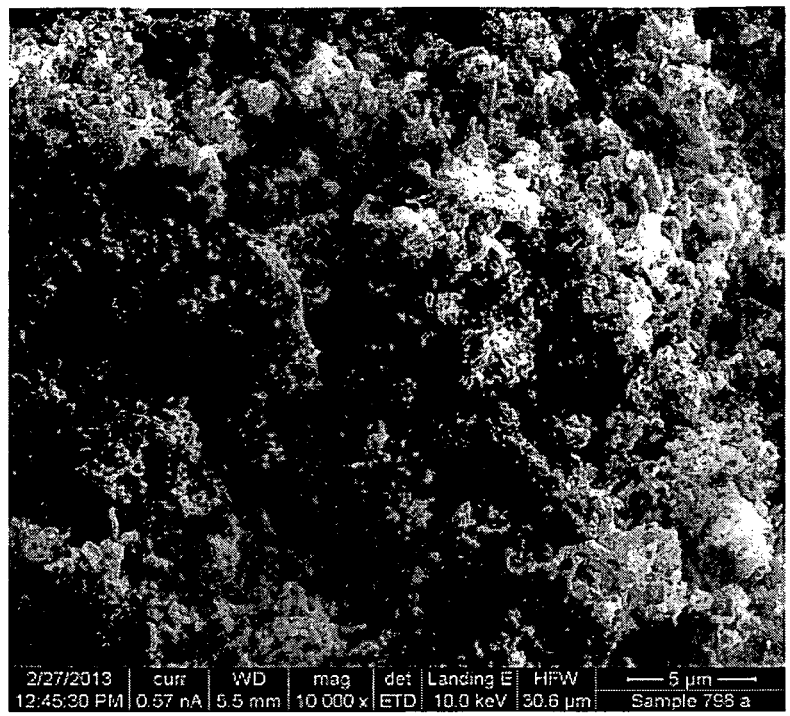
Figure 83:

| Sample # | 1 | 2 | 3 | 4 |
|---|---|---|---|---|
| Distance from inlet (in.) | 5.3 | 8.8 | 12.0 | 15.8 |
| Temperature (° C.) | 305.4 | 475.4 | 531.0 | 575.8 |
| Deposition rate ($g/cm^2/hr$) | 0.00000 | 0.00001 | 0.00061 | 0.0389 |
| Surface Area ($m^2/g$) | | | 110.1 | 260.5 |
| SEM image | | | FIG. 82 | FIG. 83 |

Figure 84:
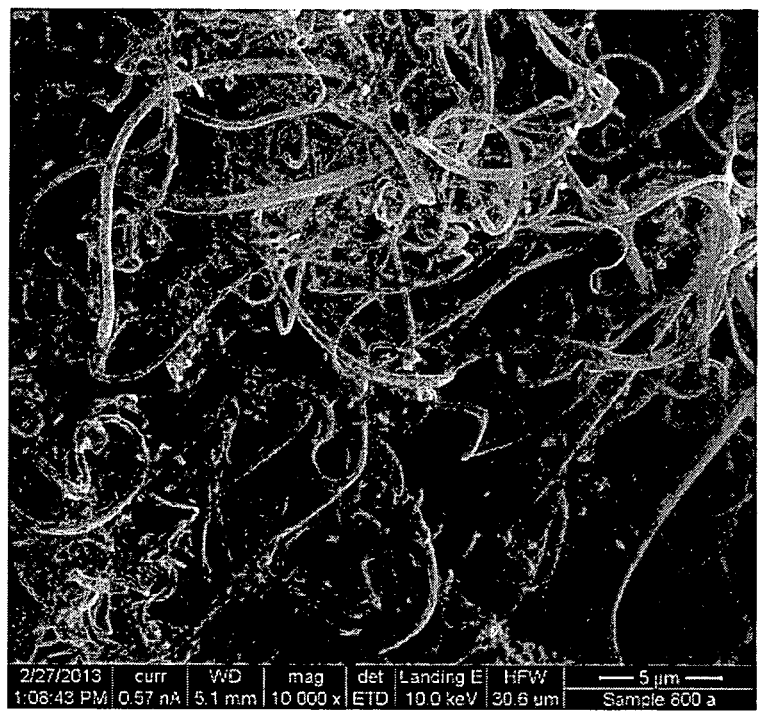
Figure 85:
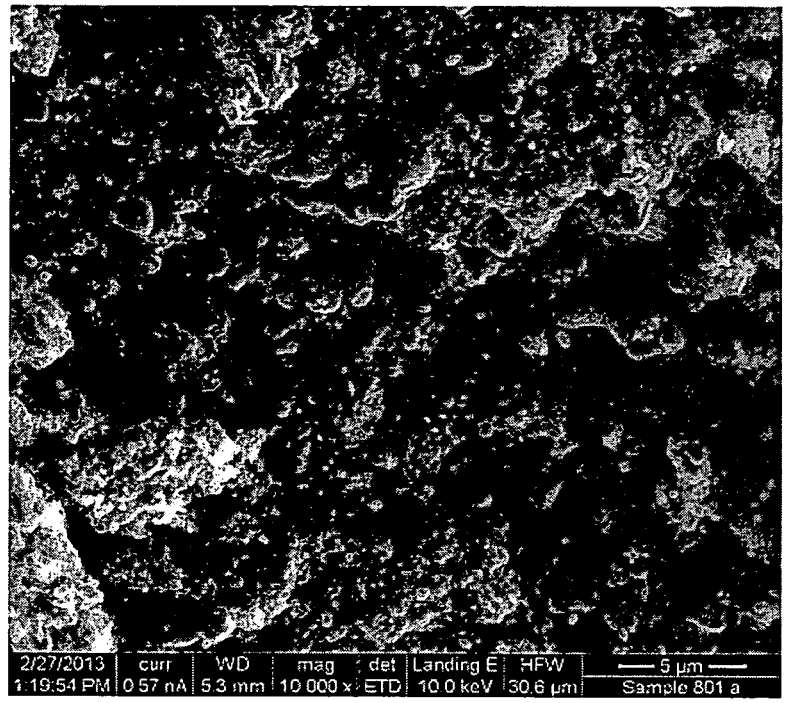
Figure 86:
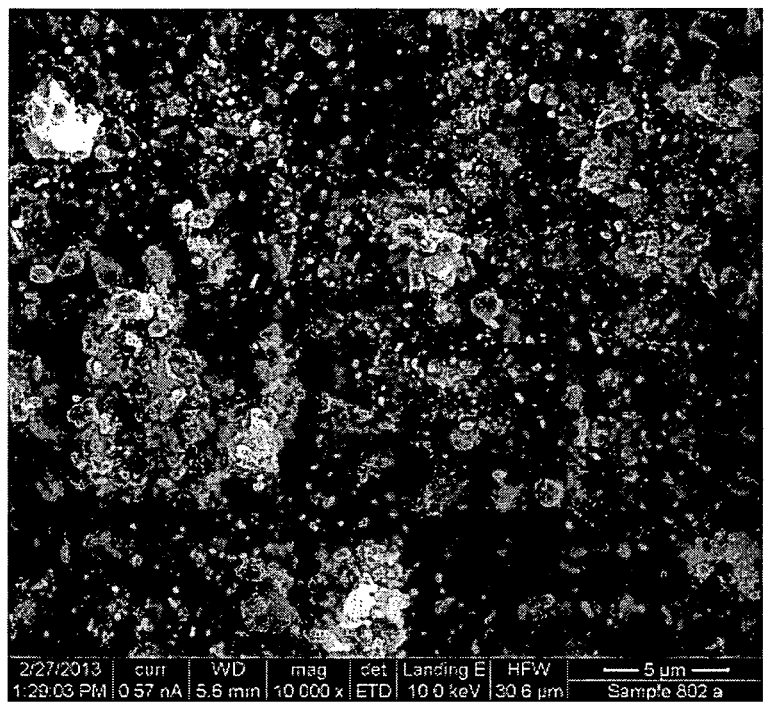
Figure 87:
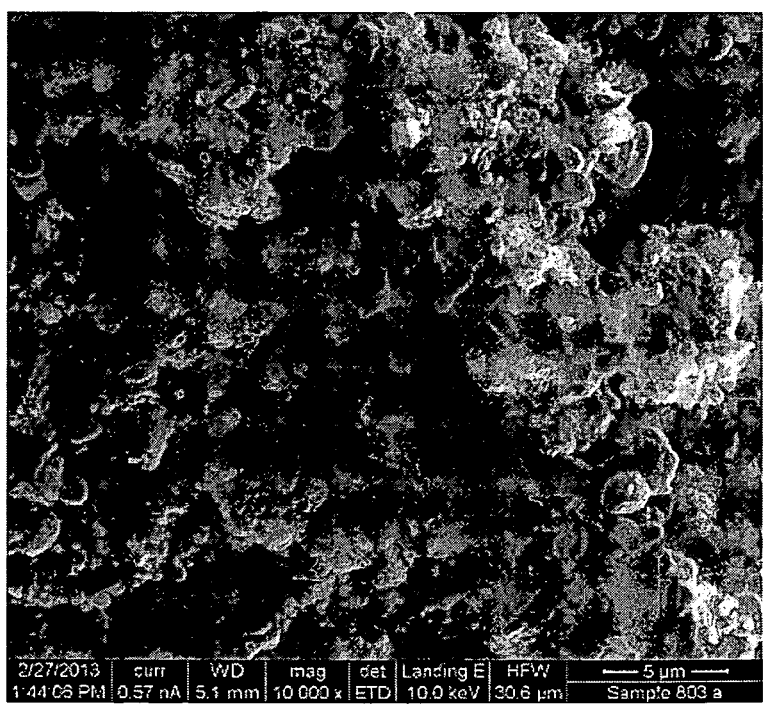

| Sample # | 5 | 6 | 7 | 8 |
|---|---|---|---|---|
| Distance from inlet (in.) | 19.3 | 22.8 | 26.6 | 30.1 |
| Temperature (° C.) | 604.3 | 638.0 | 689.1 | 748.4 |
| Deposition rate ($g/cm^2/hr$) | 0.0229 | 0.0132 | 0.0148 | 0.0303 |
| Surface Area ($m^2/g$) | 243.5 | 211.8 | 200.9 | 131.7 |
| SEM image | FIG. 84 | FIG. 85 | FIG. 86 | FIG. 87 |

Figure 88:
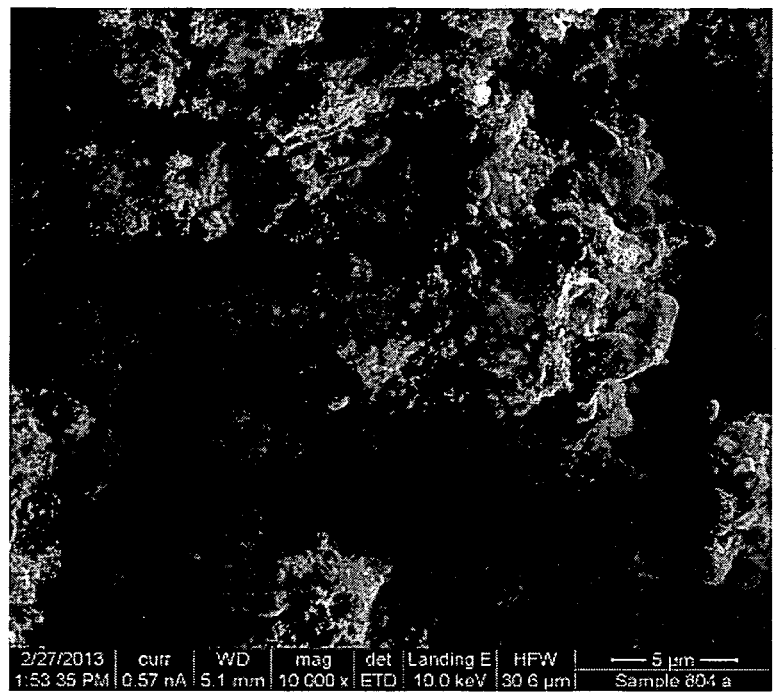
Figure 89:
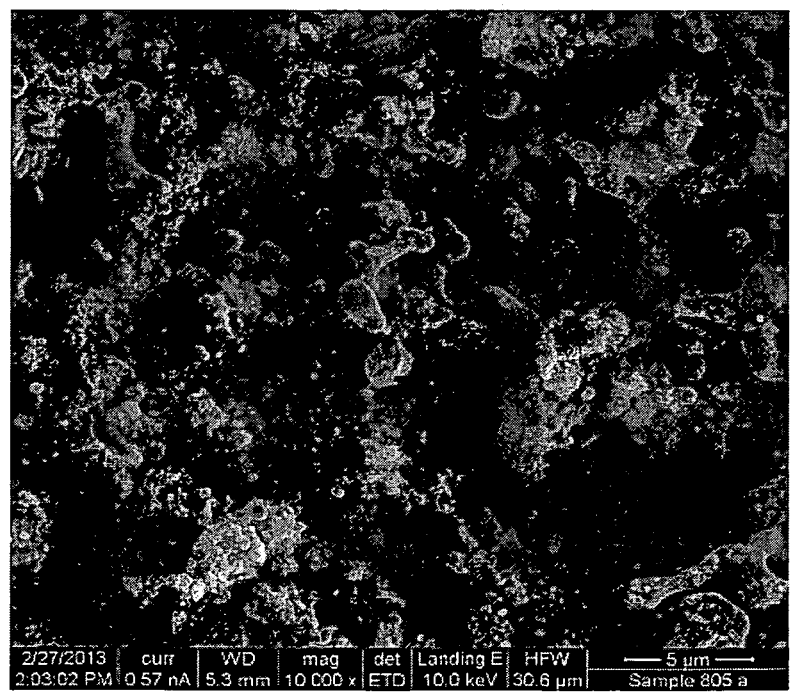
Figure 90:
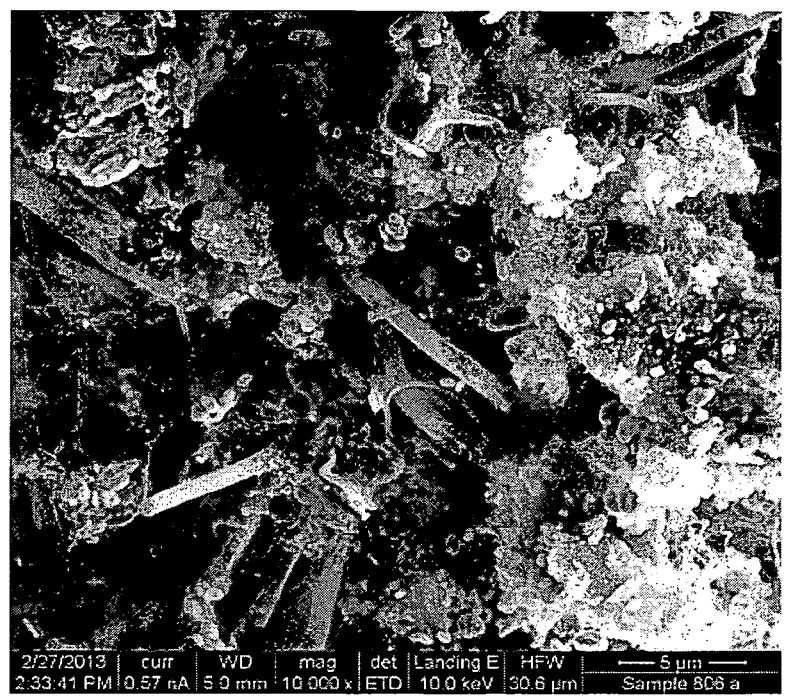

| Sample # | 9 | 10 | 11 | 12 |
|---|---|---|---|---|
| Distance from inlet (in.) | 33.8 | 37.5 | 41.3 | 44.5 |
| Temperature (° C.) | 801.3 | 788.6 | 683.1 | 412.4 |
| Deposition rate ($g/cm^2/hr$) | 0.0275 | 0.0245 | 0.0280 | 0.00005 |
| Surface Area ($m^2/g$) | 84.5 | 88.6 | 221.7 | |
| SEM image | FIG. 88 | FIG. 89 | FIG. 90 | |

Example 27: 316L Stainless Steel

Twelve coupons were cut from a sheet of 316L stainless steel (i.e., an alloy having 16%-18.5% Cr, 10%-14% Ni, 2%-3% Mo, up to about 2% Mn, up to about 1% Si, up to about 0.045% P, up to about 0.03% S, up to about 0.03% C, with the balance Fe) and were washed in ethanol to remove contaminants and oxidation. The coupons were placed in quartz boats in a quartz tube as described above. A reaction gas containing about 45% $H_2$ and 45% CO and 10% Ar was introduced into the quartz tube at about 4.0 MPa. The gases flowed over the coupons for about 4 hours at 1200 sccm. Solid carbon formed on each coupon at the rates shown in Table 20 below. Methane, carbon dioxide, and water were also formed in the quartz tube. After the test, solid carbon was physically removed from the coupons and tested for BET surface area, as shown in Table 20. Samples of the solid carbon were imaged using SEM, as shown in FIGS. 91 through 99 at 10,000× magnification. About 14.2 grams of water were collected from the gases during the test.

TABLE 20

Solid Carbon Formation on 316L Stainless Steel

Figure 91:
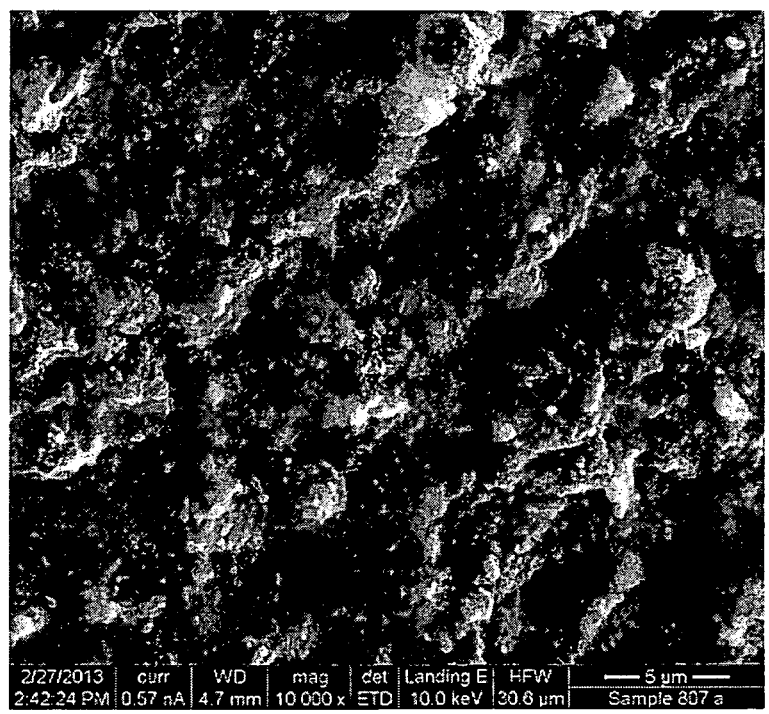
Figure 92:
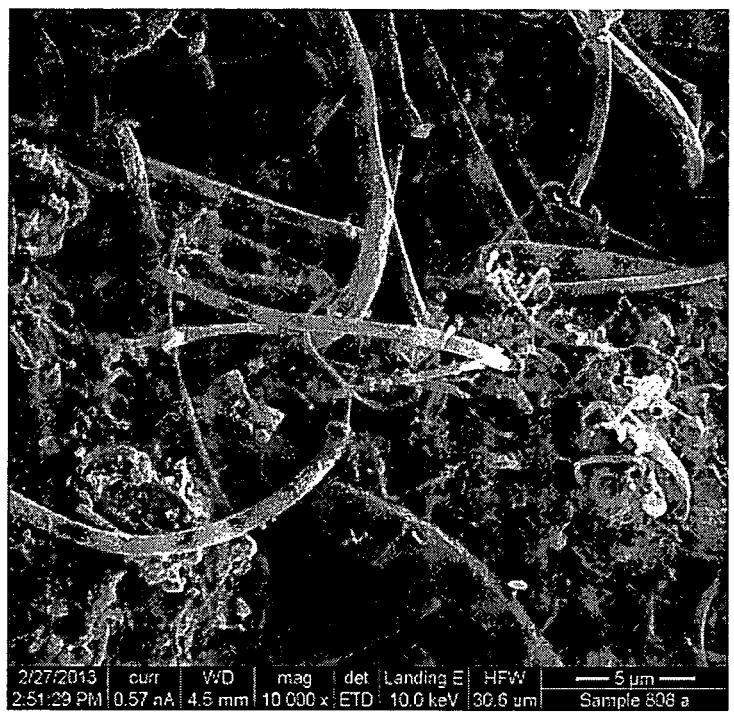

| Sample # | 1 | 2 | 3 | 4 |
|---|---|---|---|---|
| Distance from inlet (in.) | 5.5 | 8.8 | 12.0 | 15.6 |
| Temperature (° C.) | 324.5 | 465.9 | 544.5 | 600.8 |
| Deposition rate ($g/cm^2/hr$) | 0.00000 | 0.00001 | 0.00029 | 0.0926 |
| Surface Area ($m^2/g$) | | | | 324.5 |
| SEM image | | | FIG. 91 | FIG. 92 |

Figure 93:
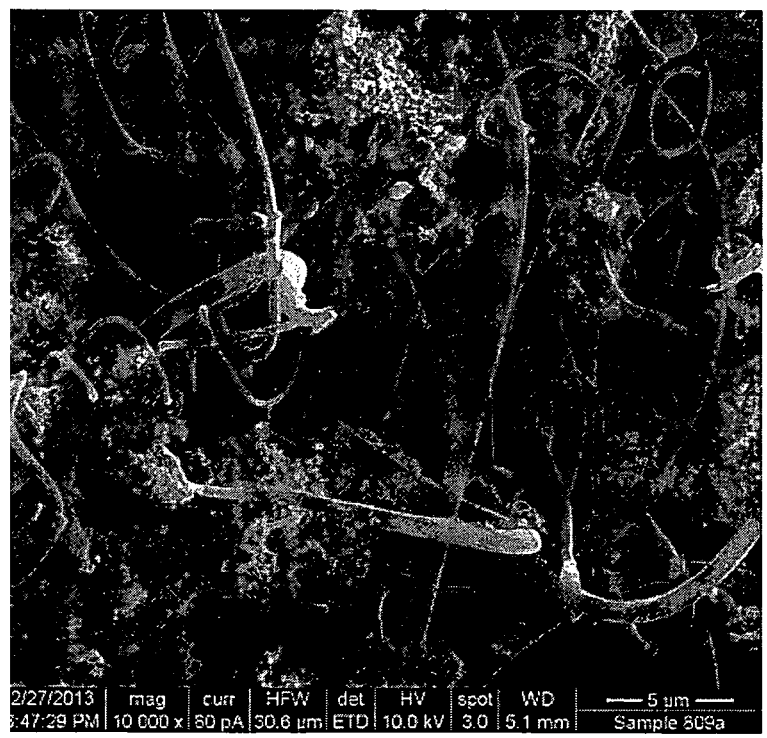
Figure 94:
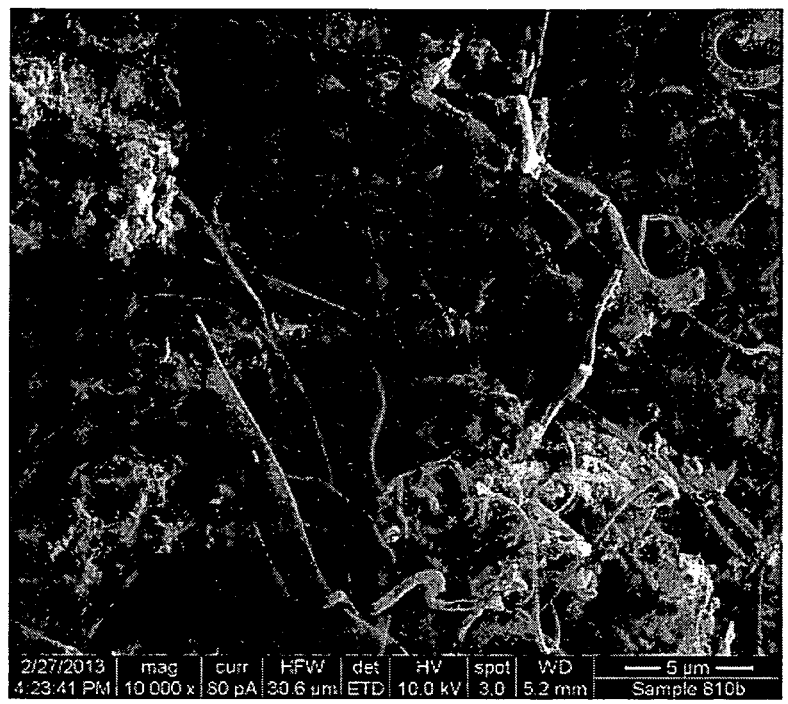
Figure 95:
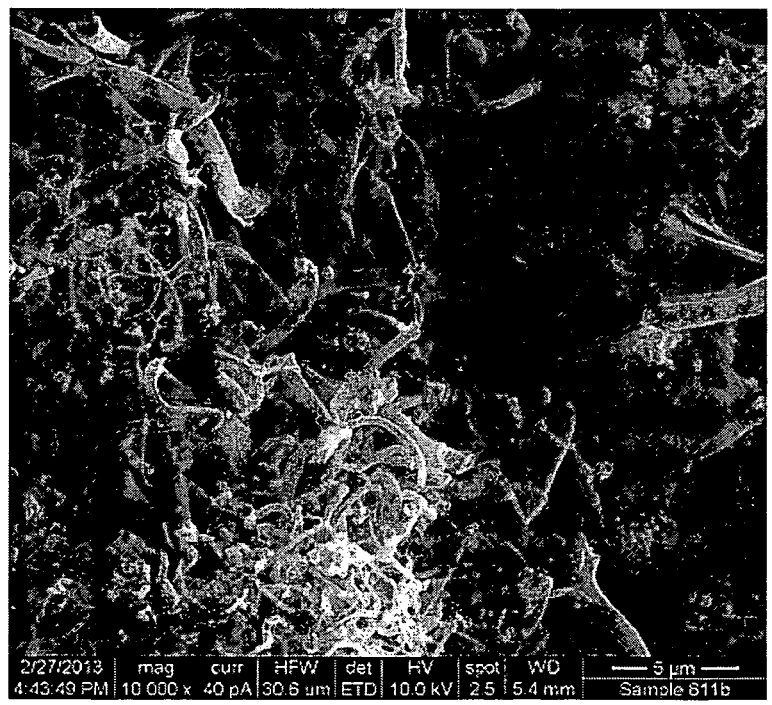
Figure 96:
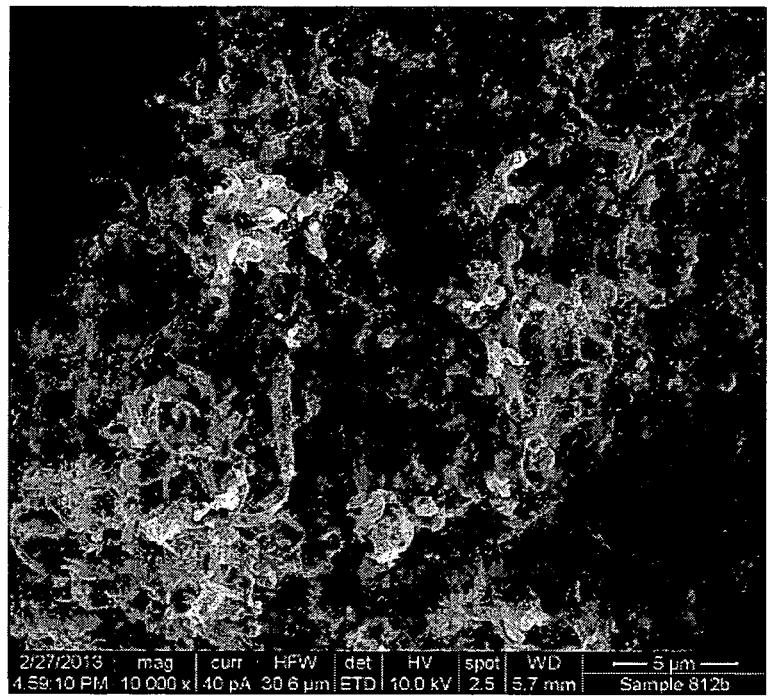

| Sample # | 5 | 6 | 7 | 8 |
|---|---|---|---|---|
| Distance from inlet (in.) | 19.4 | 22.9 | 26.3 | 30.0 |
| Temperature (° C.) | 623.4 | 644.5 | 665.0 | 698.2 |
| Deposition rate ($g/cm^2/hr$) | 0.0415 | 0.0253 | 0.0173 | 0.0152 |
| Surface Area ($m^2/g$) | 232.7 | 206.1 | 127.9 | 83.4 |
| SEM image | FIG. 93 | FIG. 94 | FIG. 95 | FIG. 96 |

Figure 97:
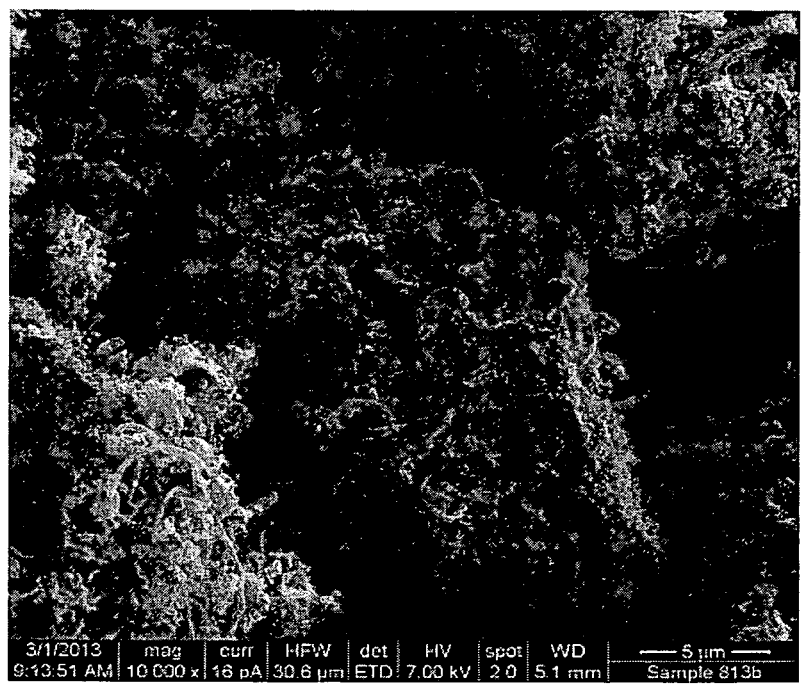
Figure 98:
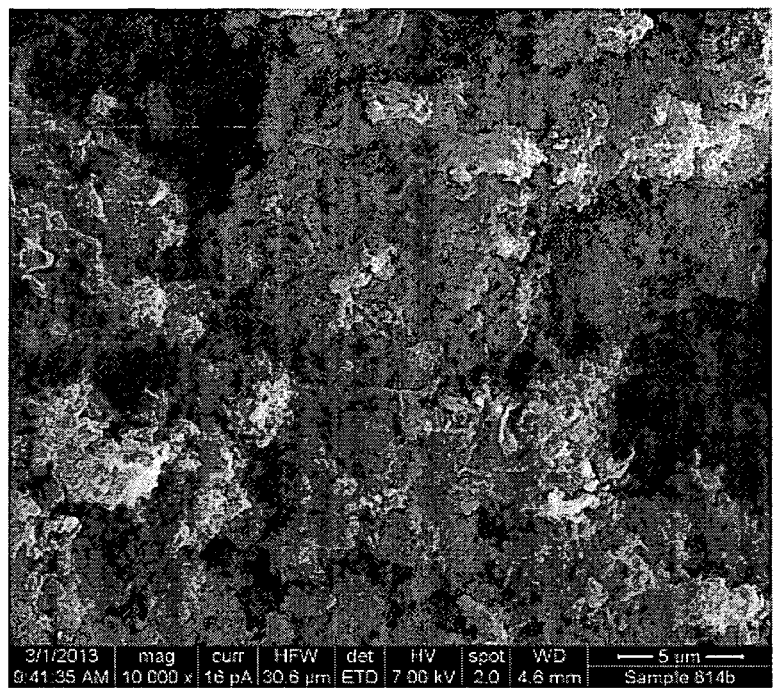
Figure 99:
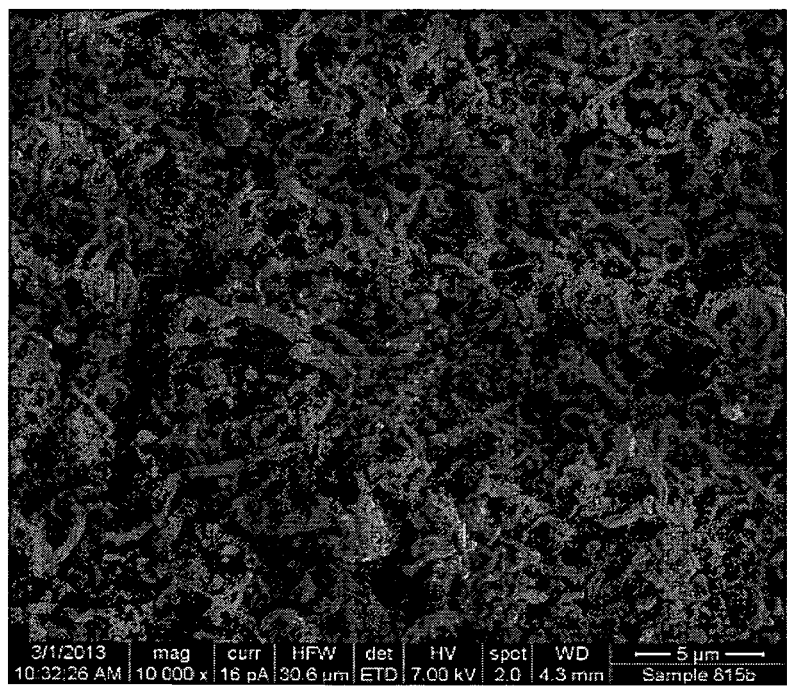

| Sample # | 9 | 10 | 11 | 12 |
|---|---|---|---|---|
| Distance from inlet (in.) | 33.9 | 37.5 | 40.9 | 44.3 |
| Temperature (° C.) | 744.5 | 794.4 | 733.8 | 455.1 |
| Deposition rate ($g/cm^2/hr$) | 0.0223 | 0.00378 | 0.0156 | 0.00000 |
| Surface Area ($m^2/g$) | 81.6 | 83.9 | 93.7 | |
| SEM image | FIG. 97 | FIG. 98 | FIG. 99 | |

Example 28: 410 Stainless Steel

Twelve coupons were cut from a sheet of 410 stainless steel (i.e., an alloy having 11.5%-13.5% Cr, at least 0.75% Ni, up to about 1% Mn, up to about 1% Si, up to about 0.04% P, up to about 0.03% S, up to about 0.015% C, with the balance Fe) and were washed in ethanol to remove contaminants and oxidation. The coupons were placed in quartz boats in a quartz tube as described above. A reaction gas containing about 45% $H_2$ and 45% CO and 10% Ar was introduced into the quartz tube at about 4.0 MPa. The gases flowed over the coupons for about 4 hours at 1200 sccm. Solid carbon formed on each coupon at the rates shown in Table 21 below. Methane, carbon dioxide, and water were also formed in the quartz tube. After the test, solid carbon was physically removed from the coupons and tested for BET surface area, as shown in Table 21. Samples of the solid carbon were imaged using SEM, as shown in FIGS. 100 through 107 at 10,000× magnification. No water was collected from the gases during the test.

TABLE 21

Solid Carbon Formation on 410 Stainless Steel

| Sample # | 2 | 3 | 4 |
|---|---|---|---|
| Distance from inlet (in.) | 5.0 | 8.4 | 12.9 |
| Temperature (° C.) | 297.4 | 456.5 | 556.8 |

TABLE 21-continued

Solid Carbon Formation on 410 Stainless Steel

Figure 100:
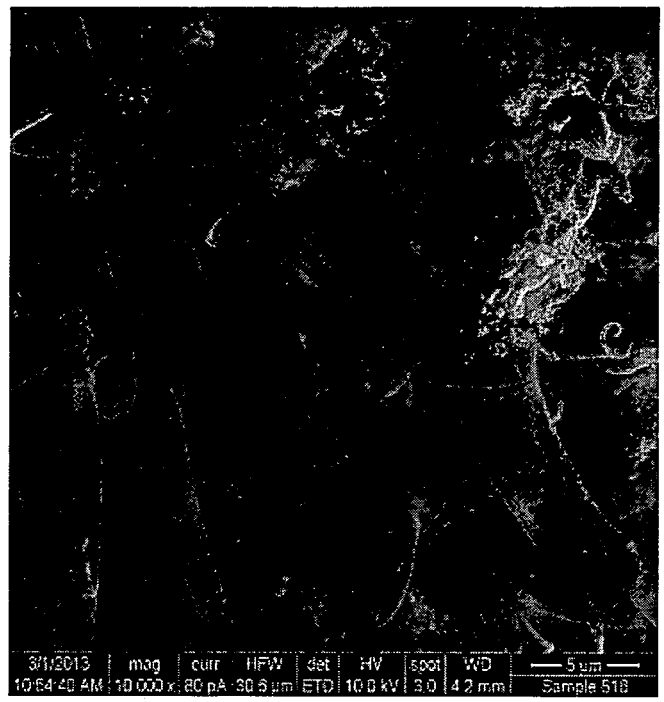
Figure 101:
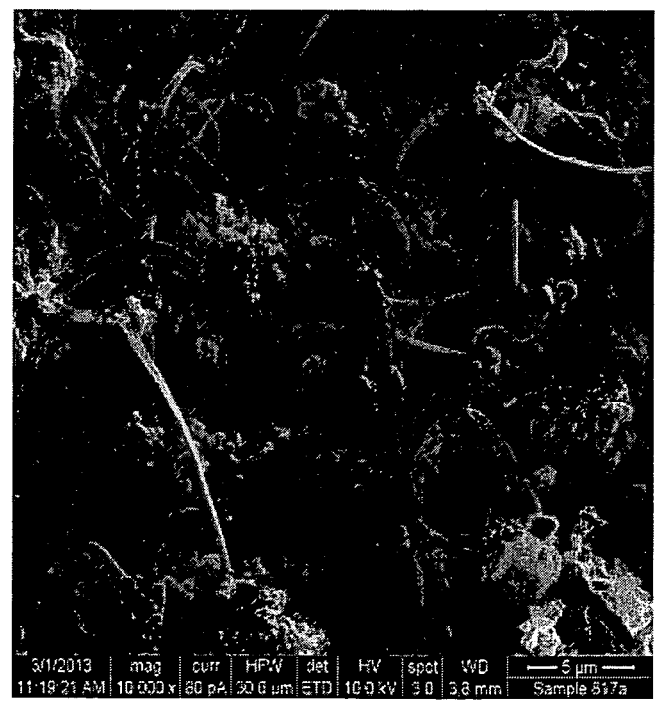
Figure 102:
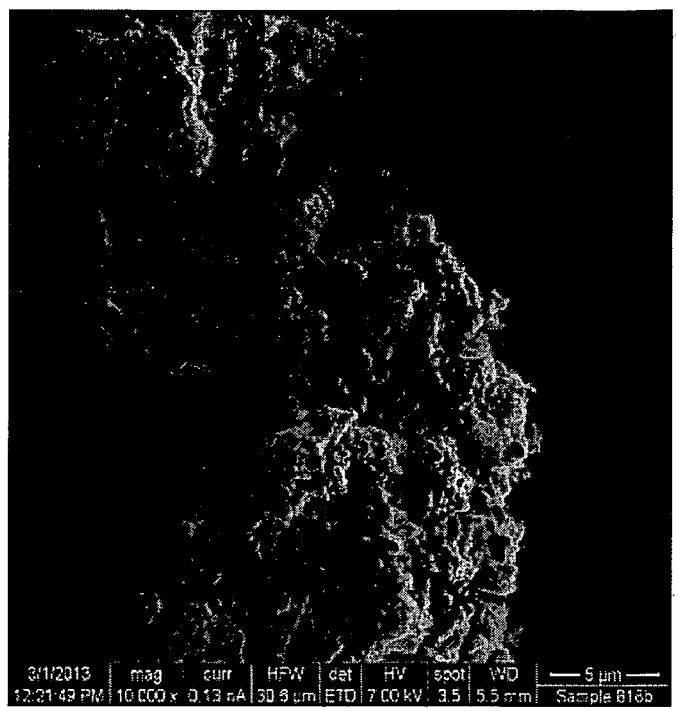
Figure 103:
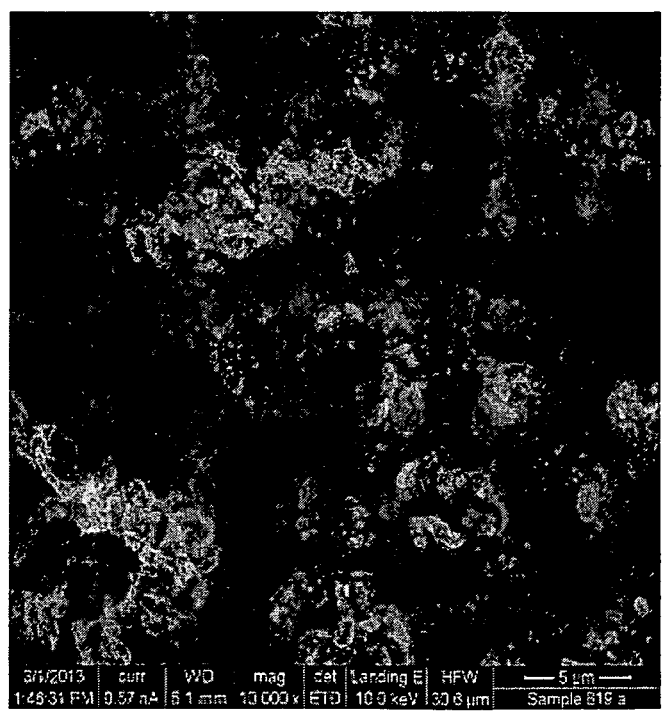
Figure 104:
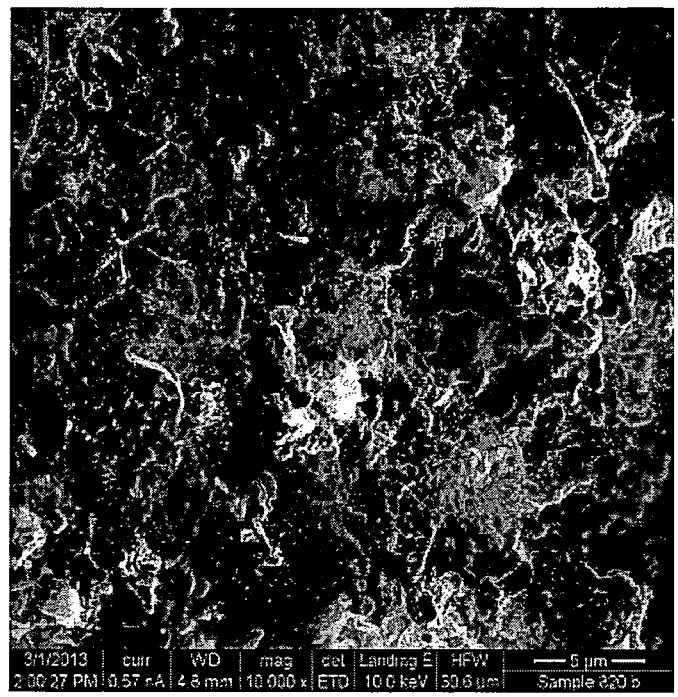
Figure 105:
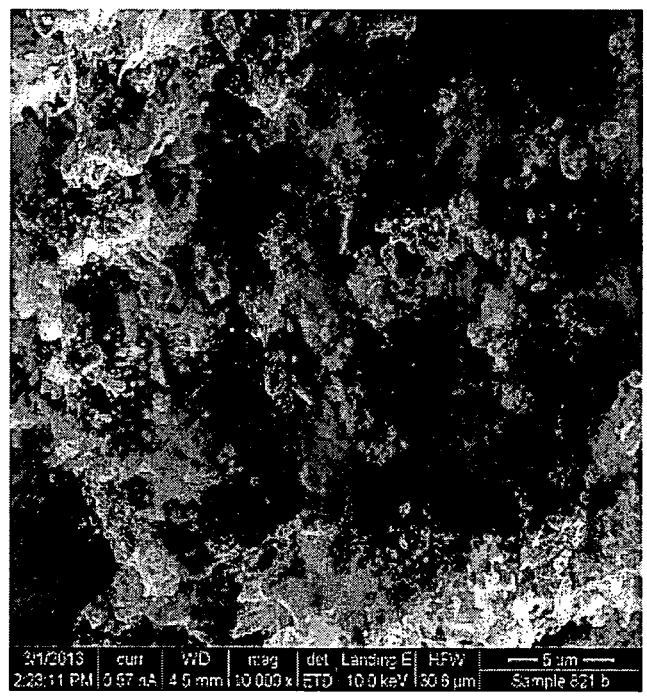
Figure 106:
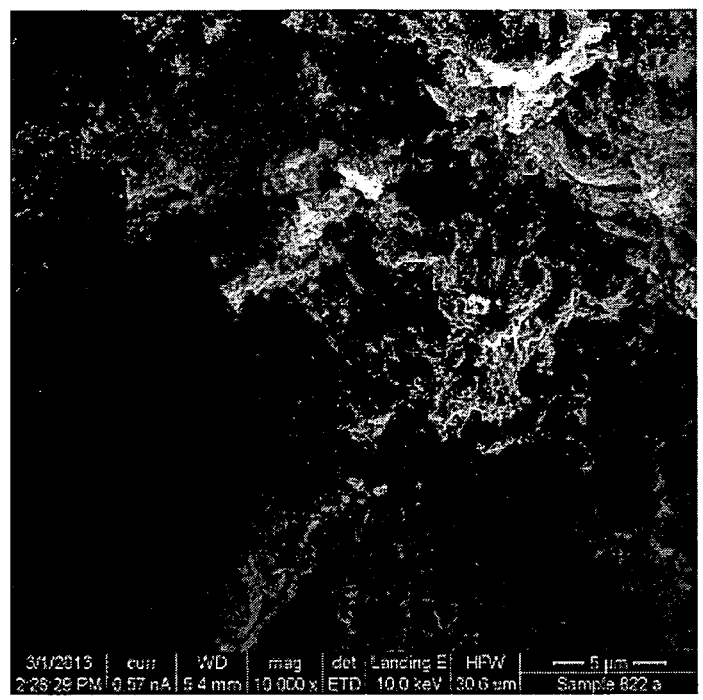
Figure 107:
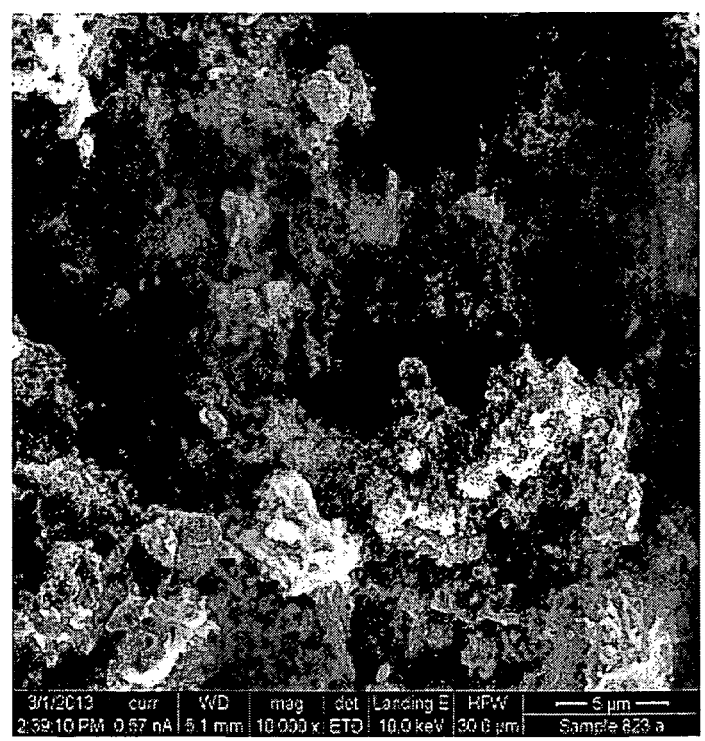

| | | | | |
|---|---|---|---|---|
| Deposition rate (g/cm$^2$/hr) | 0.00007 | 0.00000 | 0.0544 | |
| Surface Area (m$^2$/g) | | | 298.6 | |
| SEM image | | | FIG. 100 | |
| Sample # | 5 | 6 | 7 | 8 |
| Distance from inlet (in.) | 16.5 | 19.6 | 23.50 | 27.06 |
| Temperature (° C.) | 599.8 | 623.3 | 648.6 | 668.7 |
| Deposition rate (g/cm$^2$/hr) | 0.0467 | 0.0351 | 0.01790 | 0.01956 |
| Surface Area (m$^2$/g) | 300.2 | 299.0 | 228.6 | 221.0 |
| SEM image | FIG. 101 | FIG. 102 | FIG. 103 | FIG. 104 |
| Sample # | 9 | 10 | 11 | 12 |
| Distance from inlet (in.) | 30.25 | 34.00 | 37.88 | 41.63 |
| Temperature (° C.) | 697.3 | 741.5 | 798.3 | 716.9 |
| Deposition rate (g/cm$^2$/hr) | 0.01406 | 0.02049 | 0.01718 | 0.00000 |
| Surface Area (m$^2$/g) | 132.3 | 84.1 | 81.1 | |
| SEM image | FIG. 105 | FIG. 106 | FIG. 107 | |

Example 29: Cast Iron Powder

Twelve samples of metal powder, comprising 92%-98% cast iron, were placed in quartz boats in a quartz tube as described above. A reaction gas containing about 45% H$_2$ and 45% CO and 10% Ar was introduced into the quartz tube at about 4.0 MPa. The gases flowed over the metal powder for about 4 hours at 1200 sccm. Solid carbon formed on the metal powder at the rates shown in Table 22 below. Methane, carbon dioxide, and water were also formed in the quartz tube. After the test, solid carbon was tested for BET surface area, as shown in Table 22. Samples of the solid carbon were imaged using SEM, as shown in FIGS. 108 through 116 at 10,000× magnification. About 28.7 grams of water were collected from the gases during the test.

TABLE 22

Solid Carbon Formation on Cast Iron Powder

Figure 108:
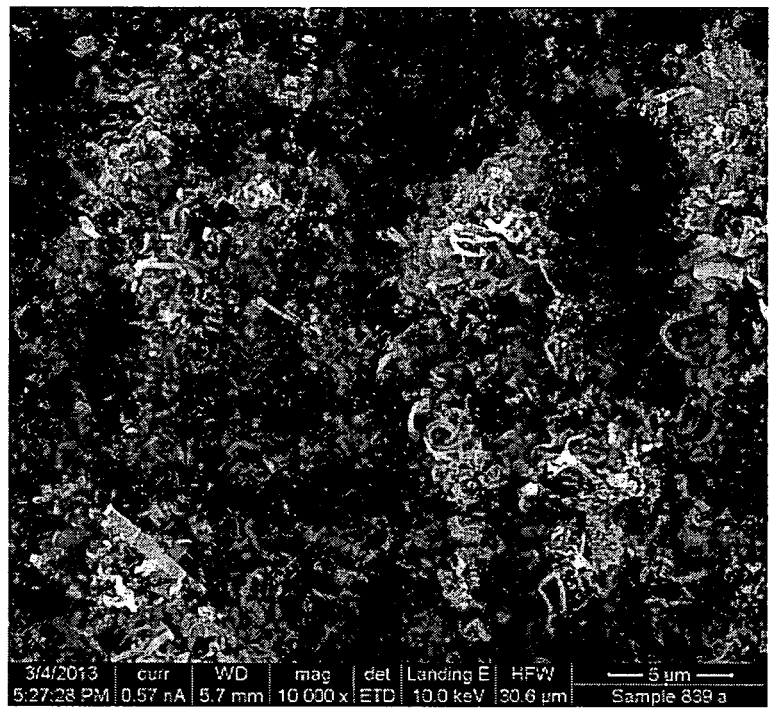
Figure 109:
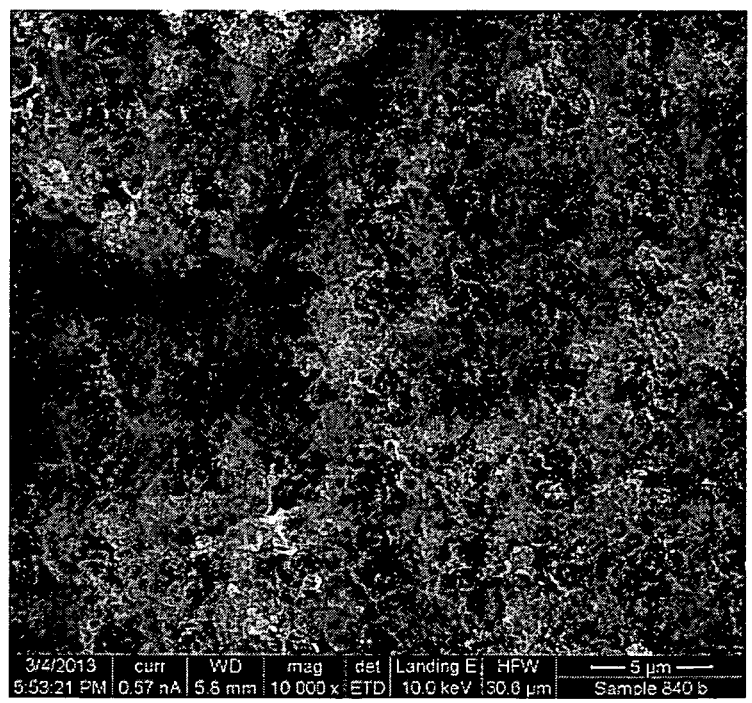
Figure 110:
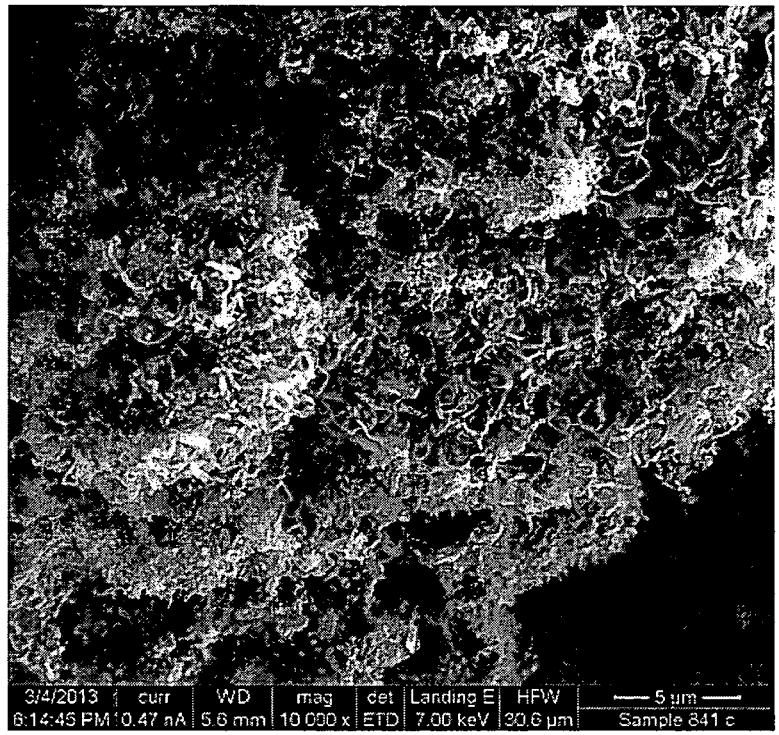

| Sample # | 1 | 2 | 3 | 4 |
|---|---|---|---|---|
| Distance from inlet (in.) | 6.0 | 9.4 | 12.6 | 16.1 |
| Temperature (° C.) | 340.1 | 485.7 | 544.4 | 580.5 |
| Deposition rate (g/cm$^2$/hr) | 0.000 | 6.048 | 6.916 | 1.290 |
| Surface Area (m$^2$/g) | | 202.5 | 223.6 | 253.1 |
| SEM image | | FIG. 108 | FIG. 109 | FIG. 110 |
| Sample # | 5 | 6 | 7 | 8 |
| Distance from inlet (in.) | 19.6 | 22.8 | 26.3 | 30.0 |
| Temperature (° C.) | 613.1 | 642.6 | 669.4 | 706.1 |
| Deposition rate (g/cm$^2$/hr) | 0.683 | 0.191 | 0.065 | 0.118 |

TABLE 22-continued

Solid Carbon Formation on Cast Iron Powder

Figure 111:
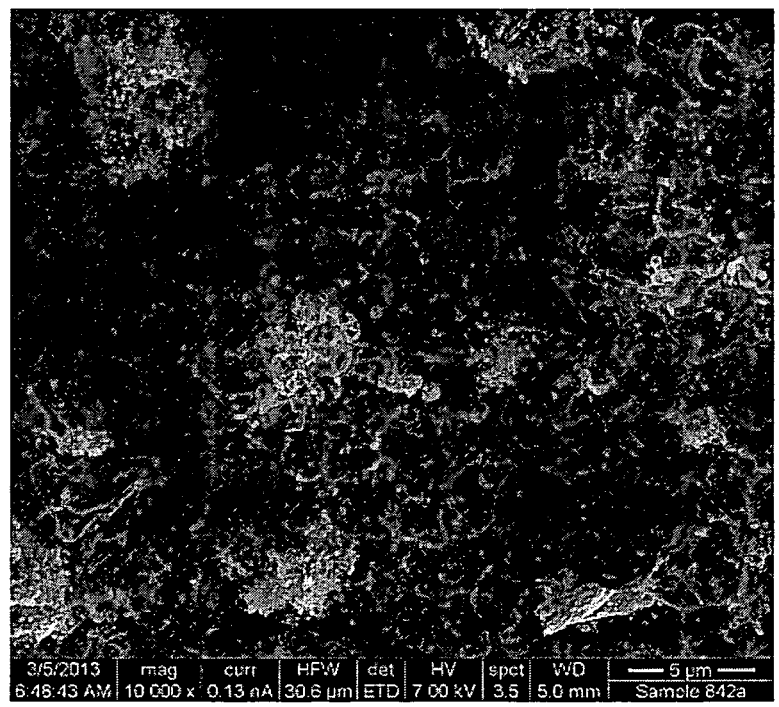
Figure 112:
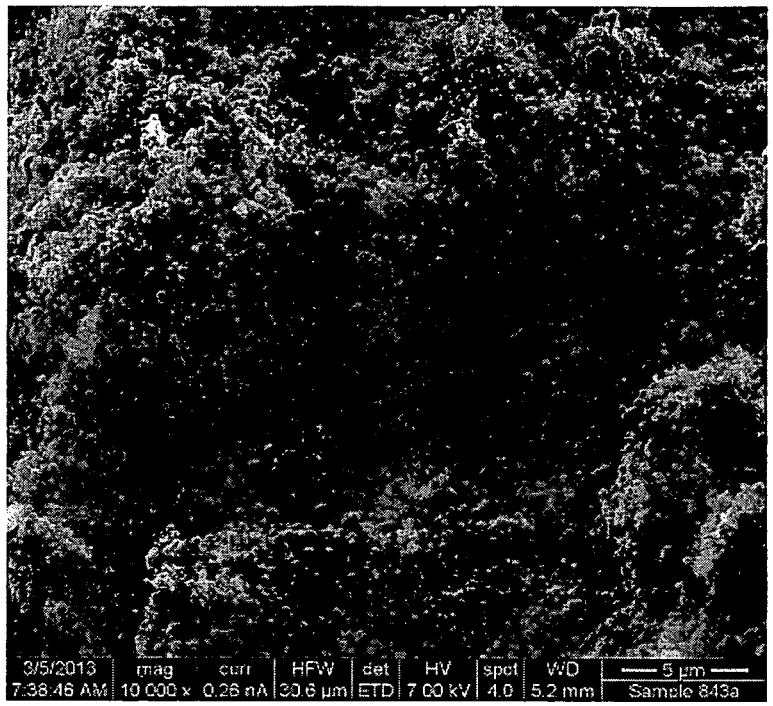
Figure 113:
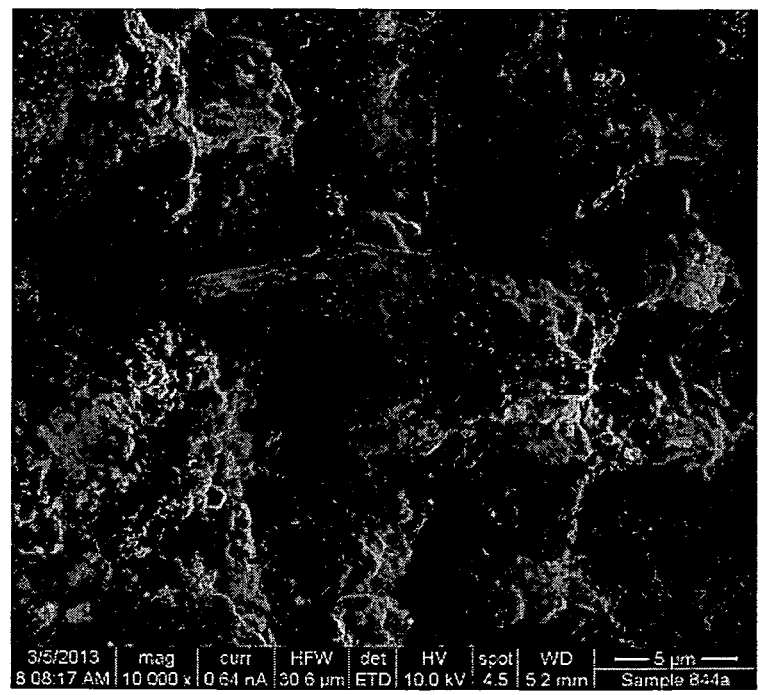
Figure 114:
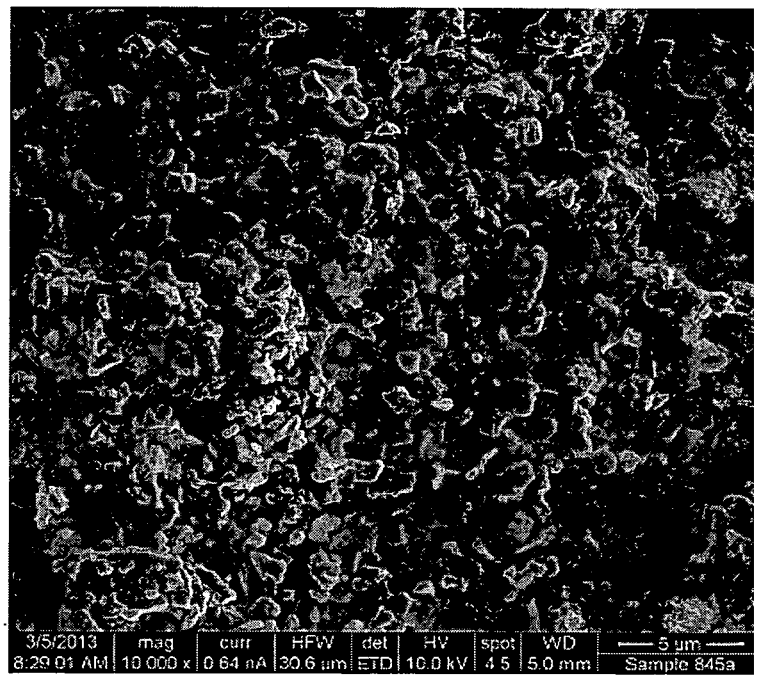
Figure 115:
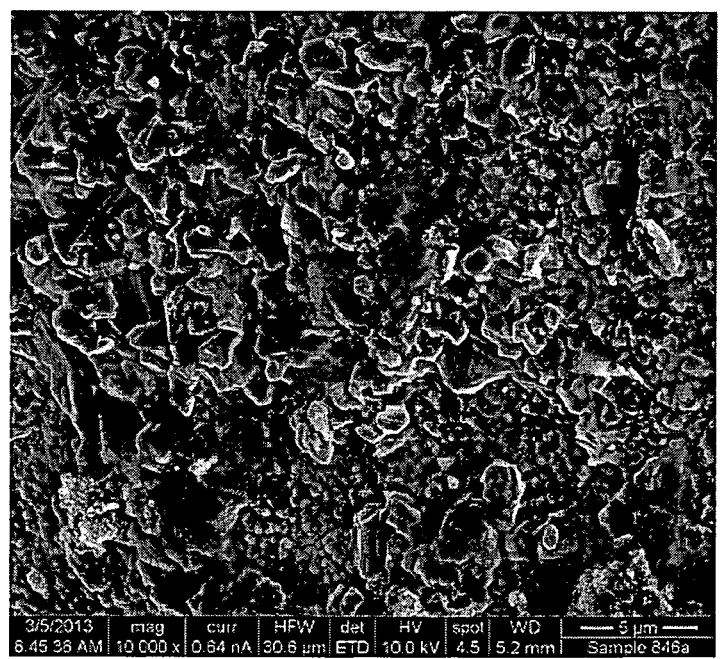
Figure 116:
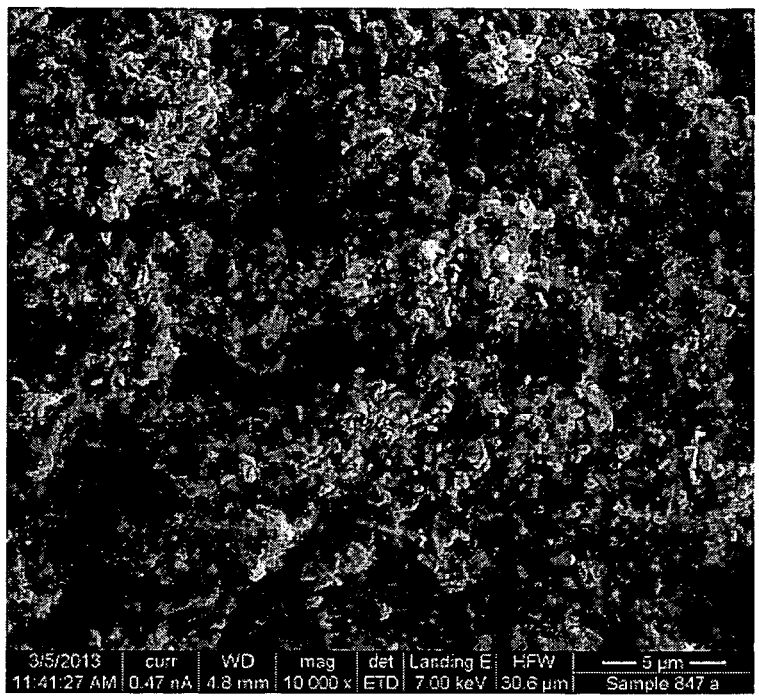

| | | | | |
|---|---|---|---|---|
| Surface Area (m$^2$/g) | 260.1 | 126.2 | 32.3 | 24.1 |
| SEM image | FIG. 111 | FIG. 112 | FIG. 113 | FIG. 114 |
| Sample # | 9 | 10 | 11 | 12 |
| Distance from inlet (in.) | 33.5 | 37.2 | 41.3 | 44.4 |
| Temperature (° C.) | 746.3 | 792.6 | 687.8 | 416.9 |
| Deposition rate (g/cm$^2$/hr) | 0.105 | 0.021 | 0.128 | |
| Surface Area (m$^2$/g) | 8.9 | | 56.5 | |
| SEM image | FIG. 115 | | FIG. 116 | |

Example 30: 13-8H Stainless Steel

Twelve coupons were cut from a sheet of 13-8H stainless steel (i.e., an alloy having 12.25%-13.5% Cr, 7.5%-8.5% Ni, 2.0%-2.5% Mo, 0.90%-1.35% Al, up to about 0.1% Mn, up to about 0.1% Si, up to about 0.01% P, up to about 0.05% C, up to about 0.01% N, and up to about 0.008% S with the balance Fe) and were washed in ethanol to remove contaminants and oxidation. The coupons were placed in quartz boats in a quartz tube as described above. A reaction gas containing about 45% H$_2$ and 45% CO and 10% Ar was introduced into the quartz tube at about 4.0 MPa. The gases flowed over the coupons for about 4 hours at 1200 sccm. Solid carbon formed on each coupon at the rates shown in Table 23 below. Methane, carbon dioxide, and water were also formed in the quartz tube. After the test, samples of the solid carbon were imaged using SEM, as shown in FIGS. 117 through 123 at 10,000× magnification. About 14.6 grams of water were collected from the gases during the test.

TABLE 23

Solid Carbon Formation on 13-8H Stainless Steel

Figure 117:
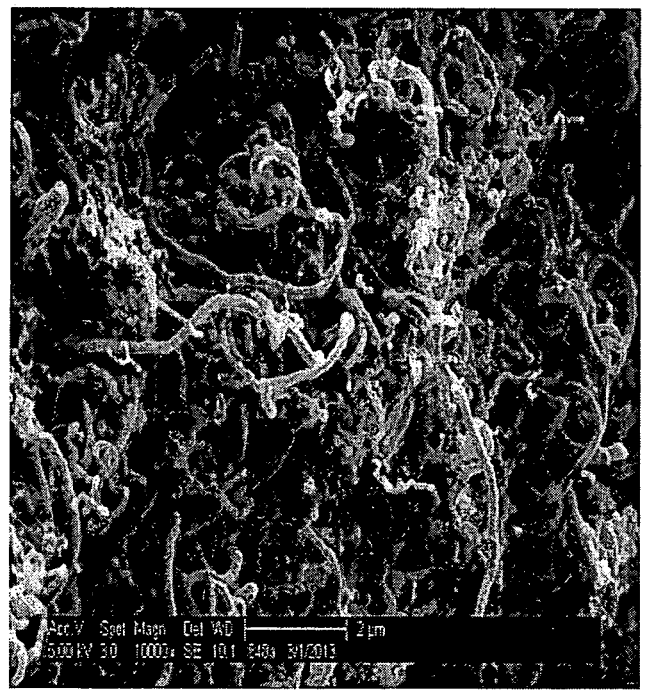
Figure 118:
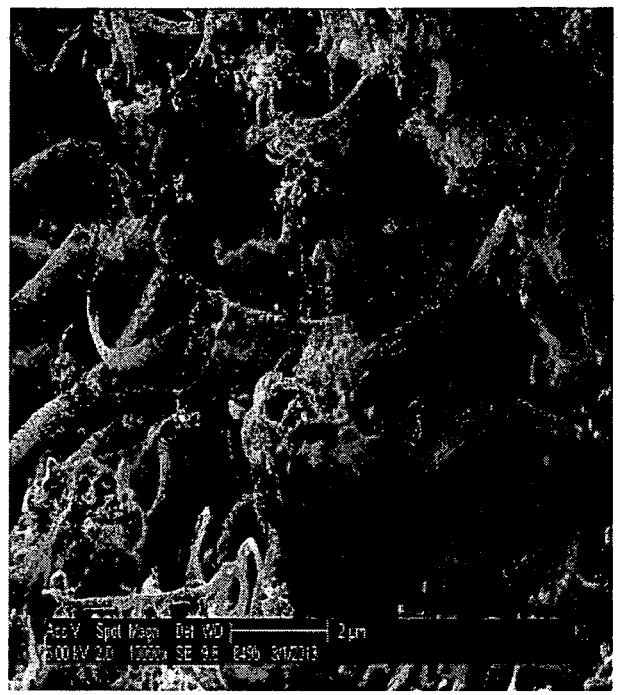
Figure 119:
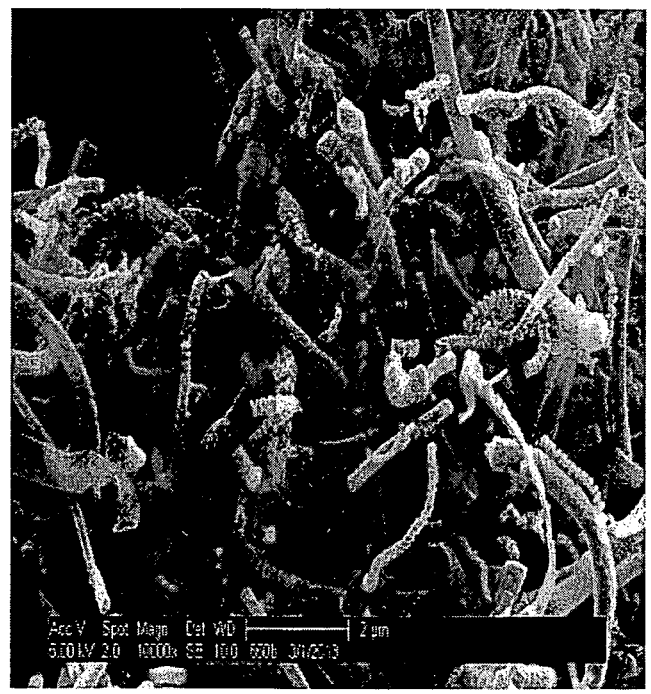
Figure 120:
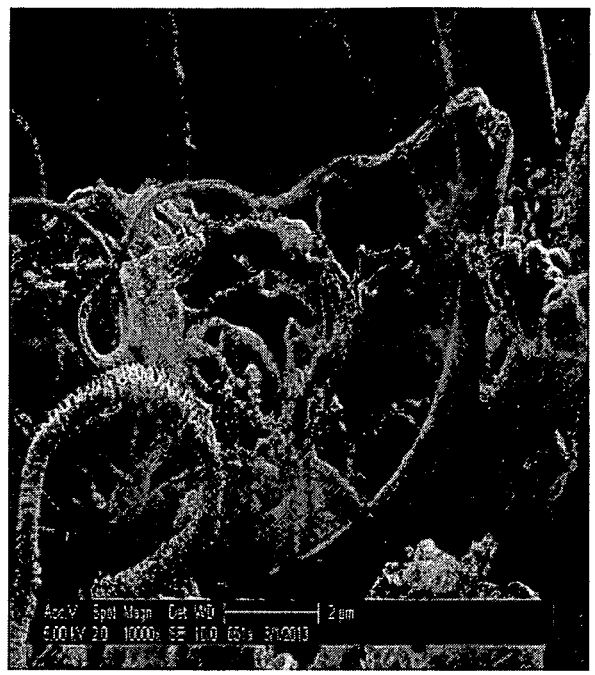

| Sample # | 1 | 2 | 3 | 4 |
|---|---|---|---|---|
| Distance from inlet (in.) | 5.5 | 9.2 | 12.7 | 16.1 |
| Temperature (° C.) | 316.8 | 476.7 | 535.4 | 570.5 |
| Deposition rate (g/cm$^2$/hr) | 0.0002 | 0.0000 | 0.0002 | 0.0002 |
| SEM image | | | | |
| Sample # | 5 | 6 | 7 | 8 |
| Distance from inlet (in.) | 19.9 | 23.3 | 26.8 | 30.5 |
| Temperature (° C.) | 604.9 | 643.4 | 691.9 | 754.4 |
| Deposition rate (g/cm$^2$/hr) | 0.0056 | 0.0803 | 0.0823 | 0.0612 |
| SEM image | FIG. 117 | FIG. 118 | FIG. 119 | FIG. 120 |

TABLE 23-continued

Figure 121:
Figure 122:
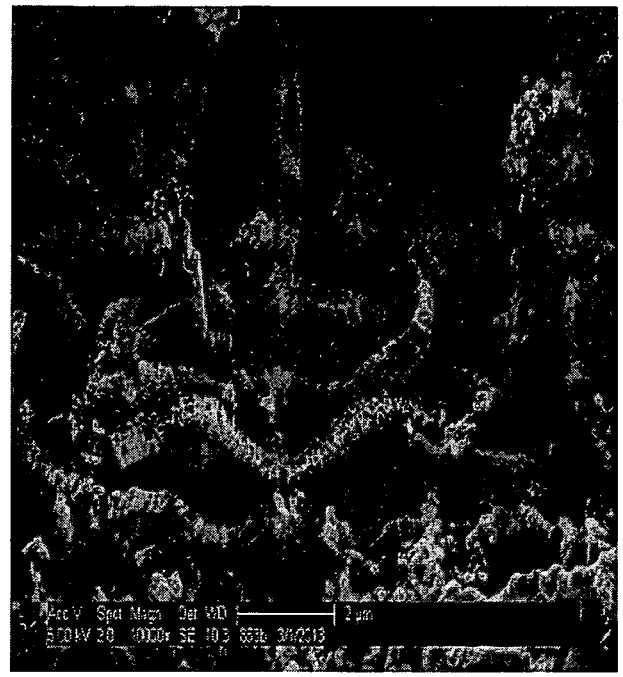
Figure 123:
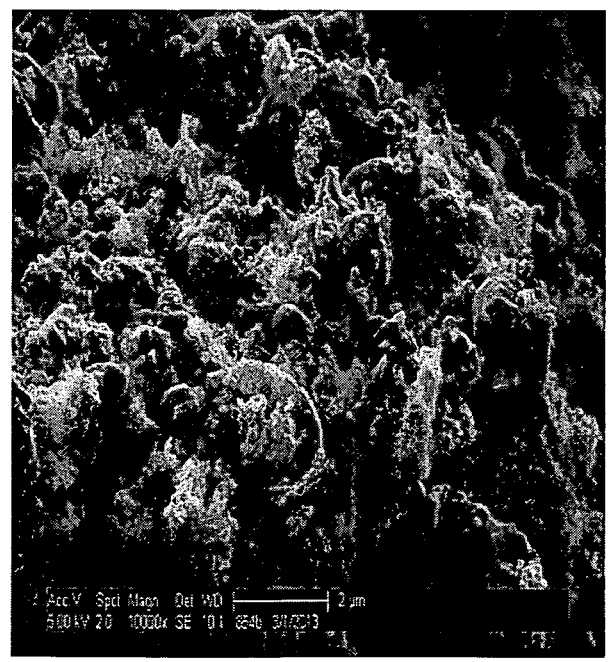

| Solid Carbon Formation on 13-8H Stainless Steel | | | | |
|---|---|---|---|---|
| Sample # | 9 | 10 | 11 | 12 |
| Distance from inlet (in.) | 33.6 | 37.6 | 41.3 | 44.4 |
| Temperature (° C.) | 795.8 | 788.3 | 703.3 | 439.8 |
| Deposition rate (g/cm$^2$/hr) | 0.0773 | 0.0394 | 0.0212 | 0.0000 |
| SEM image | FIG. 121 | FIG. 122 | FIG. 123 | |

Example 31: Grade O1 Tool Steel

Twelve coupons were cut from a sheet of grade O1 tool steel (i.e., an alloy having about 0.90% C, 1.0%-1.4% Mn, about 0.50% Cr, about 0.50% Ni, and about 0.50% W, with the balance Fe) and were washed in ethanol to remove contaminants and oxidation. The coupons were placed in quartz boats in a quartz tube as described above. A reaction gas containing about 45% H$_2$ and 45% CO and 10% Ar was introduced into the quartz tube at about 4.0 MPa. The gases flowed over the coupons for about 4 hours at 1200 sccm. Solid carbon formed on each coupon at the rates shown in Table 24 below. Methane, carbon dioxide, and water were also formed in the quartz tube. After the test, samples of the solid carbon were imaged using SEM, as shown in FIGS. 124 through 132 at 10,000× magnification. About 14.2 grams of water were collected from the gases during the test.

TABLE 24

Figure 124:
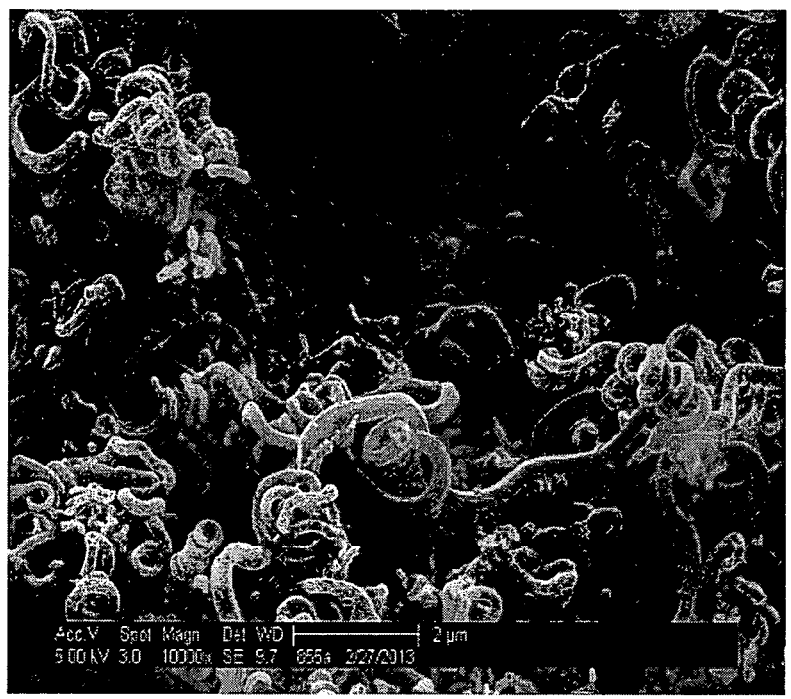
Figure 125:
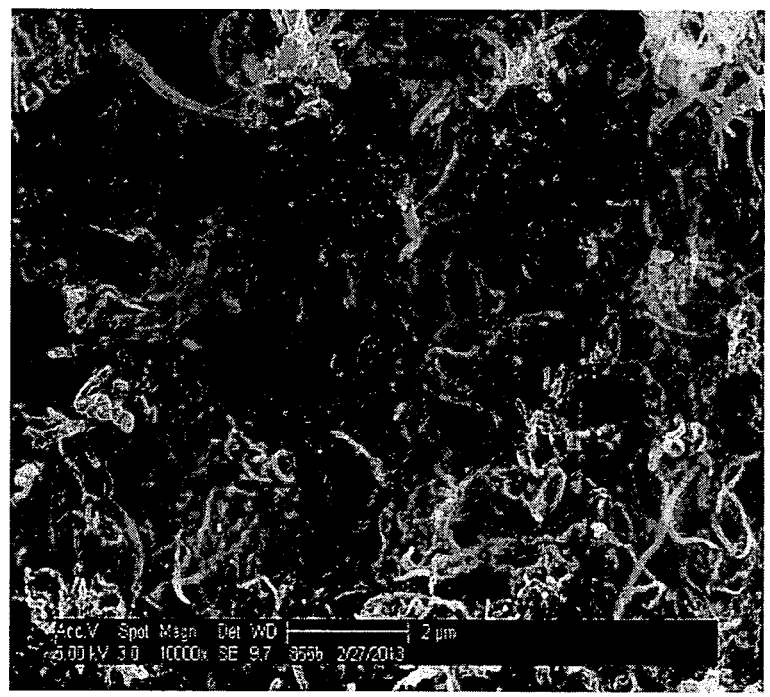
Figure 126:
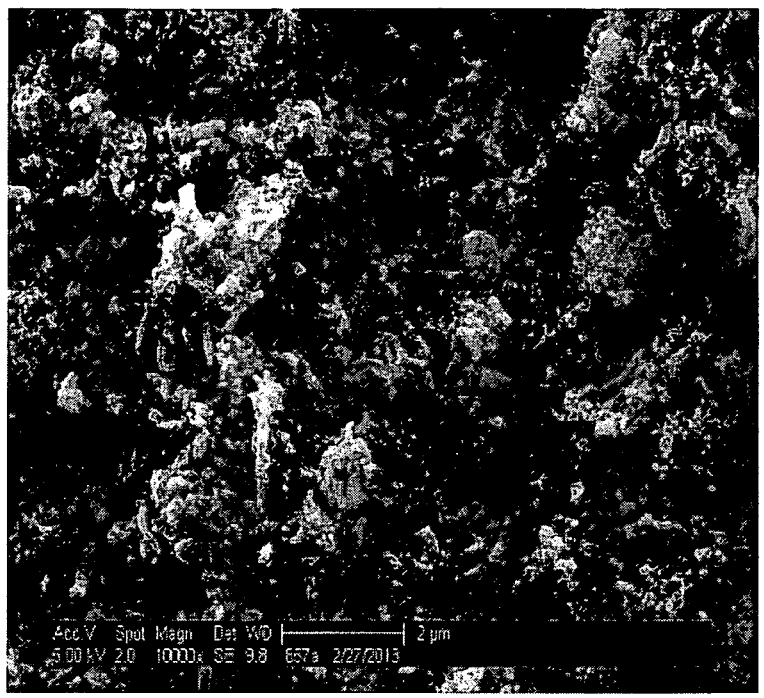
Figure 127:
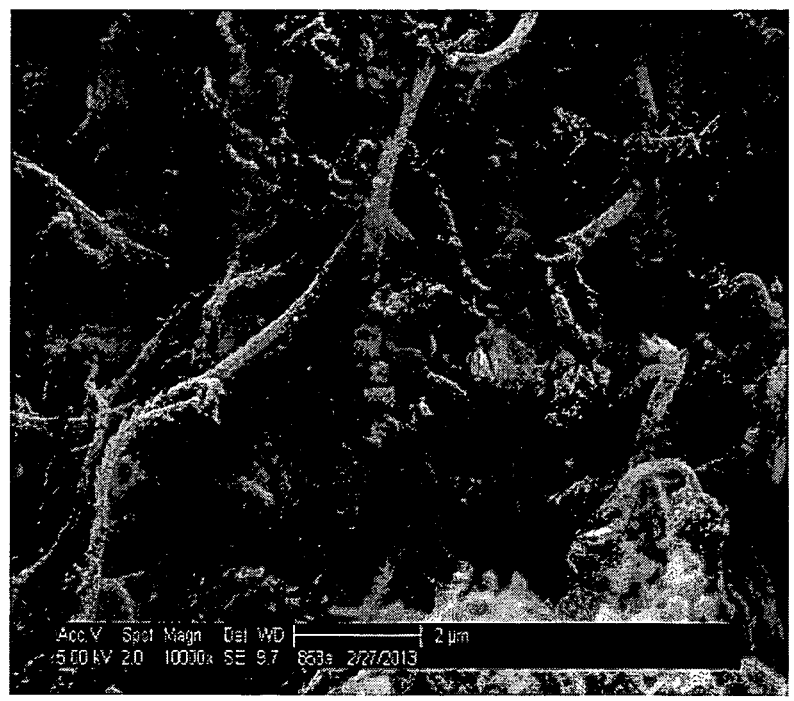
Figure 128:
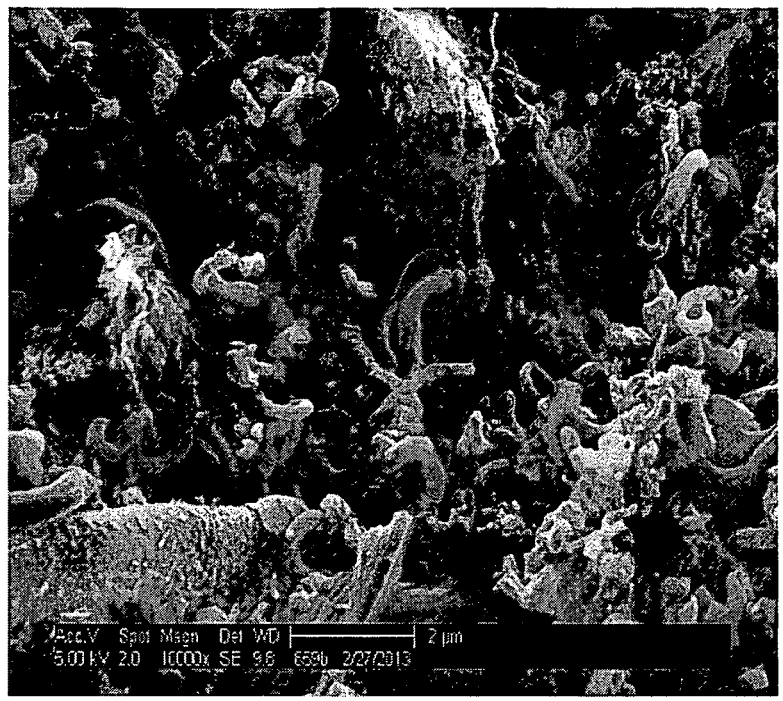
Figure 129:
Figure 130:
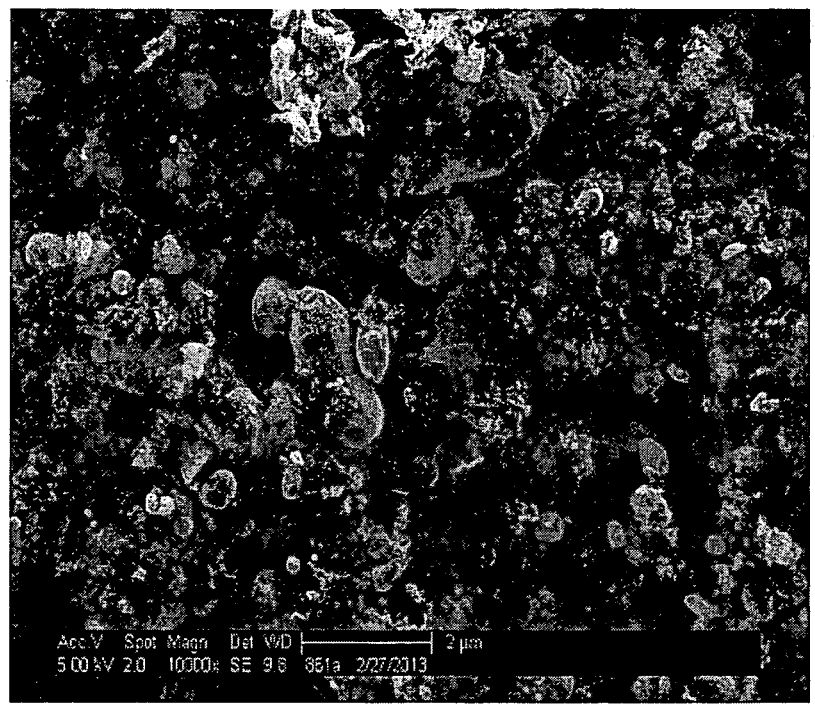
Figure 131:
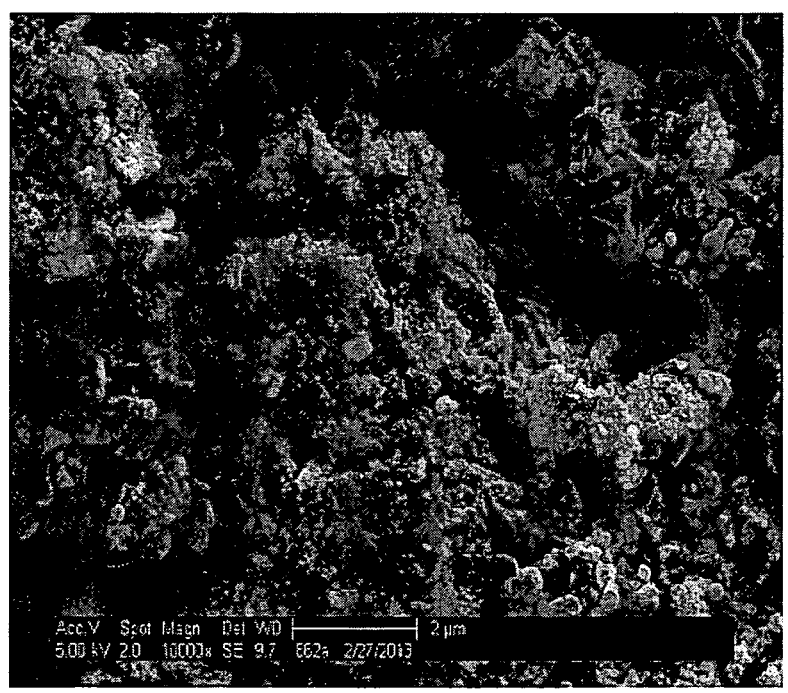
Figure 132:
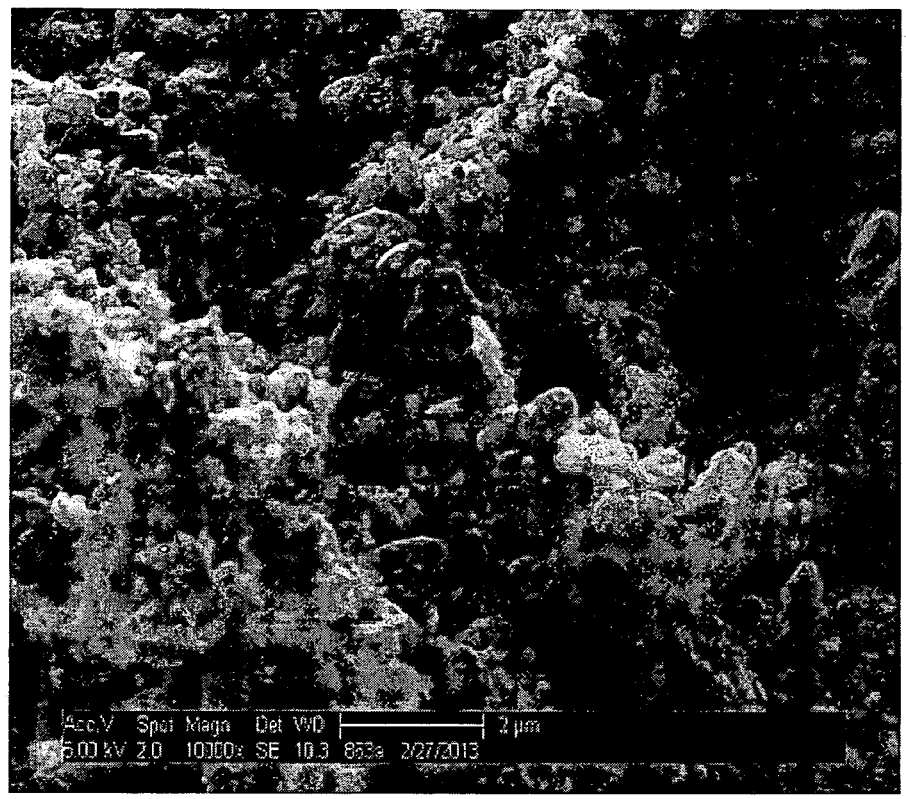

| Solid Carbon Formation on Grade O1 Tool Steel | | | | |
|---|---|---|---|---|
| Sample # | 1 | 2 | 3 | 4 |
| Distance from inlet (in.) | 5.1 | 9.6 | 12.4 | 16.0 |
| Temperature (° C.) | 316.3 | 489.4 | 541.0 | 584.7 |
| Deposition rate (g/cm$^2$/hr) | 0.000 | 0.005 | 0.135 | 0.104 |
| SEM image | | | FIG. 124 | FIG. 125 |
| Sample # | 5 | 6 | 7 | 8 |
| Distance from inlet (in.) | 19.9 | 23.3 | 26.8 | 30.0 |
| Temperature (° C.) | 621.6 | 646.5 | 673.2 | 705.3 |
| Deposition rate (g/cm$^2$/hr) | 0.078 | 0.018 | 0.015 | 0.012 |
| SEM image | FIG. 126 | FIG. 127 | FIG. 128 | FIG. 129 |
| Sample # | 9 | 10 | 11 | 12 |
| Distance from inlet (in.) | 33.3 | 37.4 | 41.1 | 43.8 |
| Temperature (° C.) | 742.3 | 794.4 | 713.9 | 488.1 |
| Deposition rate (g/cm$^2$/hr) | 0.013 | 0.015 | 0.014 | 0.000 |
| SEM image | FIG. 130 | FIG. 131 | FIG. 132 | |

Example 32: 4140 Steel

Twelve coupons were cut from a sheet of 4140 steel (i.e., an alloy having about 0.42% C, about 1.0% Mn, about 1.0% Cr, about 0.30% Si, and about 0.20% Mo, with the balance Fe) and were washed in ethanol to remove contaminants and oxidation. The coupons were placed in quartz boats in a quartz tube as described above. A reaction gas containing about 45% H$_2$ and 45% CO and 10% Ar was introduced into the quartz tube at about 4.0 MPa. The gases flowed over the coupons for about 4 hours at 1200 sccm. Solid carbon formed on each coupon at the rates shown in Table 25 below. Methane, carbon dioxide, and water were also formed in the quartz tube. About 10.5 grams of water were collected from the gases during the test.

TABLE 25

| Solid Carbon Formation on 4140 Steel | | | | | | |
|---|---|---|---|---|---|---|
| Sample # | 1 | 2 | 3 | 4 | 5 | 6 |
| Distance from inlet (in.) | 5.3 | 8.6 | 12.0 | 16.0 | 19.7 | 22.8 |
| Temperature (° C.) | 323.4 | 467.0 | 529.8 | 570.7 | 605.6 | 638.4 |
| Deposition rate (g/cm$^2$/hr) | 0.000 | 0.000 | 0.001 | 0.031 | 0.012 | 0.011 |
| Sample # | 7 | 8 | 9 | 10 | 11 | 12 |
| Distance from inlet (in.) | 27.3 | 30.6 | 34.4 | 38.4 | 42.0 | 45.2 |
| Temperature (° C.) | 705.1 | 766.1 | 802.7 | 767.9 | 575.4 | 314.9 |
| Deposition rate (g/cm$^2$/hr) | 0.008 | 0.010 | 0.009 | 0.016 | 0.100 | 0.000 |

Example 33: M42 High Speed Steel

Twelve coupons were cut from a sheet of M42 high speed steel (i.e., an alloy having about 1.1% C, about 9.5% Mo, about 3.8% Cr, about 1.5% W, about 1.2% V, and about 8.0% Co, with the balance Fe) and were washed in ethanol to remove contaminants and oxidation. The coupons were placed in quartz boats in a quartz tube as described above. A reaction gas containing about 45% $H_2$ and 45% CO and 10% Ar was introduced into the quartz tube at about 4.0 MPa. The gases flowed over the coupons for about 4 hours at 1200 sccm. Solid carbon formed on each coupon at the rates shown in Table 26 below. Methane, carbon dioxide, and water were also formed in the quartz tube. About 17.8 grams of water were collected from the gases during the test.

TABLE 26

Solid Carbon Formation on M42 High Speed Steel

| Sample # | 1 | 2 | 3 | 4 | 5 | 6 |
|---|---|---|---|---|---|---|
| Distance from inlet (in.) | 7.3 | 10.6 | 14.8 | 18.4 | 22.0 | 25.5 |
| Temperature (° C.) | 435.0 | 511.2 | 585.8 | 615.9 | 640.4 | 659.9 |
| Deposition rate (g/cm$^2$/hr) | 0.0001 | 0.0057 | 0.1983 | 0.1457 | 0.0996 | 0.0421 |

| Sample # | 7 | 8 | 9 | 10 | 11 | 12 |
|---|---|---|---|---|---|---|
| Distance from inlet (in.) | 29.3 | 32.8 | 36.1 | 39.9 | 43.3 | 47.1 |
| Temperature (° C.) | 692.8 | 734.7 | 784.1 | 777.1 | 510.4 | N/A |
| Deposition rate (g/cm$^2$/hr) | 0.0347 | 0.0224 | 0.0134 | 0.0201 | 0.0002 | 0.0003 |

Example 34: D2 Tool Steel

Twelve coupons were cut from a sheet of D2 tool steel (i.e., an alloy having about 1.5% C, 11.0%-13.0% Cr, about 0.45% Mn, about 0.03% P, about 1.0% V, about 0.9% Mo, and about 0.3% S, with the balance Fe) and were washed in ethanol to remove contaminants and oxidation. The coupons were placed in quartz boats in a quartz tube as described above. A reaction gas containing about 45% $H_2$ and 45% CO and 10% Ar was introduced into the quartz tube at about 4.0 MPa. The gases flowed over the coupons for about 4 hours at 1200 sccm. Solid carbon formed on each coupon at the rates shown in Table 27 below. Methane, carbon dioxide, and water were also formed in the quartz tube. About 14.2 grams of water were collected from the gases during the test.

TABLE 27

Solid Carbon Formation on D2 Tool Steel

| Sample # | 1 | 2 | 3 | 4 | 5 | 6 |
|---|---|---|---|---|---|---|
| Distance from inlet (in.) | 4.6 | 7.9 | 11.4 | 15.3 | 18.9 | 22.0 |
| Temperature (° C.) | 264.9 | 434.1 | 526.1 | 582.7 | 613.4 | 640.2 |
| Deposition rate (g/cm$^2$/hr) | 0.0000 | 0.0000 | 0.00005 | 0.0844 | 0.0798 | 0.0627 |

| Sample # | 7 | 8 | 9 | 10 | 11 | 12 |
|---|---|---|---|---|---|---|
| Distance from inlet (in.) | 26.1 | 29.2 | 32.6 | 36.1 | 39.9 | 43.5 |
| Temperature (° C.) | 663.8 | 689.7 | 727.2 | 778.2 | 777.4 | 518.3 |
| Deposition rate (g/cm$^2$/hr) | 0.0146 | 0.0118 | 0.0124 | 0.00746 | 0.00344 | 0.0000 |

Example 35: 1045 Steel

Twelve coupons were cut from a sheet of 1045 steel (i.e., an alloy having 0.42%-0.5% C, 0.6%-0.9% Mn, up to about 0.04% P, and up to about 0.5% S, with the balance Fe) and were washed in ethanol to remove contaminants and oxidation. The coupons were placed in quartz boats in a quartz tube as described above. A reaction gas containing about 45% $H_2$ and 45% CO and 10% Ar was introduced into the quartz tube at about 4.0 MPa. The gases flowed over the coupons for about 4 hours at 1200 sccm. Solid carbon formed on each coupon at the rates shown in Table 28 below. Methane, carbon dioxide, and water were also formed in the quartz tube. About 13.4 grams of water were collected from the gases during the test.

TABLE 28

Solid Carbon Formation on 1045 Steel

| Sample # | 1 | 2 | 3 | 4 | 5 | 6 |
|---|---|---|---|---|---|---|
| Distance from inlet (in.) | 5.7 | 9.6 | 12.8 | 16.5 | 19.9 | 23.4 |
| Temperature (° C.) | 375.5 | 492.6 | 548.3 | 583.7 | 609.1 | 645.2 |
| Deposition rate (g/cm$^2$/hr) | 0.0001 | 0.0001 | 0.191 | 0.0686 | 0.0619 | 0.0483 |

| Sample # | 7 | 8 | 9 | 10 | 11 | 12 |
|---|---|---|---|---|---|---|
| Distance from inlet (in.) | 27.1 | 30.4 | 34.0 | 37.9 | 41.2 | 44.8 |
| Temperature (° C.) | 690.1 | 751.5 | 798.0 | 784.8 | 698.5 | 393.5 |
| Deposition rate (g/cm$^2$/hr) | 0.0136 | 0.0117 | 0.0079 | 0.0074 | 0.0212 | 0.0000 |

Example 36: Cobalt

Ten samples, each approximately 2 cm long, were cut from a cobalt rod having a diameter of about 2 mm, and were washed in ethanol to remove contaminants and oxidation. The samples were placed in quartz boats in a quartz tube as described above. A reaction gas containing about 45% $H_2$ and 45% CO and 10% Ar was introduced into the quartz tube at about 4.0 MPa. The gases flowed over the cobalt samples for about 4 hours at 1200 sccm. Solid carbon formed on each sample at the rates shown in Table 29 below. Methane, carbon dioxide, and water were also formed in the quartz tube. About 1.93 grams of water were collected from the gases during the test.

TABLE 29

Solid Carbon Formation on Cobalt

| Sample # | 1 | 2 | 3 | 4 | 5 |
|---|---|---|---|---|---|
| Distance from inlet (in.) | 8.6 | 13.0 | 16.5 | 20.5 | 24.5 |
| Temperature (° C.) | 470.8 | 548.9 | 586.6 | 623.2 | 655.0 |
| Deposition rate (g/cm$^2$/hr) | 0.000 | 0.004 | 0.017 | 0.014 | 0.017 |

| Sample # | 6 | 7 | 8 | 9 | 10 |
|---|---|---|---|---|---|
| Distance from inlet (in.) | 27.8 | 30.5 | 34.5 | 37.3 | 41.1 |
| Temperature (° C.) | 678.7 | 707.3 | 755.2 | 791.9 | 719.0 |
| Deposition rate (g/cm$^2$/hr) | 0.026 | 0.008 | 0.007 | 0.027 | 0.037 |

Example 37: Titanium

Twelve samples, each approximately 2.3-2.7 cm long, were cut from a titanium rod having a diameter of about 1.65 mm, and were washed in ethanol to remove contaminants and oxidation. The samples were placed in quartz boats in a quartz tube as described above. A reaction gas containing about 45% $H_2$ and 45% CO and 10% Ar was introduced into the quartz tube at about 4.0 MPa. The gases flowed over the cobalt samples for about 4 hours at 1200 sccm. Solid carbon formed on each sample at the rates shown in Table 30 below. Methane, carbon dioxide, and water were also formed in the quartz tube. No water was collected from the gases during the test.

TABLE 30

Solid Carbon Formation on Titanium

| Sample # | 1 | 2 | 3 | 4 | 5 | 6 |
|---|---|---|---|---|---|---|
| Distance from inlet (in.) | 5.8 | 9.0 | 12.2 | 15.0 | 19.4 | 22.3 |
| Temperature (° C.) | 346.9 | 477.0 | 549.7 | 585.6 | 617.5 | 640.4 |
| Deposition rate (g/cm$^2$/hr) | 0.0000 | 0.0000 | 0.0000 | 0.0007 | 0.0017 | 0.0005 |

| Sample # | 7 | 8 | 9 | 10 | 11 | 12 |
|---|---|---|---|---|---|---|
| Distance from inlet (in.) | 25.8 | 29.7 | 32.7 | 36.4 | 39.9 | 43.6 |
| Temperature (° C.) | 666.8 | 701.5 | 735.5 | 1092.3 | 828.6 | 526.5 |
| Deposition rate (g/cm$^2$/hr) | 0.0003 | 0.0013 | 0.0014 | 0.0010 | 0.0022 | 0.0000 |

Prophetic Example 38

The experiment of Example 1 is repeated with a nickel-containing catalyst. The reactor temperature is maintained in excess of 680° C. The pressure of the reactor is controlled and may range from atmospheric pressure to pressures in excess of 6.2 MPa (900 psig). The carbon dioxide is thus reduced in the presence of a nickel-containing catalyst. The size and morphology of the solid carbon product is controlled by the grain size of the nickel-containing catalyst.

Prophetic Example 39

The experiment of Example 2 is repeated with a mixture of nickel and chromium as the catalyst. The carbon dioxide is reduced in the presence of the catalyst. The size and morphology of the resulting solid carbon product is controlled by the grain size of the nickel and chromium containing catalyst.

Prophetic Example 40

The experiment of Example 3 is repeated with methane used as the reducing agent in the place of hydrogen. Solid carbon nanotubes are formed by reducing carbon oxides with methane gas. The methane gas may also be combusted to provide the carbon oxide to be reduced. Carbon oxides created by the incomplete combustion of methane are reduced in the presence of methane to create solid CNTs. The combustion of methane forms carbon dioxide and water:

$$CH_4 + 2O_2 \leftrightarrow CO_2 + 2H_2O \quad \text{(Equation 7)}.$$

The carbon dioxide produced in Equation 7 is reduced by methane in the presence of a catalyst as shown in Equation 4. The size and morphology of the resulting solid carbon product is controlled by the grain size of the catalyst.

Prophetic Example 41

The experiment of Example 4 is repeated in a fluidized-bed reactor. The reactor is configured such that the solid carbon product is elutriated from the reactor due to the drag forces on the particles. The size and shape of the catalyst particles are selected to have a relatively large contact surface area between the catalyst and the reactant gases.

Although the foregoing description contains specific details, these are not to be construed as limiting the scope of the present invention, but merely as providing certain embodiments. Similarly, other embodiments of the invention may be devised that do not depart from the scope of the present invention. For example, features described herein with reference to one embodiment also may be provided in others of the embodiments described herein. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A method of reducing a gaseous carbon oxide to a lower oxidation state, the method comprising:
providing a non-ferrous metal substantially free of iron in a reactor, the non-ferrous metal comprising a sheet of solid material;
while the non-ferrous metal is in the reactor, pretreating the non-ferrous metal to alter a surface of the non-ferrous metal, the pretreating comprising at least one act selected from the group consisting of oxidizing and subsequently reducing, etching, and performing sputtering on the surface of the non-ferrous metal;
reacting a carbon oxide with a gaseous reducing agent in the presence of the non-ferrous metal in a non-oxidized state under predetermined conditions of temperature and pressure adapted to produce water and a solid carbon product having a diameter and morphology dependent on the pretreatment of the non-ferrous metal; and
separating at least a portion of the water formed in the presence of the non-ferrous metal from the carbon oxide during the reaction of the carbon oxide with the gaseous reducing agent.

2. The method of claim 1, wherein the carbon oxide consists essentially of carbon dioxide.

3. The method of claim 1, wherein the gaseous reducing agent comprises hydrogen, methane, ethane, propane, butane, hexane, heptane, or any combination thereof.

4. The method of claim 1, wherein the predetermined conditions of temperature and pressure comprise a temperature of between about 450° C. and 800° C.

5. The method of claim 1, further comprising selecting the non-ferrous metal to comprise molybdenum.

6. The method of claim 1 wherein the non-ferrous metal comprises a metal comprising nickel, cobalt, molybdenum, tungsten, chromium, alloys thereof, or any combination thereof.

7. The method of claim 1, wherein pretreating the non-ferrous metal comprises performing sputtering on the surface of the non-ferrous metal.

8. The method of claim 1, wherein pretreating the non-ferrous metal comprises chemically etching the surface of the non-ferrous metal while the non-ferrous metal is in the reactor.

9. The method of claim 8, wherein chemically etching the surface of the non-ferrous metal while the non-ferrous metal is in the reactor comprises exposing the surface of the non-ferrous metal to at least one acid selected from the group consisting of hydrochloric acid and nitric acid.

10. The method of claim 1, wherein reacting a carbon oxide with a gaseous reducing agent in the presence of the non-ferrous metal in a non-oxidized state comprises heating the non-ferrous metal to a predetermined temperature, holding the predetermined temperature for a predetermined time, and controlling a cooling rate of the non-ferrous metal.

11. The method of claim 10, wherein heating the non-ferrous metal to a predetermined temperature comprises heating the non-ferrous metal to a temperature between about 650° C. and 1,000° C.

12. The method of claim 1, wherein reacting a carbon oxide with a gaseous reducing agent comprises reacting carbon dioxide with a gaseous reducing agent at a temperature of about 680° C. or higher.

13. The method of claim 1, wherein reacting a carbon oxide with a gaseous reducing agent in the presence of the non-ferrous metal in a non-oxidized state comprises reacting the carbon oxide with the gaseous reducing agent in the presence of a catalyst promoter selected from the group consisting of thiophene, hydrogen sulfide, a heterocyclic sulfide, an inorganic sulfide, volatile lead, a bismuth compound, ammonia, and combinations thereof.

14. A method for utilizing a non-ferrous metallic compound in a reactor to reduce a gaseous carbon oxide, the method comprising:
providing the non-ferrous metallic compound in the reactor, the non-ferrous metallic compound substantially free of iron;
purging gases in the reactor containing the non-ferrous metallic compound with a gaseous reducing agent;
maintaining a predetermined reactor temperature sufficient to reduce oxides present in the non-ferrous metallic compound;
while the non-ferrous metallic compound is in the reactor, oxidizing and subsequently reducing a surface of the non-ferrous metallic compound at a temperature between about 500° C. and about 1,200° C. to alter a grain structure and grain boundaries in the surface of the non-ferrous metallic compound;
introducing a reaction gas mixture comprising the gaseous carbon oxide into the reactor to form a reaction gas composition at a reaction gas pressure;
maintaining the reaction gas composition and reaction gas pressure in the reactor to reduce the gaseous carbon oxide to form water and a solid carbon product; and
separating at least a portion of the water formed in the reactor from the reaction gas mixture during the reaction of the reaction gas mixture.

15. The method of claim 14, wherein purging gases in the reactor containing the non-ferrous metallic compound with a gaseous reducing agent comprises purging gases in the reactor containing the non-ferrous metallic compound with at least one of hydrogen gas and methane.

16. The method of claim 14, further comprising selecting the gaseous reducing agent to comprise a hydrocarbon gas formulated to react with oxides of the non-ferrous metallic compound at the predetermined reactor temperature.

17. The method of claim 14, further comprising circulating the reaction gas mixture through an external means for condensing water from the reaction gas mixture.

18. The method of claim 14, further comprising:
placing the non-ferrous metallic compound in the reactor, the non-ferrous metallic compound comprising a material selected from the group consisting of elements of groups 5 through 10 of the periodic table, lanthanides, actinides, and combinations thereof;
reacting the reaction gas mixture in the presence of the non-ferrous metallic compound to form solid carbon and a tail gas mixture containing water vapor; and
removing the solid carbon from the reactor.

19. A method of forming a solid carbon product, the method comprising:
providing a non-ferrous catalyst substantially free of iron in a reactor;
while the non-ferrous catalyst is in the reactor, altering a surface of the non-ferrous catalyst by at least one of oxidizing and subsequently reducing the surface of the non-ferrous catalyst, performing sputtering on the surface of the non-ferrous catalyst, and chemically etching the surface of the non-ferrous catalyst; and
reacting a carbon oxide with a gaseous reducing agent in the presence of the non-ferrous catalyst to form water and a solid carbon product.

* * * * *